(12) United States Patent
Brown et al.

(10) Patent No.: US 11,806,582 B1
(45) Date of Patent: Nov. 7, 2023

(54) TREE STAND LIFTING SYSTEM AND METHOD OF INSTALLING THE TREE STAND LIFTING SYSTEM ON A TREE

(71) Applicant: Hytek Innovations LLC, Armada, MI (US)

(72) Inventors: Todd R. Brown, Armada, MI (US); William R. Brown, II, Oxford, MI (US)

(73) Assignee: Hytek Innovations LLC, Armada, MI (US)

( * ) Notice: Subject to any disclaimer, the term of this patent is extended or adjusted under 35 U.S.C. 154(b) by 516 days.

(21) Appl. No.: 16/985,705

(22) Filed: Aug. 5, 2020

Related U.S. Application Data

(60) Provisional application No. 62/883,184, filed on Aug. 6, 2019.

(51) Int. Cl.
*A01M 31/02* (2006.01)
*A63B 27/00* (2006.01)

(52) U.S. Cl.
CPC ............. *A63B 27/00* (2013.01); *A01M 31/02* (2013.01)

(58) Field of Classification Search
CPC .. A01M 31/02; E06C 7/00; E06C 7/12; E06C 7/46; A63B 27/00; B66F 11/04; B66B 9/16; B66B 9/187
See application file for complete search history.

(56) References Cited

U.S. PATENT DOCUMENTS

| | | | | |
|---|---|---|---|---|
| 7,281,607 B1 * | 10/2007 | Kiraly | ...................... | E06C 7/12 |
| | | | | 182/102 |
| 9,834,944 B2 * | 12/2017 | Maurer | ................... | B66B 9/022 |
| 2007/0169996 A1 * | 7/2007 | Blue | ..................... | A01M 31/02 |
| | | | | 182/141 |
| 2008/0271948 A1 * | 11/2008 | Motes | ................... | A01M 31/02 |
| | | | | 182/141 |
| 2008/0283334 A1 * | 11/2008 | Fickey | ................. | A01M 31/02 |
| | | | | 182/20 |
| 2014/0001333 A1 * | 1/2014 | Stephen | .................... | E06C 7/46 |
| | | | | 248/530 |
| 2018/0055040 A1 * | 3/2018 | Abouelmakarem | ... | A61G 5/104 |
| 2018/0230746 A1 * | 8/2018 | Maxfield | ................ | E06C 7/423 |
| 2021/0283467 A1 * | 9/2021 | Booth | .................... | A63B 27/00 |

FOREIGN PATENT DOCUMENTS

CA            2911346 A1 *  5/2016  ............ A01M 31/02

* cited by examiner

*Primary Examiner* — Colleen M Chavchavadze
(74) *Attorney, Agent, or Firm* — Buckert Patent & Trademark Law Firm PC; John F. Buckert

(57) ABSTRACT

A tree stand lifting system and method are provided. The system includes a base member, a first strap assembly, and a base pole assembly. The base pole assembly has a first end portion that is rotatably coupled to the base member such that the base pole assembly is rotatable from a first position to a substantially vertical position relative to the base member. The base pole assembly has a first plurality of teeth. The system includes a carriage assembly that is removably coupled to the base pole assembly, and an electric drive unit that is coupled to the carriage assembly. The electric drive unit has a gear assembly and an electric motor. The gear assembly has a main drive gear that rotates and operably engages at least a portion of the first plurality of teeth of the base pole assembly to move the carriage assembly on the base pole assembly.

19 Claims, 62 Drawing Sheets

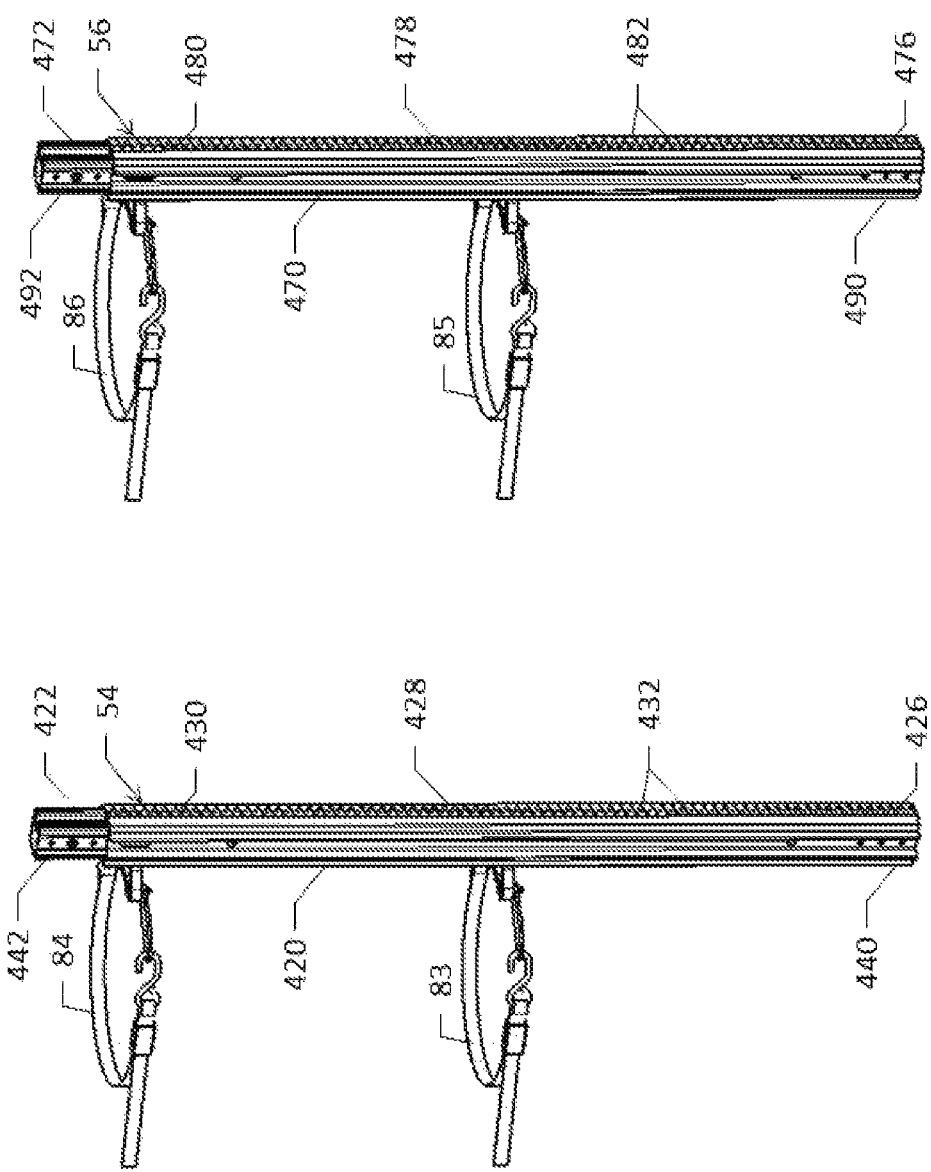

(C)

| | |
|---|---|
| USER CLOSES THE UP SWITCH ON THE ELECTRIC DRIVE UNIT OR CLOSES THE UP SWITCH ON THE HAND-HELD RF TRANSMITTER TO INDUCE THE MICROCONTROLLER TO GENERATE A THIRD CONTROL SIGNAL TO INDUCE THE ELECTRIC DRIVE UNIT TO ENERGIZE THE ELECTRIC MOTOR TO ROTATE THE MAIN DRIVE GEAR IN THE FIRST ROTATIONAL DIRECTION AND OPERABLY ENGAGE THE THIRD PLURALITY OF TEETH OF THE SECOND MIDDLE POLE ASSEMBLY SUCH THAT THE CARRIAGE ASSEMBLY AND THE PORTABLE TREE STAND MOVE UPWARDLY ON THE SECOND MIDDLE POLE ASSEMBLY, SUCH THAT FIRST AND SECOND DOCKETING STATION PINS ON THE CARRIAGE ASSEMBLY ENGAGE FIRST AND SECOND APERTURES, RESPECTIVELY, ON A DOCKING STATION CLAMP ATTACHED TO THE TOP POLE ASSEMBLY | 2260 |
| USER COUPLES A SEVENTH STRAP ASSEMBLY TO THE DOCKING STATION CLAMP THAT IS FURTHER COUPLED TO THE TOP POLE ASSEMBLY, AND AGAINST AN EXTERIOR SURFACE OF THE TREE, TO HOLD THE TOP POLE ASSEMBLY AT A FIXED POSITION RELATIVE TO THE TREE | 2262 |
| USER COUPLES AN EIGHTH STRAP ASSEMBLY TO A SIXTH TREE CLAMP THAT IS FURTHER COUPLED TO A TOP POLE ASSEMBLY, AND AGAINST AN EXTERIOR SURFACE OF THE TREE, TO HOLD THE TOP POLE ASSEMBLY AT A FIXED POSITION RELATIVE TO THE TREE | 2264 |
| USER COUPLES A NINTH STRAP ASSEMBLY TO A TOP PLATE OF THE TOP POLE ASSEMBLY AND AGAINST AN EXTERIOR SURFACE OF THE TREE TO HOLD THE TOP POLE ASSEMBLY AT A FIXED POSITION RELATIVE TO THE TREE | 2266 |
| USER CLOSES THE DOWN SWITCH ON THE ELECTRIC DRIVE UNIT OR CLOSES THE DOWN SWITCH ON THE HAND-HELD RF TRANSMITTER TO INDUCE THE MICROCONTROLLER TO GENERATE A FOURTH CONTROL SIGNAL TO INDUCE THE ELECTRIC DRIVE UNIT TO ENERGIZE THE ELECTRIC MOTOR TO ROTATE THE MAIN DRIVE GEAR IN A SECOND ROTATIONAL DIRECTION AND OPERABLY ENGAGE THE THIRD PLURALITY OF TEETH OF THE SECOND MIDDLE POLE ASSEMBLY, THEN OPERABLY ENGAGE THE SECOND PLURALITY OF TEETH OF THE FIRST MIDDLE POLE ASSEMBLY, THEN OPERABLY ENGAGE THE FIRST PLURALITY OF TEETH OF THE BASE POLE ASSEMBLY TO MOVE THE CARRIAGE ASSEMBLY AND THE PORTABLE TREE STAND DOWNWARDLY, THE SECOND ROTATIONAL DIRECTION BEING OPPOSITE TO THE FIRST ROTATIONAL DIRECTION | 2268 |

FIG. 65

TREE STAND LIFTING SYSTEM AND METHOD OF INSTALLING THE TREE STAND LIFTING SYSTEM ON A TREE

CROSS-REFERENCE TO RELATED APPLICATIONS

This application claims priority to U.S. Provisional Patent Application No. 62/883,184 filed on Aug. 6, 2019, the entire contents of which are hereby incorporated by reference herein.

BACKGROUND

Hunters utilize tree stands to obtain hunting positions above ground level. Traditional tree stands have a tree stand platform and ladder rungs that are mounted to a tree. A hunter has to climb the ladder rungs to reach the tree stand platform.

A problem with the traditional tree stands is that a hunter who is elderly or disabled may not be able to climb the ladder rungs to reach the tree stand platform.

The inventors herein have recognized a need for an improved tree stand lifting system and a method that eliminates the above-mentioned problem.

SUMMARY

A tree stand lifting system in accordance with an exemplary embodiment is provided. The tree stand lifting system includes a base member. The tree stand lifting system further includes a first strap assembly coupled to the base member. The tree stand lifting system further includes a base pole assembly having first and second end portions. The first end portion is rotatably coupled to the base member such that the base pole assembly is rotatable from a first position to a substantially vertical position. The base pole assembly has a first plurality of teeth disposed longitudinally thereon. The tree stand lifting system further includes a carriage assembly that is removably coupled to the base pole assembly. The tree stand lifting system further includes an electric drive unit that is coupled to the carriage assembly. The electric drive unit has a gear assembly and an electric motor that drives the gear assembly. The gear assembly has a main drive gear that rotates and operably engages at least a portion of the first plurality of teeth of the base pole assembly to move the carriage assembly on the base pole assembly.

A method for installing a tree stand lifting system on a tree in accordance with another exemplary embodiment is provided. The method includes coupling a base pole assembly to the tree utilizing a first tree clamp coupled to the base pole assembly. The method further includes removably coupling a carriage assembly having an electric drive unit disposed thereon to the base pole assembly such that a main drive gear of the electric drive unit operably engages at least a portion of a first plurality of teeth of the base pole assembly. The method further includes coupling a portable tree stand to the carriage assembly. The method further includes generating a first control signal to induce an electric drive unit to energize an electric motor rotate the main drive gear in a first rotational direction and operably engage the first plurality of teeth of the base pole assembly such that the carriage assembly moves upwardly on the base pole assembly, utilizing a microcontroller.

BRIEF DESCRIPTION OF THE DRAWINGS

FIG. 26 is a schematic of a first middle pole assembly having two tree clamps attached thereto and two strap assemblies coupled to the tree clamps, utilized in the tree stand lifting system of FIG. 1;

FIG. 27 is a schematic of a second middle pole assembly having two tree clamps attached thereto and two strap assemblies coupled to the tree clamps, utilized in the tree stand lifting system of FIG. 1;

FIGS. 62-65 is a flowchart of a method for installing a tree stand lifting system on a tree in accordance with another exemplary embodiment.

DETAILED DESCRIPTION

Figure 1:
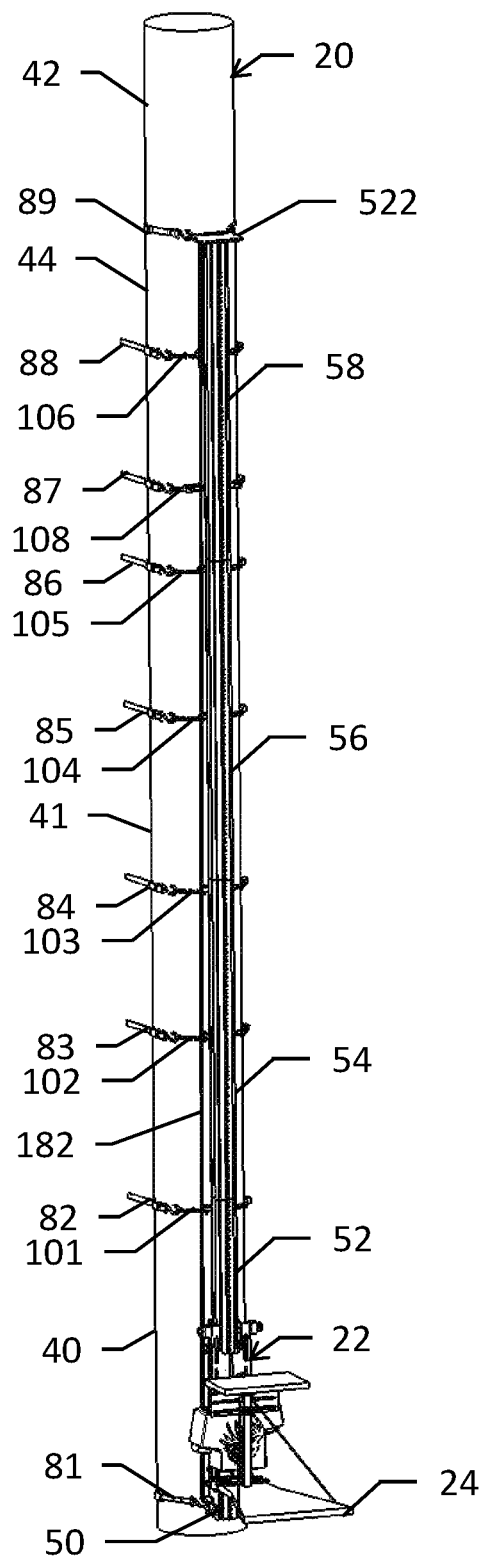
FIG. 1 is a schematic of a tree, a tree stand lifting system in accordance with an exemplary embodiment coupled to the tree, and a portable tree stand coupled to the tree stand lifting system.
Figure 2:
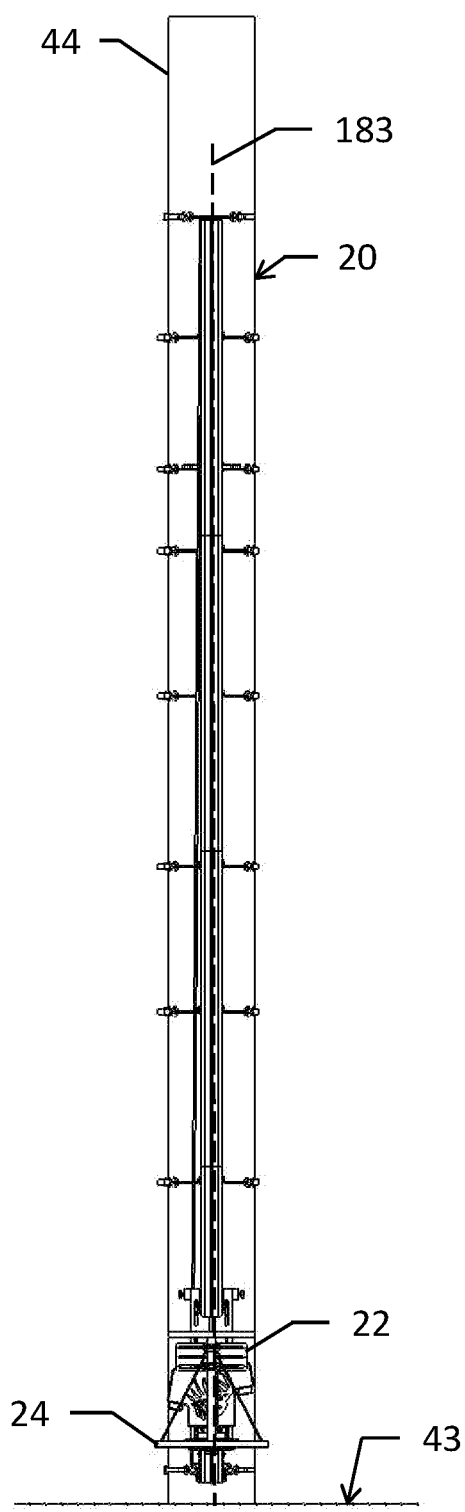
FIG. 2 is a front view of the tree, the tree stand lifting system, and the portable tree stand shown in FIG. 1.
Figure 61:
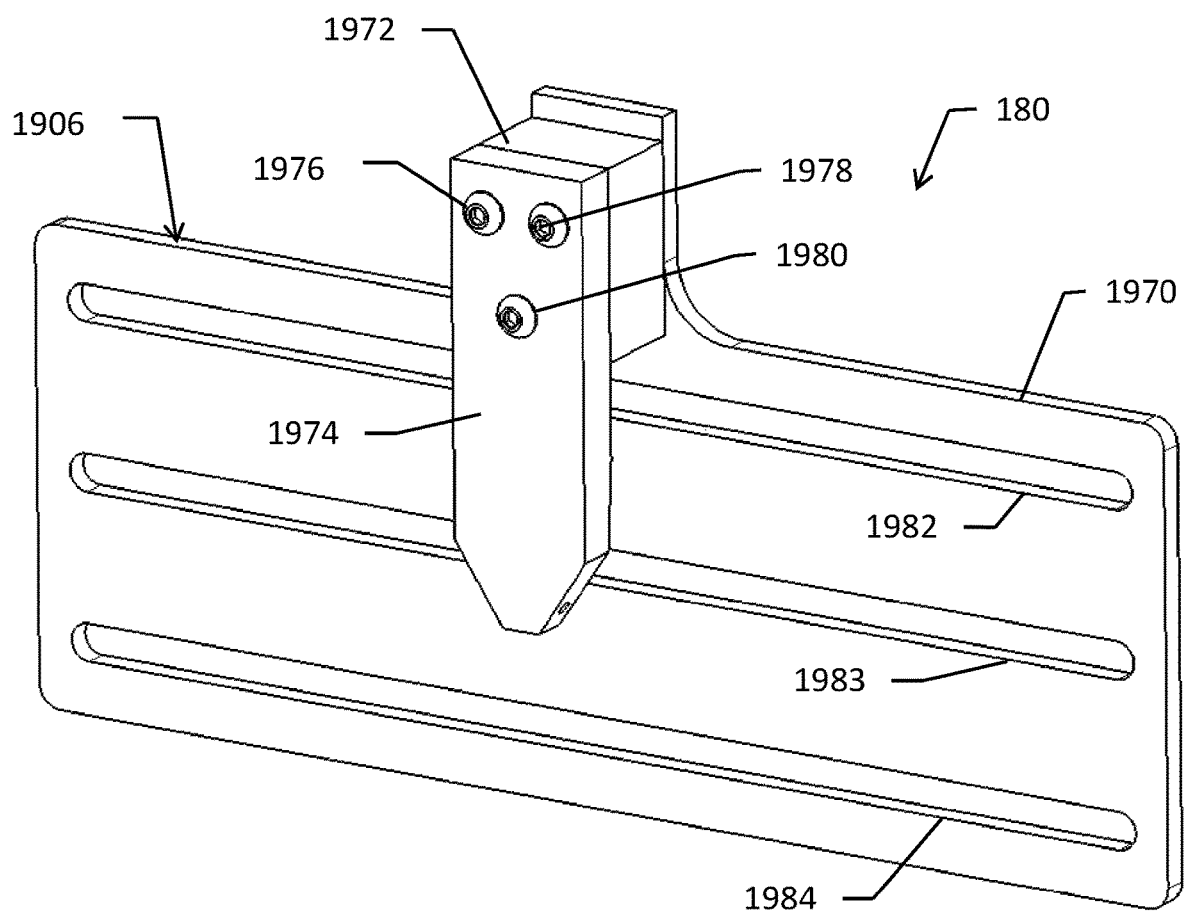
FIG. 61 is another schematic of the tree stand coupler assembly of FIG. 58.
Figure 62:
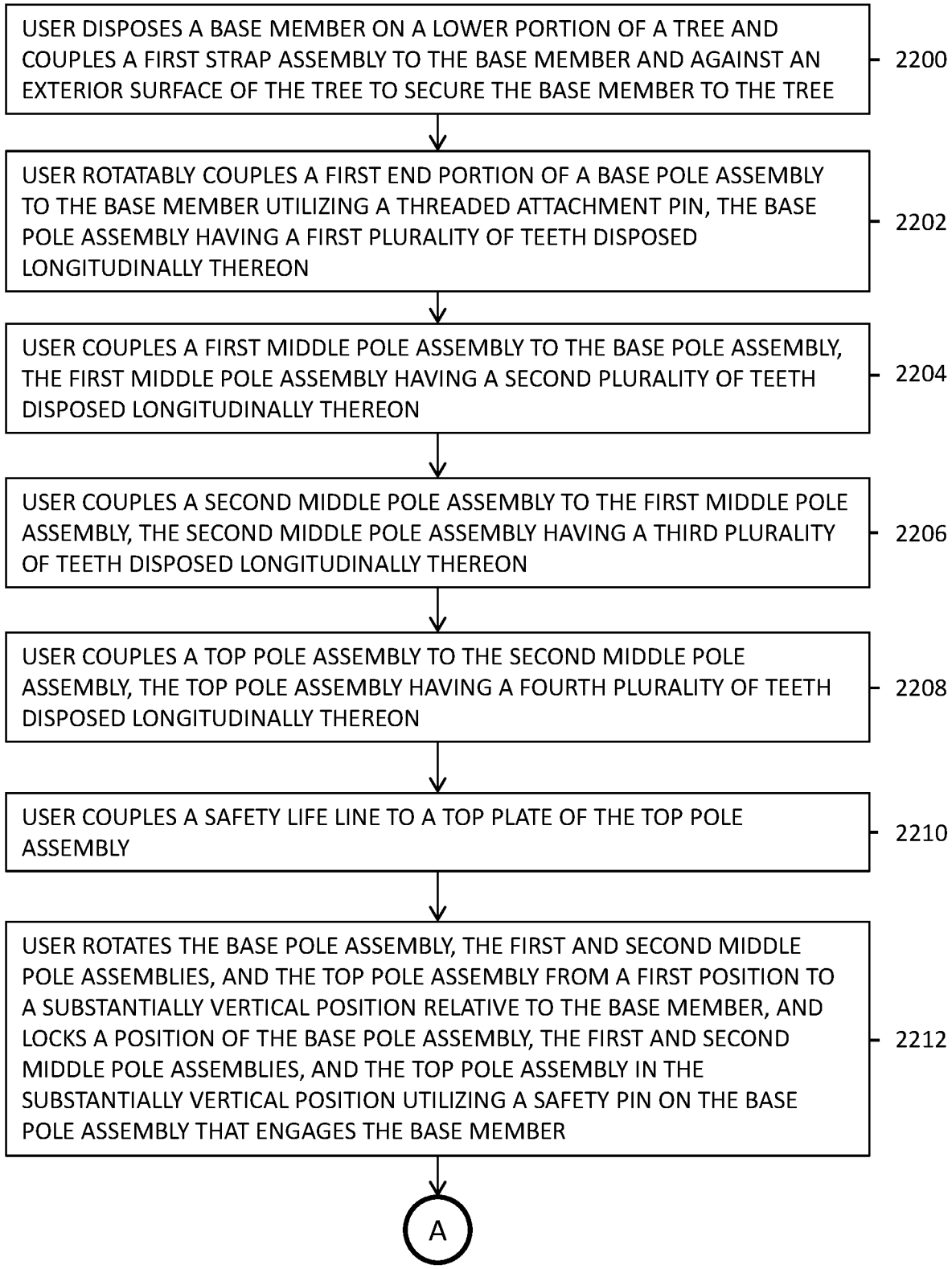
Figure 63:
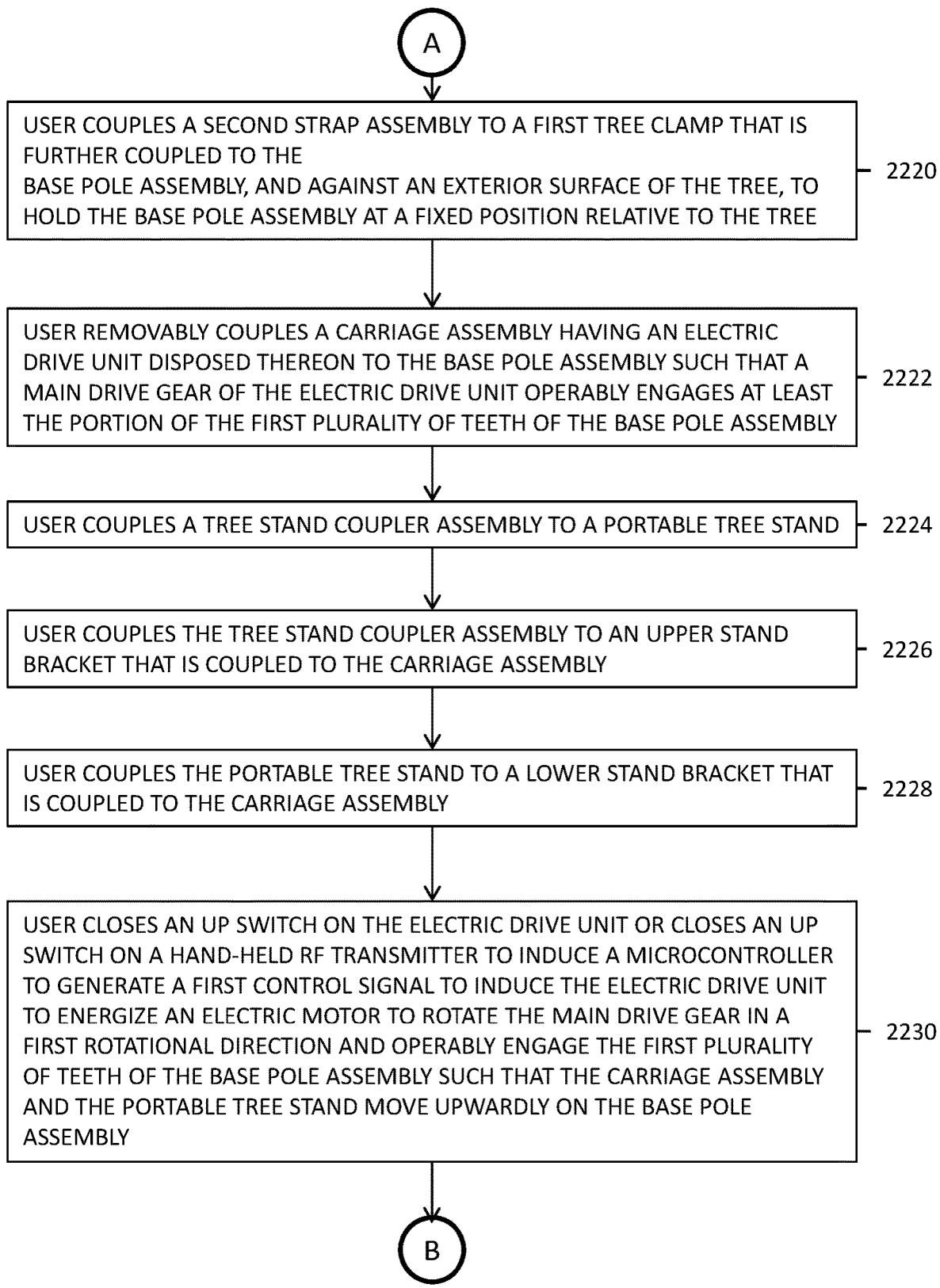
Figure 64:
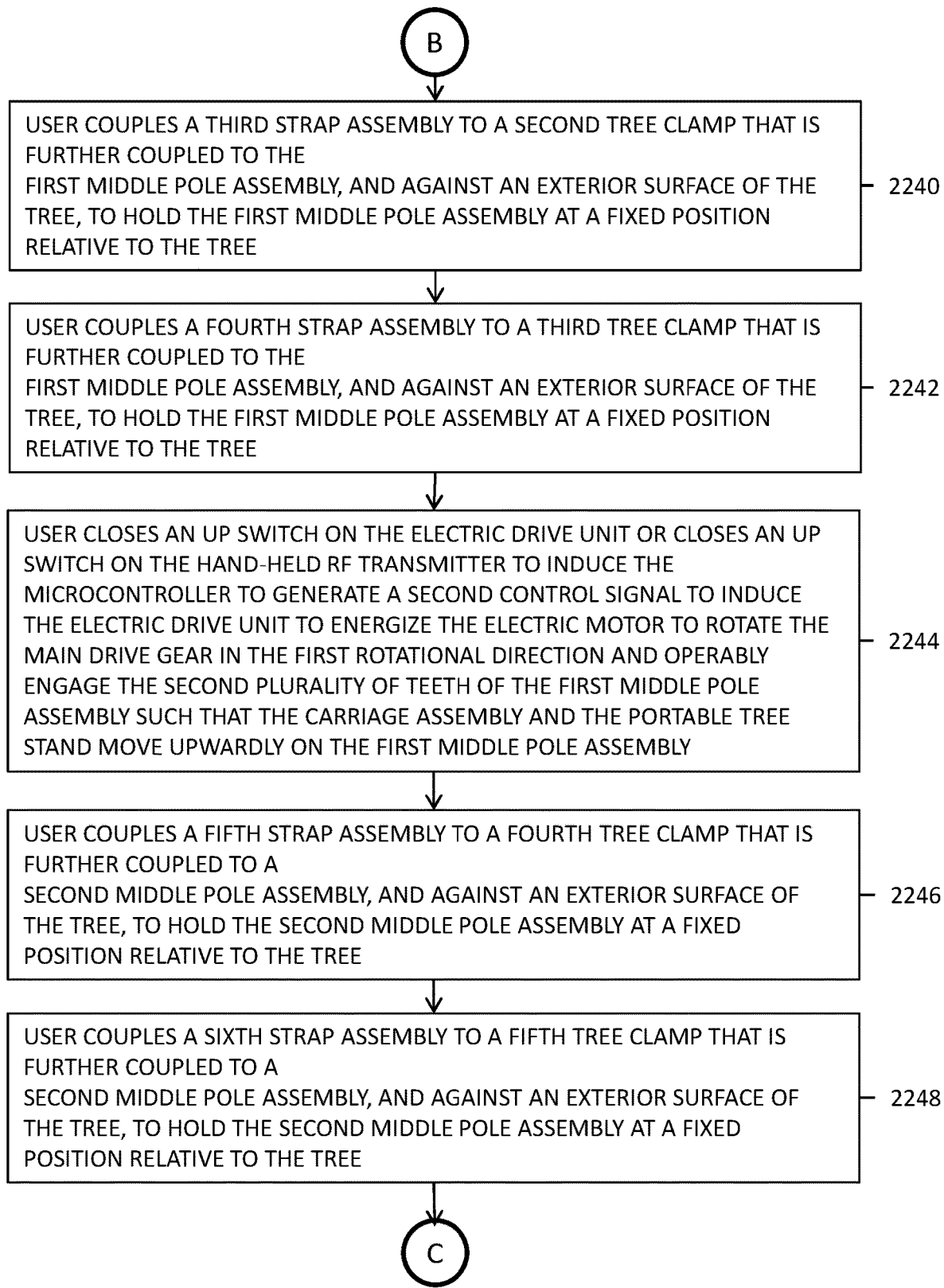

Referring to FIGS. 1-61, a tree 20, a tree stand lifting system 22 in accordance with an exemplary embodiment, and a portable tree stand are illustrated. The tree stand lifting system 22 is coupled to the tree 20, and the portable tree stand 24 is coupled to the system 22.

Figure 11:
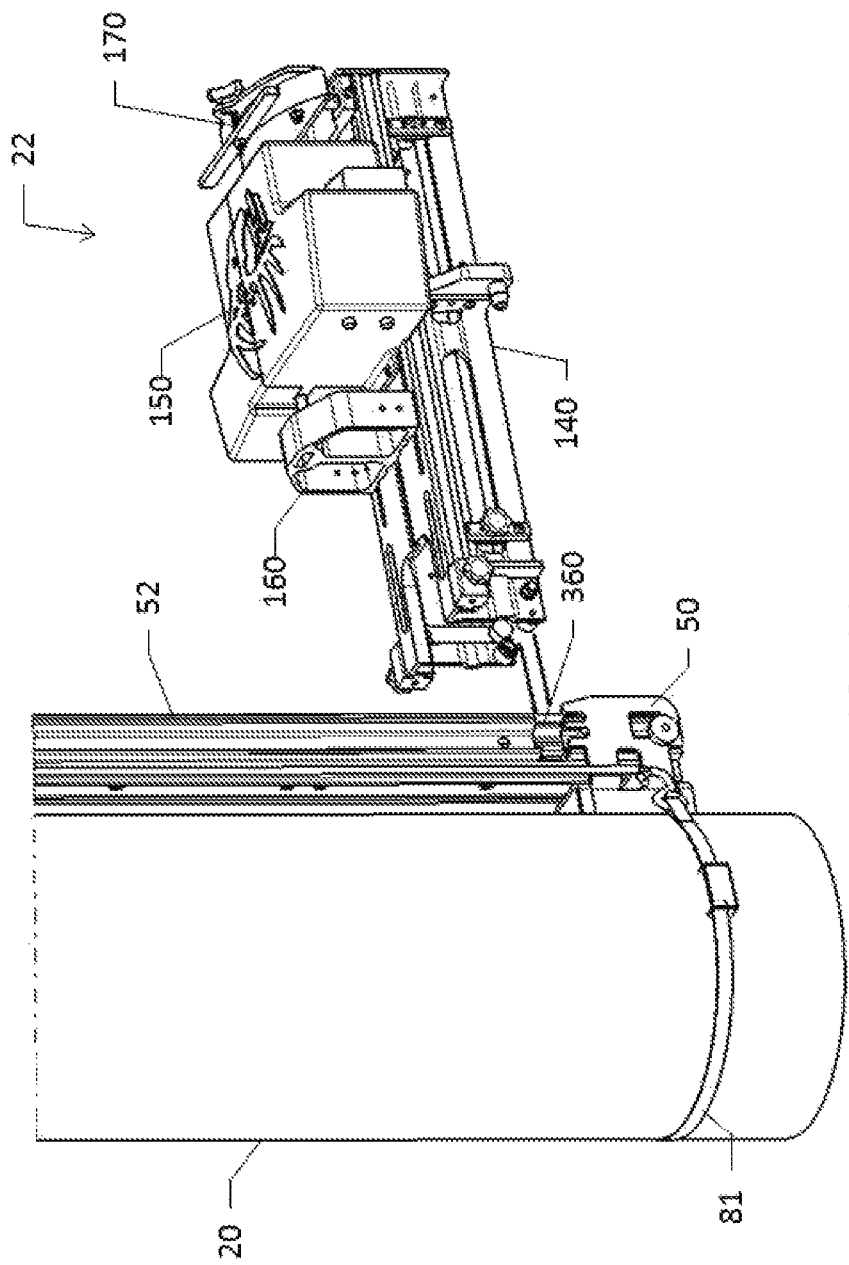
FIG. 11 is a schematic of a carrier assembly being moved towards the base pole assembly for coupling the carriage assembly to the base pole assembly.

Referring to FIGS. 1-20, an advantage of the tree stand lifting system 22 is that the system 22 utilizes a base pole assembly 52 (shown in FIG. 4) that is rotatably coupled to a base member 50 that is coupled to the tree 20. As a result, the base pole assembly 52 can be rotated to a substantially vertical position while a user is on the ground. Thus, the user does not have to climb a ladder to couple a pole assembly to a tree 20. A further advantage of the system 22 is that a carriage assembly 140 has an attached electric drive unit 150 (shown in FIG. 11) that is removably coupled to the base pole assembly 52. Thus, when an operator is no longer using the carriage assembly 140 at the end of a hunting weekend, the base pole assembly 52 can be left coupled to the tree 20 and the operator can remove the carriage assembly 140 and the electric drive unit 150 so that these devices can be safely stored in a secure location. Still a further advantage of the system 22 is that the electric drive unit 22 moves a portable tree stand either upwardly or downwardly on the base pole assembly 52 so that a user does not have to climb a ladder to install a portable tree stand at an elevated position in a tree.

A few terms used herein will now be defined for purposes of clarity.

The term "substantially vertical position" means ±15 degrees from a vertical position relative to the ground.

The term "first position" with respect to the base pole assembly 52 means any position that is not a substantially vertical position. For example, the first position could be a horizontal position with respect to the ground.

Referring to FIG. 1, the tree 20 has a lower end portion 40, an intermediate portion 41, and an upper end portion 42. The lower end portion 40 contacts the ground 43 (shown in FIG. 2).

Referring to FIGS. 1-20, the tree stand lifting system 22 includes a base member 50, a base pole assembly 52, a first middle pole assembly 54, a second middle pole assembly 56, a top pole assembly 58, first, second, third, fourth, fifth, sixth, seventh, eighth, ninth strap assemblies 81, 82, 83, 84, 85, 86, 87, 88, 89, first, second, third, fourth, fifth, sixth tree clamps 101, 102, 103, 104, 105, 106, a docking station clamp 108 (shown in FIG. 19), a threaded attachment pin 120 (shown in FIG. 5), a nut 122, a carriage assembly 140 (shown in FIG. 11), an electric drive unit 150, and upper stand bracket 160, lower stand bracket 170, threaded bolts 171, 172, 173, 174, 175, 176 (shown in FIG. 6), a tree stand coupler assembly 180 (shown in FIG. 16), and a safety life line 182 (shown in FIG. 1). The base pole assembly 52, the first middle pole assembly 54, the second middle pole assembly 56, and the top pole assembly 58 are aligned with one another and extend along a longitudinal axis 183 (shown in FIG. 2).

Figure 3:
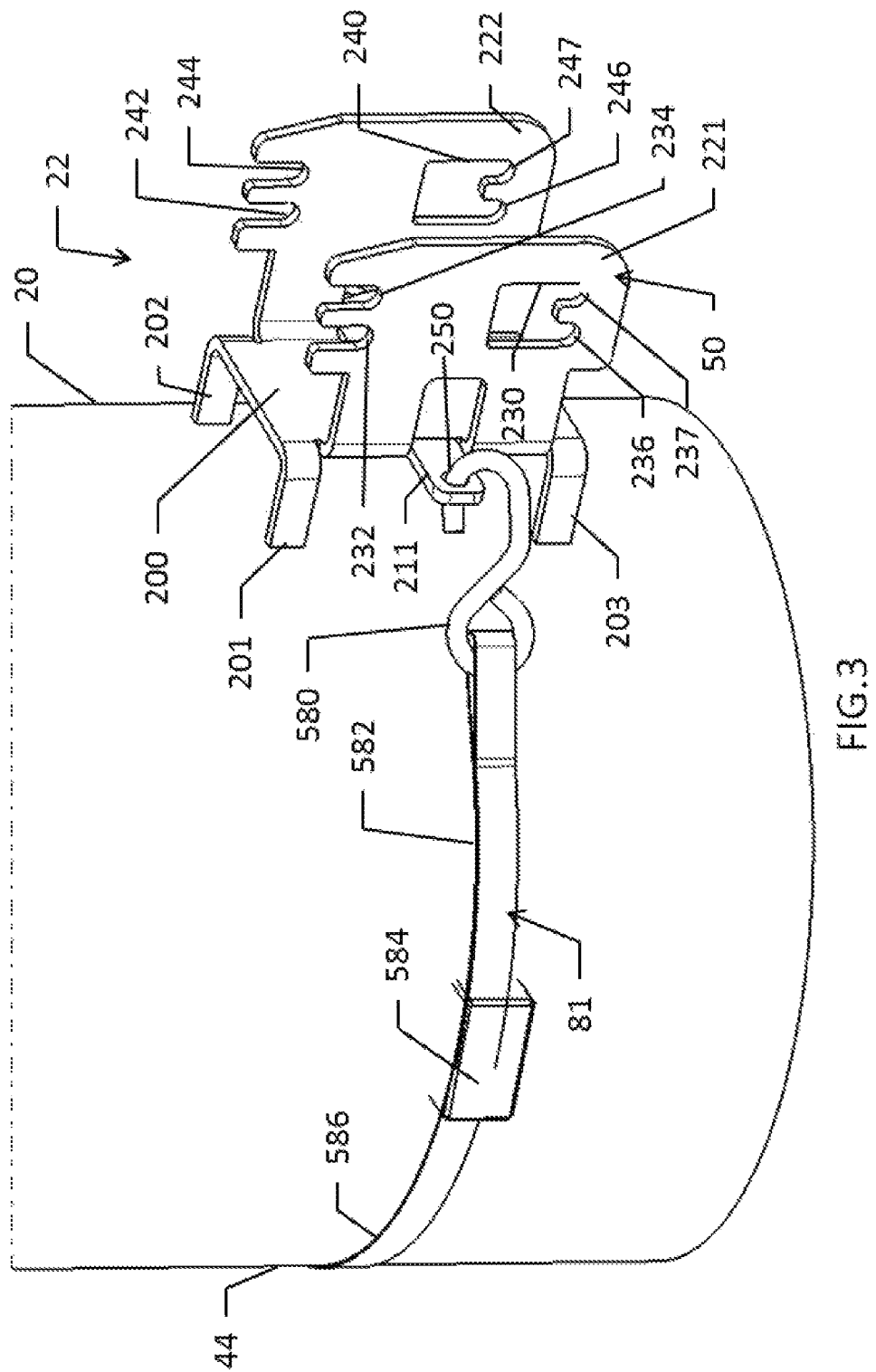
FIG. 3 is a schematic of a base member and a first strap assembly that is used to couple the base member to the tree.
Figure 4:
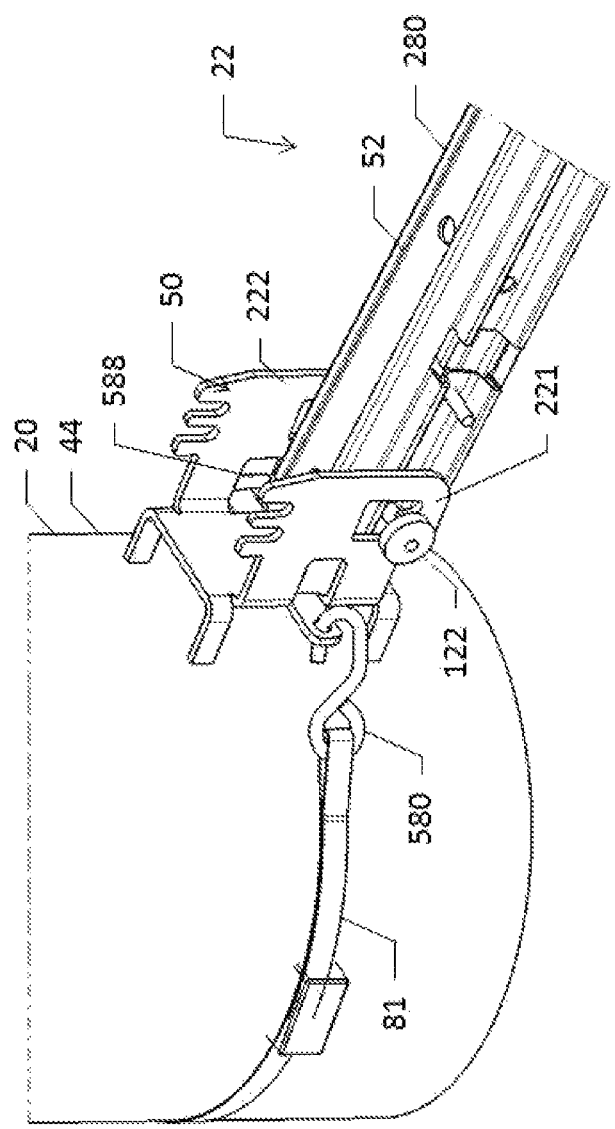
FIG. 4 is a schematic of the base member, the first strap assembly, and a base pole assembly that is rotatably coupled to the base member that is disposed at an exemplary first position.
Figure 20:
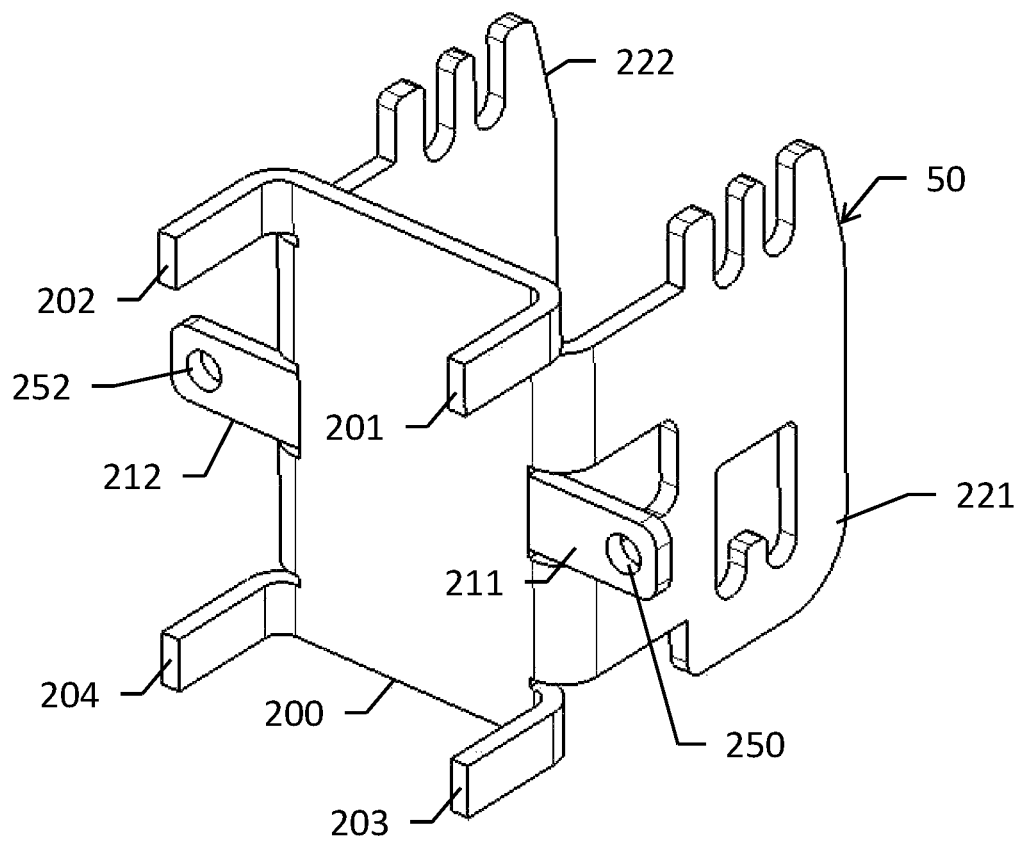
FIG. 20 is a schematic of a base member utilized in the tree stand lifting system of FIG. 1.

Referring to FIGS. 3, 4 and 20, the base member 50 is coupled to the tree 20 utilizing the first strap assembly 81. The first strap assembly 81 is coupled to opposite sides of the base member 50 and is wrapped around an exterior surface 44 of the tree 20 to secure the base member 50 to the tree 20. The base pole assembly 52 is rotatably coupled to the base member 50 such that the base pole assembly 52 can be rotated from a substantially horizontal position to a substantially vertical position relative to the ground. The base member 50 includes a base plate 200, first, second, third, fourth gripping fingers 201, 202, 203, 204, first and second coupling tabs 211, 212 and first and second receiving plates 221, 222. In an exemplary embodiment, the base member 50 is constructed of a metal such as steel or aluminum for example.

The first, second, third, and fourth gripping fingers 201, 202, 203, 204 are coupled to and extend outwardly in a first direction from the base plate 200 and are shaped to engage the exterior surface 44 of the tree 20.

The first and second coupling tabs 211, 212 are coupled to and extend outwardly from first and second side portions, respectively, of the base plate 200 in second and third directions, respectively, that are opposite to one another. The first and second s-hooks 580, 588 (shown in FIG. 4) of the first strap assembly 81 extend into apertures 250, 252 (shown in FIG. 20) of the first and second coupling tabs 211, 212, respectively to couple the first strap assembly 81 to the first and second coupling tabs 211, 212, respectively of the base member 50.

The first and second receiving plates 221, 222 are coupled to and extend outwardly from the base plate 200 in a fourth direction that is opposite to the first direction. The first and second receiving plates 221, 222 are spaced apart from one another to receive the first end portion 320 (shown in FIG. 21) of the base pole assembly 52 therebetween.

The first receiving plate 221 includes an aperture 230 (shown in FIG. 3) extending therethrough and grooves 232, 234 extending from a top end of the first receiving plate 221 into the first receiving plate 221. The aperture 230 is provided to receive a threaded attachment pin 120 (shown in FIG. 5) therethrough for rotatably coupling the base pole assembly 52 to the base member 50. In particular, the aperture 230 defines first and second lobe portions 236, 237 (shown in FIG. 3) which each may receive the threaded attachment pin 122 therein.

Figure 9:
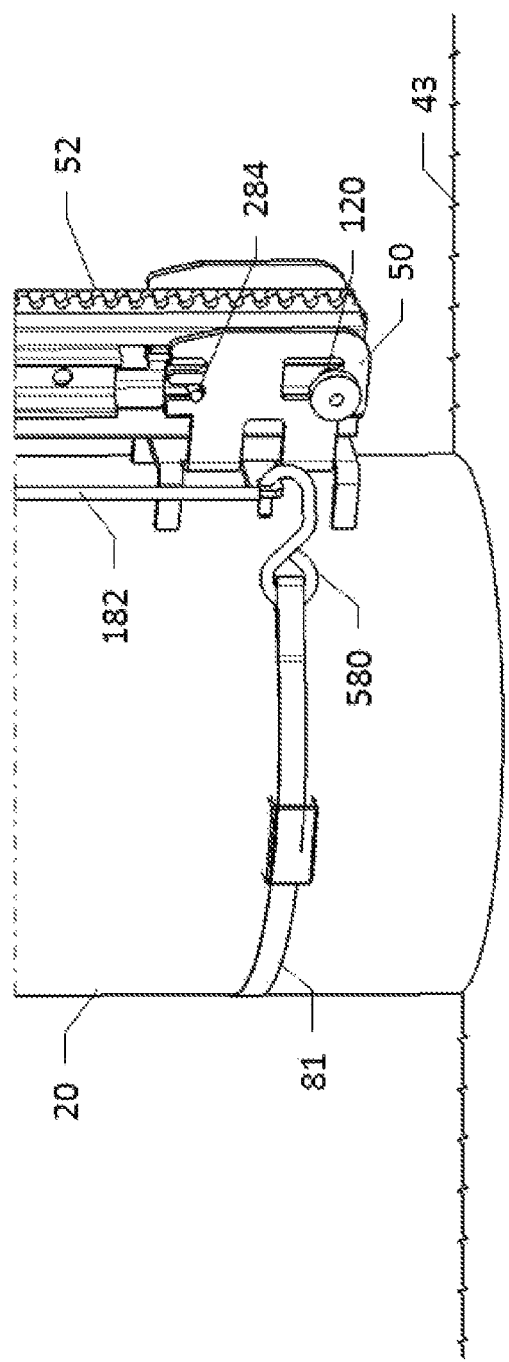
FIG. 9 is a schematic of the base pole assembly being disposed at a substantially vertical position and having a locked position on the base member.
Figure 10:
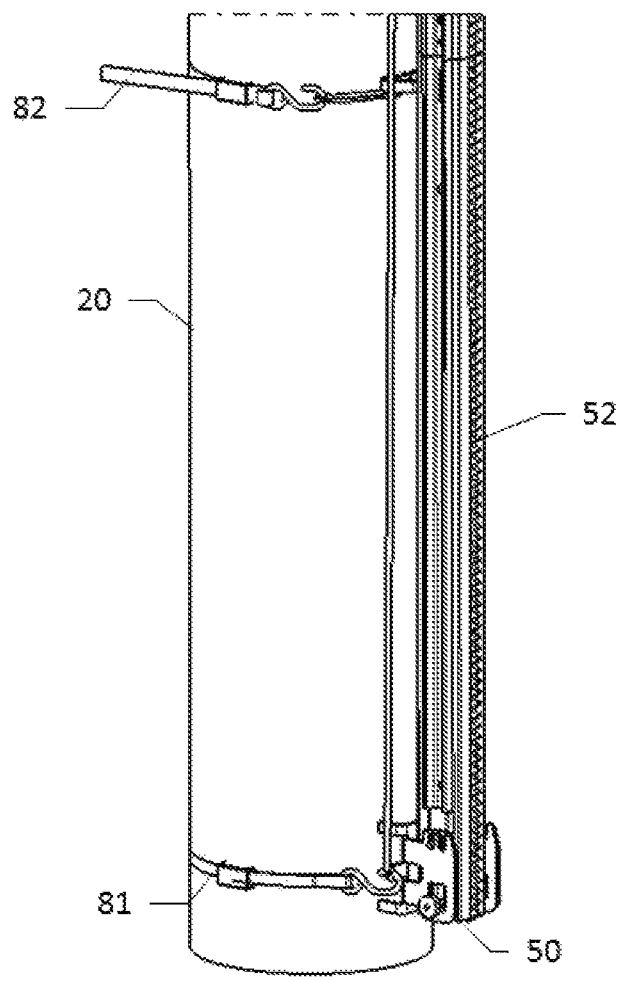
FIG. 10 is a schematic of the base member, the base pole assembly, a portion of the first middle pole assembly, and first and second strap assemblies.

Referring to FIGS. 3 and 9, the grooves 232, 234 are utilized to receive a safety pin 284 (shown in FIG. 9) therein for holding the base pole assembly 52 at a substantially vertical position. When the safety pin 284 is disposed in the groove 232, the base pole assembly 52 is maintained at a first substantially vertical position. Alternately, when the safety pin 284 is disposed in the groove 234, the base pole assembly 52 is maintained at a second substantially vertical position. An advantage of the grooves 232, 234 is that the grooves allow an operator to adjust a substantially vertical position of the base pole assembly 52 slightly toward the tree 20 or slightly away from the tree 20 depending upon the physical structure of the tree 20.

Referring to FIGS. 3, 4 and 20, the second receiving plate 222 includes an aperture 240 extending therethrough and grooves 242, 244 extending from a top end of the second receiving plate 222 into the second receiving plate 222. The aperture 240 is provided to receive a threaded attachment pin 120 (shown in FIG. 5) therethrough for rotatably coupling the base pole assembly 52 to the base member 50. In particular, the aperture 240 defines first and second lobe portions 246, 247 (shown in FIG. 3) which each may receive the threaded attachment pin 122 therein. Thus, the threaded attachment pin 120 (shown in FIG. 4) extends through the first receiving plate 221, the tubular base pole 280, and the second receiving plate 222 to rotatably couple the tubular base pole 280 to the base member 50.

Referring to FIGS. 3 and 9, the grooves 242, 244 are utilized to receive the safety pin 284 (shown in FIG. 9) therein for holding the base pole assembly 52 at a substantially vertical position. When the safety pin 284 is disposed in the groove 242, the base pole assembly 52 is maintained at a first substantially vertical position. Alternately, when the safety pin 284 is disposed in the groove 244, the base pole assembly 52 is maintained at a second substantially vertical position. An advantage of the grooves 242, 244 is that the grooves allow an operator to adjust a substantially vertical position the base pole assembly 52 slightly toward the tree 20 or slightly away from the tree 20 depending upon the physical structure of the tree 20.

Referring to FIGS. 6, 9 and 21-23, the base pole assembly 52 is coupled to both the base member 50 and the first middle pole assembly 54. In particular, the base pole assembly 52 is coupled to the base member 50 utilizing the threaded attachment pin 120 and the safety pin 284 (shown in FIG. 9). Further, the base pole assembly 52 is coupled to the first middle pole assembly utilizing the bolts 171, 172 (shown in FIG. 6).

The base pole assembly 52 includes a tubular base pole 280, an insert member 282, a safety pin 284, teeth rail members 286, 288, 290 (shown in FIG. 23) that define a first plurality of teeth 292, bolts 300, 302, 304, 306, 308, 310, 312, 314, 316, a first end portion 320, and a second end portion 322. The first plurality of teeth 292 are disposed longitudinally on the tubular base pole 280. The first end portion 320 is rotatably coupled to the base member 50 such that the base pole assembly is rotatable from a first position to a substantially vertical position relative to the base member 50.

Referring to FIGS. 11, 21, 24 and 25, the tubular base pole 280 includes a first side pole wall 340, a second side pole wall 342, a front pole wall 344, and a rear pole wall 346. In an exemplary embodiment, the tubular base pole 280 is constructed of a metal such as aluminum or steel for example.

The first side pole wall 342 includes a slot 360 (shown in FIGS. 11 and 21) extending therein for receiving an end portion of the carriage assembly 140 therethrough during installation of the carriage assembly 140 to the base pole assembly 52.

The second side pole wall 340 includes a slot 362 (shown in FIG. 21) extending therein for receiving an end portion of the carriage assembly 140 therethrough during installation of the carriage assembly 140 to the base pole assembly 52.

Referring to FIGS. 24, 25, 34, and 41, the front pole wall 344 includes a first front surface 371, a second front surface 372, and a slot 373. The first front surface 371 contacts the first bottom roller member 840 (shown in FIG. 41) when the carriage assembly 140 is coupled to the base pole assembly 52. The second front surface 372 contacts the second bottom roller member 842 (shown in FIG. 41) when the carriage assembly 140 is coupled to the base pole assembly 52. The slot 373 receives the teeth rail members 286, 288, 290 (shown in FIG. 23) therein.

The rear pole wall 346 includes a first rear surface 381, a second rear surface 382, and a dove-tail slot 383. The first rear surface 381 contacts the first bottom guide member 844 (shown in FIGS. 34 and 41), the first upper roller member 824 (shown in FIG. 34) and the first upper guide member 820 (shown in FIG. 34) when the carriage assembly 140 is coupled to the base pole assembly 52. The second rear surface 382 contacts the second bottom guide member 846 (shown in FIGS. 34 and 41), the second upper roller member 826 (shown in FIG. 34) and the second upper guide member 822 (shown in FIG. 34) when the carriage assembly 140 is coupled to the base pole assembly 52. The dove-tail slot 383 receives the dove-tail portion 636 (shown in FIG. 31) of the first tree clamp 101 therein.

Figure 21:
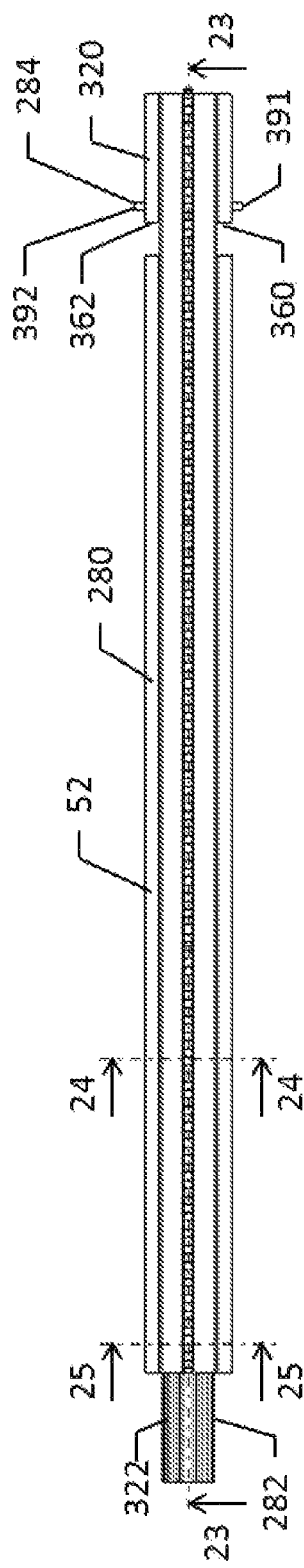
FIG. 21 is a schematic of a base pole assembly utilized in the tree stand lifting system of FIG. 1.
Figure 22:
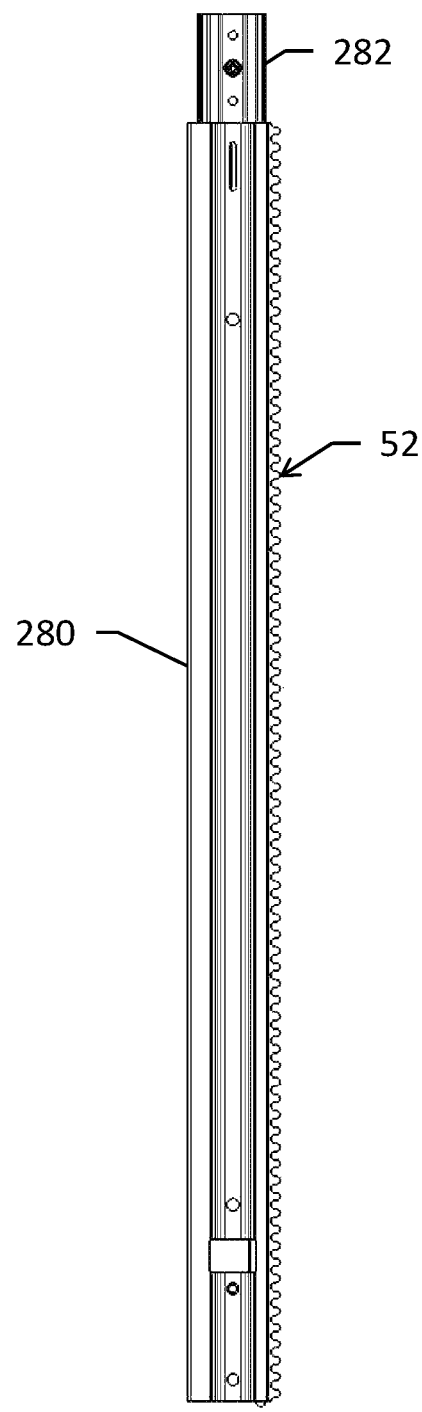
FIG. 22 is a side view of the base pole assembly of FIG. 21.
Figure 23:
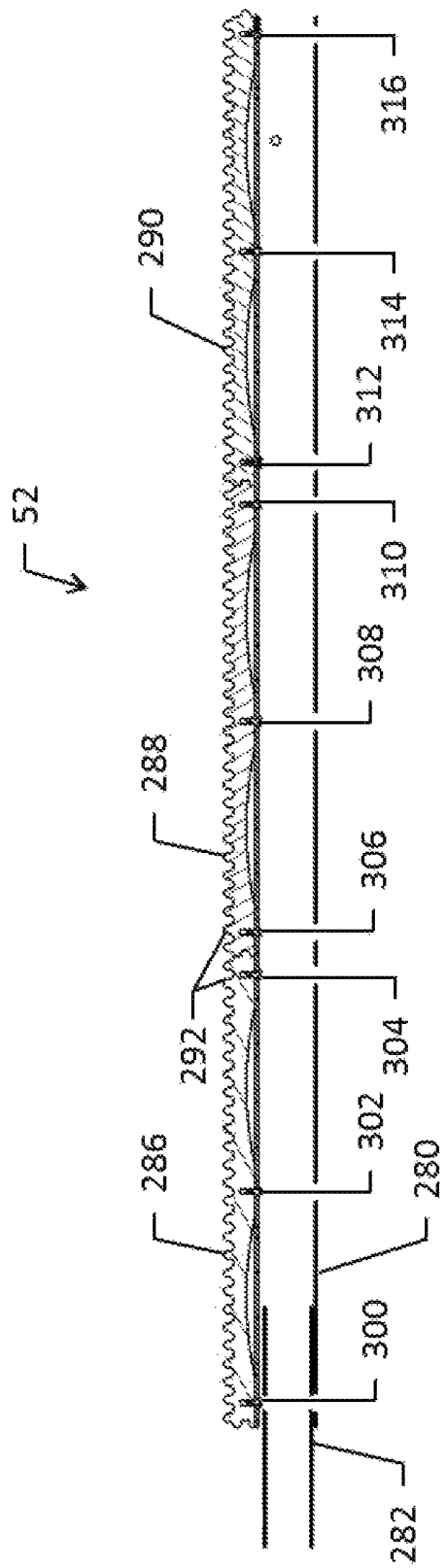
FIG. 23 is a cross-sectional view of the base pole assembly of FIG. 21 taken along lines 23-23 in FIG. 21.
Figure 25:
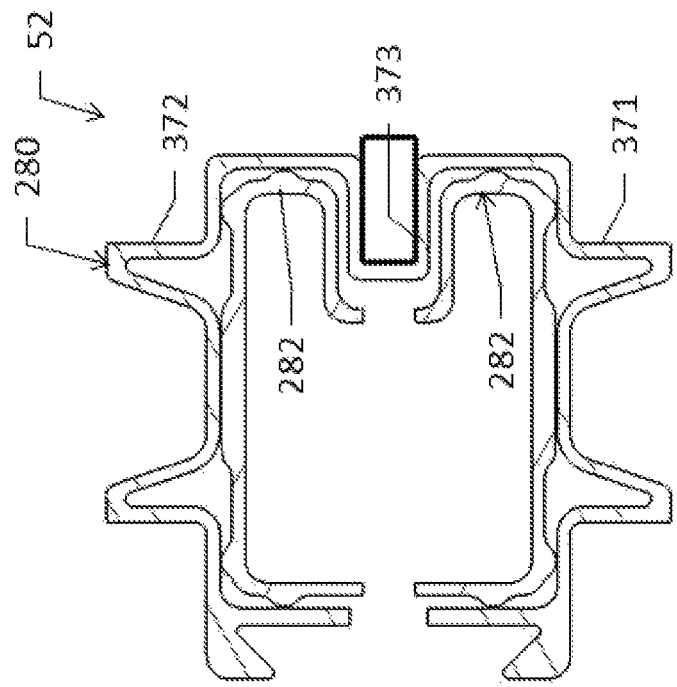
FIG. 25 is a cross-sectional view of the base pole assembly of FIG. 21 taken along lines 25-25 in FIG. 21.

Referring to FIGS. 21, 23 and 25, the insert member 282 has a portion thereof that is disposed within and coupled to an end portion of the tubular base pole 280. The insert member 282 defines the second end portion 322 of the base pole assembly 52. In an exemplary embodiment, the insert member 282 is constructed of a metal such as aluminum or steel for example.

Figure 24:
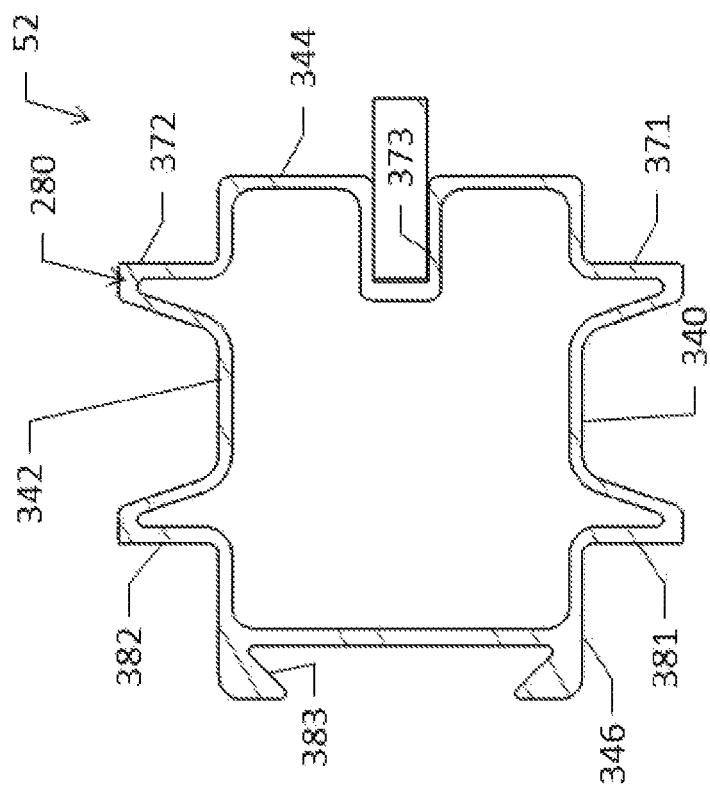
FIG. 24 is a cross-sectional view of the base pole assembly of FIG. 21 taken along lines 24-24 in FIG. 21.

Referring to FIGS. 21 and 24, the safety pin 282 is disposed proximate to the first end portion 320 of the base pole assembly 52 and is disposed below the slots 360, 362 when the base pole assembly 52 is disposed at a substantially vertical position on a tree. The safety pin 282 has first and second pin portions 391, 392 extending outwardly from the first and second side pole walls 340, 342 (shown in FIG. 24), respectively, of the tubular base pole 280. The first pin portion 391 is disposed in one of the slots 232, 234 (shown in FIG. 3) of the base member 50 to orient and lock the base pole assembly 52 in a substantially vertical position. The second pin portion 392 is disposed in one of the slots 242, 244 of the base member 50 to orient and lock the base pole assembly 52 in a substantially vertical position.

Referring to FIGS. 23 and 24, the teeth rail members 286, 288, 290 are partially disposed in the slot 373 of the tubular base pole 280. The teeth rail members 286, 288, 290 define a first plurality of teeth 292 that extend along a longitudinal length of the tubular base pole 280. The first teeth rail member 286 is coupled to the tubular base pole 280 utilizing the bolts 300, 302, 304. The second teeth rail member 288 is coupled to the tubular base pole 280 utilizing the bolts 306, 308, 310. The third teeth rail member 290 is coupled to the tubular base pole 280 utilizing the bolts 312, 314, 316.

In an exemplary embodiment, the tubular teeth rail members 286, 288, 290 are each constructed of a metal such as aluminum or steel for example.

Figure 6:
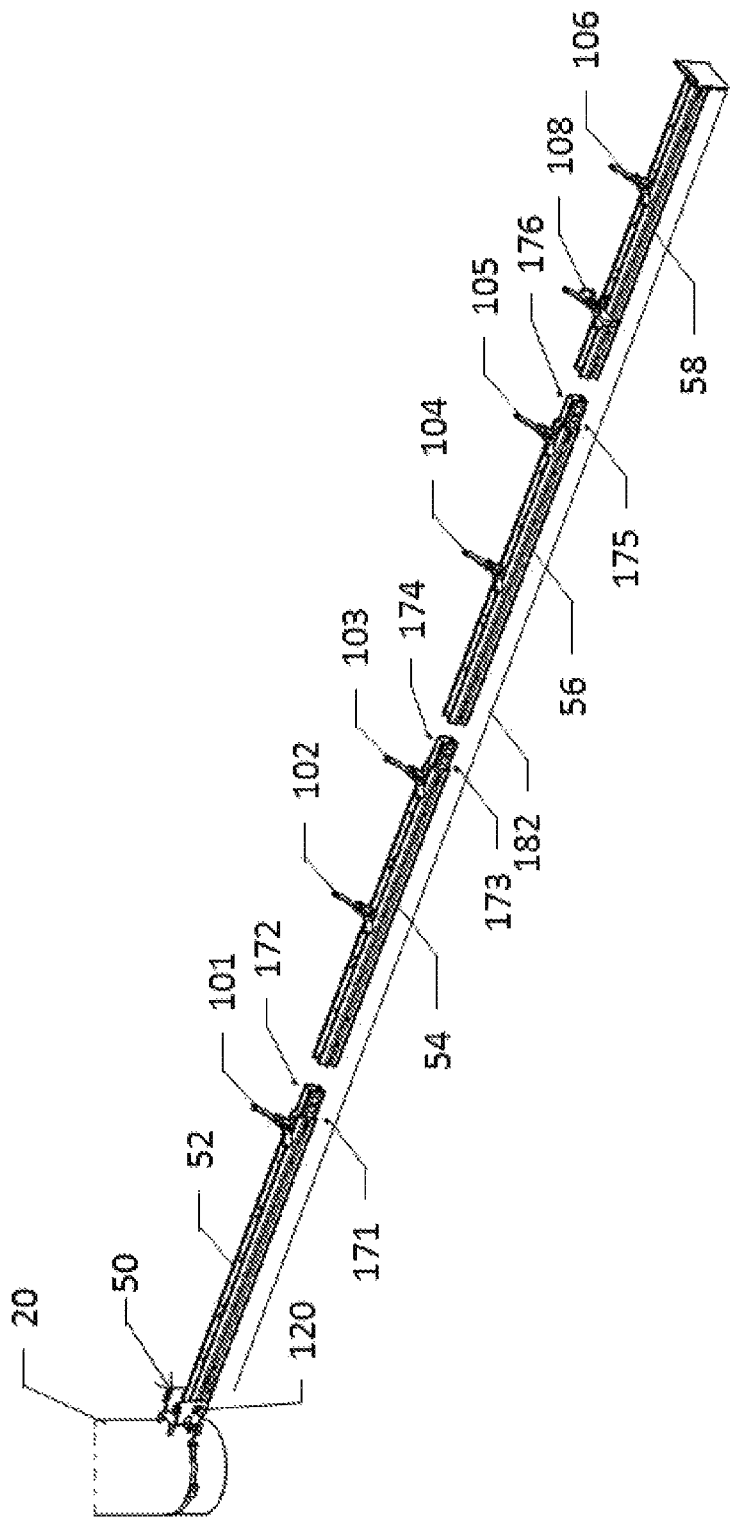
FIG. 6 is a schematic of the base member, the base pole assembly, a first middle pole assembly, a second middle pole assembly, a top pole assembly, and first, second, third, fourth, fifth, sixth, tree clamps, and a docking station clamp.
Figure 7:
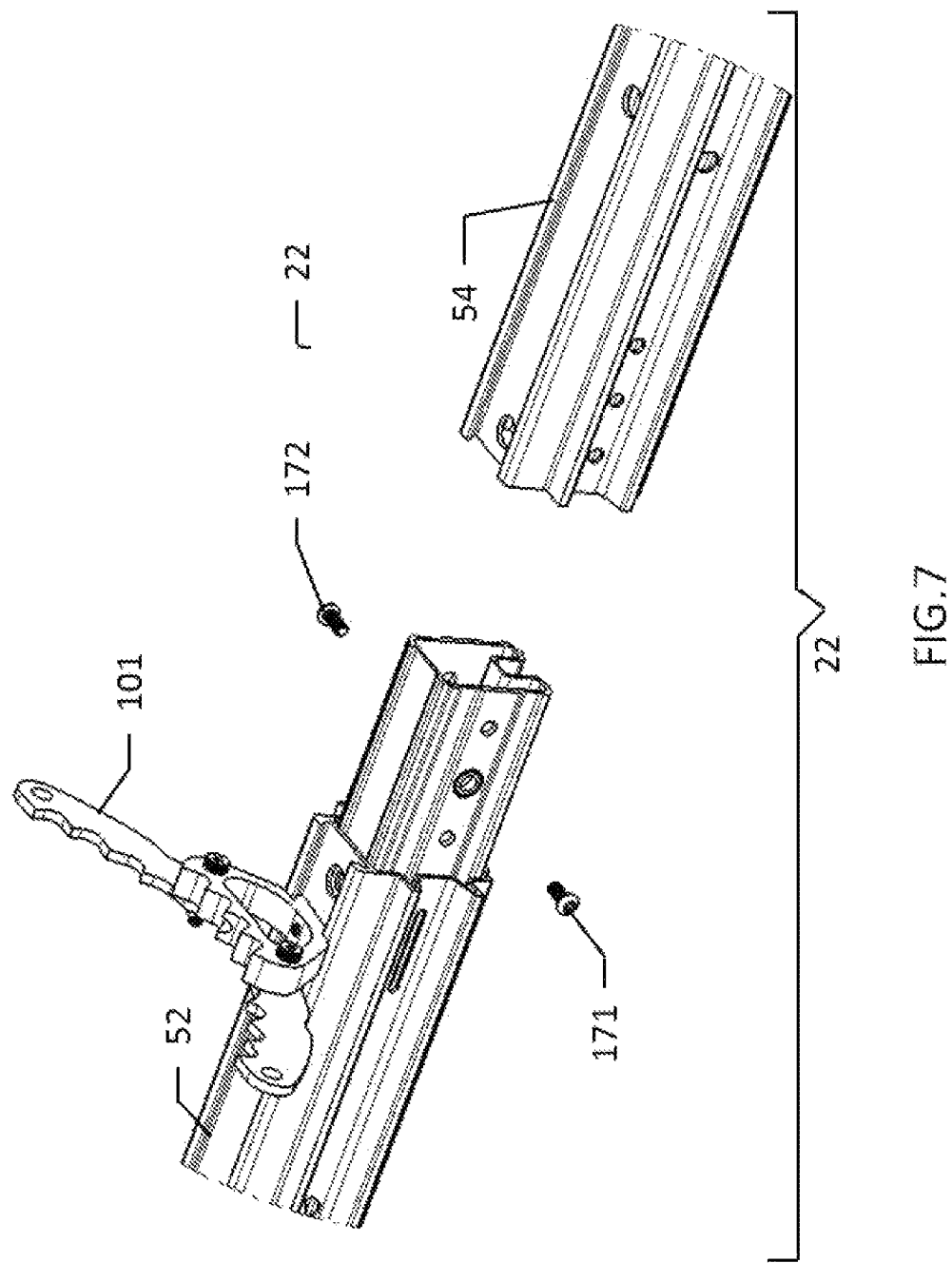
FIG. 7 is a schematic of the base pole assembly and the first middle pole assembly.
Figure 8:
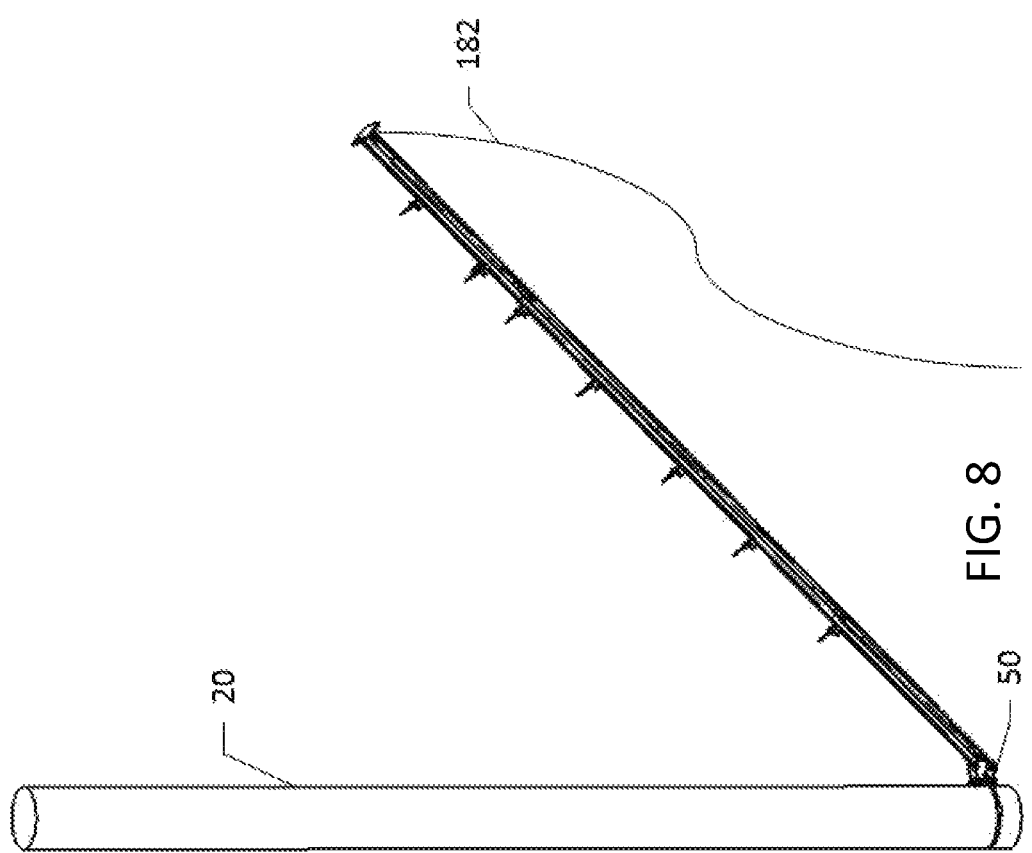
FIG. 8 is a schematic of the base pole assembly, the first and second middle pole assemblies, and the top pole assembly being rotated upwardly about the base member.

Referring to FIGS. 6 and 26, the first middle pole assembly 54 is coupled to both the base pole assembly 52 and the second middle pole assembly 56. In particular, the first middle pole assembly 54 is coupled to the base pole assembly 52 utilizing the bolts 171, 172 (shown in FIG. 6) when the insert member 282 of the base pole assembly 52 is inserted within the first end portion 440 of the first middle pole assembly 54. Further, the first middle pole assembly 54 is coupled to the second middle pole assembly 56 utilizing the bolts 173, 174 (shown in FIG. 6) when the insert member 422 of the first middle pole assembly 54 is inserted within the first end portion 490 of the first middle pole assembly 56.

The first middle pole assembly 54 includes a tubular middle pole 420, an insert member 422, teeth rail members 426, 428, 430 that define a second plurality of teeth 432, a first end portion 440, and a second portion 442. The tubular middle pole 420 has a substantially identical structure as the tubular base pole 280 of the base pole assembly 52 except that the tubular middle pole 420 does not have slots corresponding to the slots 360, 362 (shown in FIG. 21) of the base pole assembly 52. Further, the insert member 422 has an identical structure as the insert member 282 of the base pole assembly 52. Further, the teeth rail members 426, 428, 430 have an identical structure as the teeth rail members 286, 288, 290, respectively, of the base pole assembly 52. The insert member 422 has a portion thereof that is disposed within and coupled to an end portion of the tubular middle pole 420. The insert member 422 defines the second end portion 442 of the first middle pole assembly 54. The teeth rail members 426, 428, 430 are partially disposed in a slot of the tubular middle pole 420. The teeth rail members 426, 428, 430 define a second plurality of teeth 432 that extend along a longitudinal length of the tubular middle pole 420.

Referring to FIGS. 6 and 27, the second middle pole assembly 56 is coupled to both the first middle pole assembly 54 and the top pole assembly 58. In particular, the second middle pole assembly 56 is coupled to the top pole assembly 58 utilizing the bolts 175, 176 (shown in FIG. 6) when the insert member 272 of the second middle pole assembly 56 is inserted within the first end portion 540 of the top pole assembly 58. The second middle pole assembly 56 includes a tubular middle pole 470, an insert member 472, teeth rail members 476, 478, 480 that define a third plurality of teeth 482, a first end portion 490, and a second portion 492. The tubular middle pole 470 has a substantially identical structure as the tubular base pole 280 of the base pole assembly 52 except that the tubular middle pole 470 does not have slots corresponding to the slots 360, 362 (shown in FIG. 21) of the base pole assembly 52. Further, the insert member 472 has an identical structure as the insert member 282 of the base pole assembly 52. Further, the teeth rail members 476, 478, 480 have an identical structure as the teeth rail members 286, 288, 290, respectively, of the base pole assembly 52. The insert member 472 has a portion thereof that is disposed within and coupled to an end portion of the tubular middle pole 470. The insert member 472 defines the second end portion 492 of the second middle pole assembly 56. The teeth rail members 476, 478, 480 are partially disposed in a slot of the tubular middle pole 470. The teeth rail members 476, 478, 480 define a third plurality of teeth 482 that extend along a longitudinal length of the tubular middle pole 470.

Figure 28:
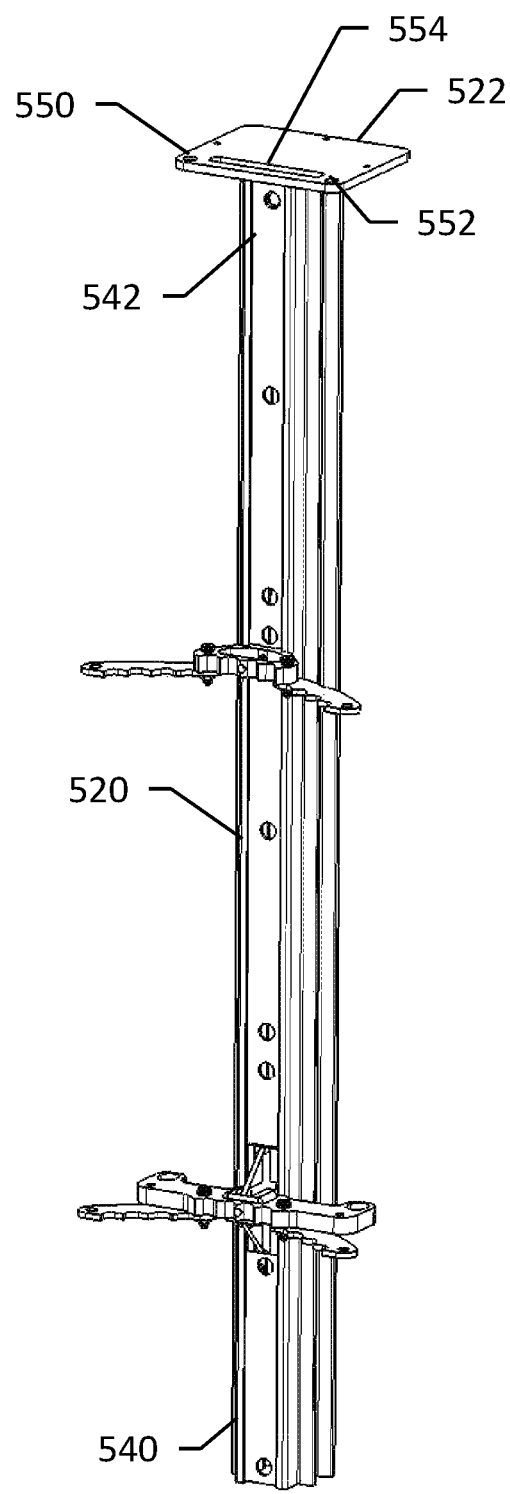
FIG. 28 is a schematic of a top pole assembly having a docking station clamp and a tree clamp attached thereto, utilized in the tree stand lifting system of FIG. 1.
Figure 29:
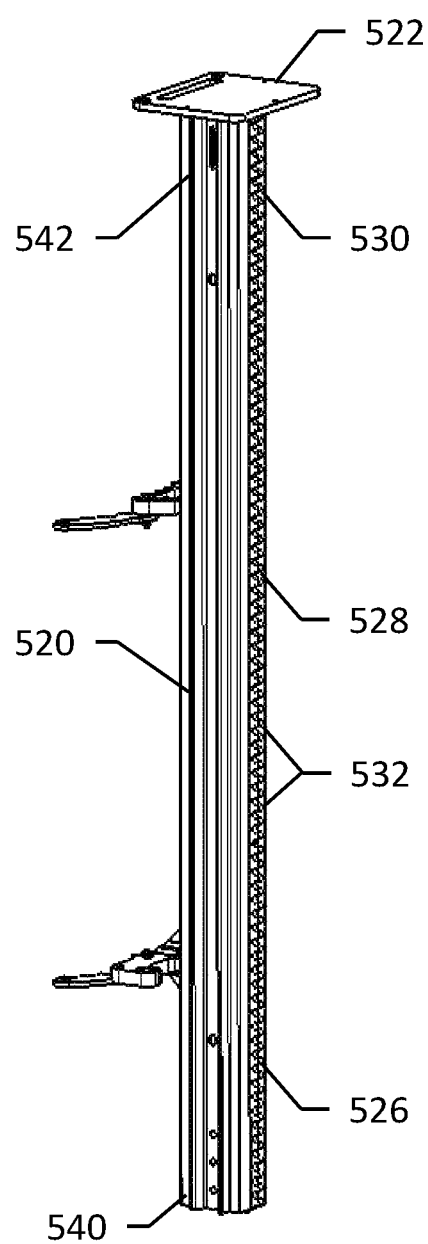
FIG. 29 is another schematic of the top pole assembly, the docking station clamp, and the tree clamp of FIG. 28.

Referring to FIGS. 6, 28, and 29, the top pole assembly 58 is coupled to the second middle pole assembly 56 utilizing the bolts 175, 176 (shown in FIG. 6).

The top pole assembly 58 includes a tubular top pole 520, a top plate 522, teeth rail members 526, 528, 530 that define a fourth plurality of teeth 532, a first end portion 540, and a second portion 542. The tubular top pole 520 has a substantially identical structure as the tubular base pole 280 of the base pole assembly 52 except that the tubular top pole 520 does not have slots corresponding to slots 360, 362 (shown in FIG. 21) of the base pole assembly 52. Further, the teeth rail members 526, 528, 530 have an identical structure as the teeth rail members 286, 288, 290, respectively, of the base pole assembly 52. The teeth rail members 526, 528, 530 are partially disposed in a slot of the tubular middle pole 520. The teeth rail members 526, 528, 530 define a fourth plurality of teeth 532 that extend along a longitudinal length of the tubular middle pole 520. The top plate 522 is coupled to the second end portion 542 and includes apertures 550, 552 and a slot 554 extending therethrough. A safety life line 182 (shown in FIG. 1) is tied to the top plate 522 utilizing the slot 554 (shown in FIG. 28). The ninth strap assembly 89 (shown in FIG. 1) is coupled the top plate 522 utilizing the apertures 550, 552 to couple the top pole assembly 58 to the tree 20.

Figure 5:
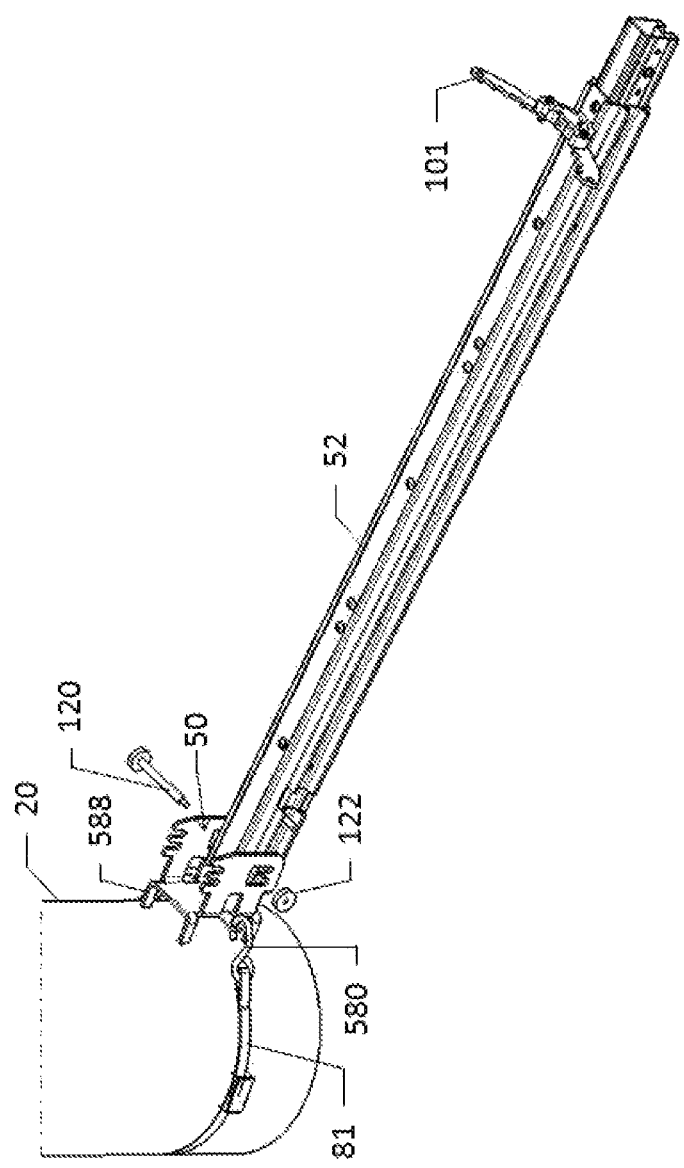
FIG. 5 is a schematic of the base member, the base pole assembly, and a first tree clamp.

Referring to FIGS. 1, 3, and 5, the first strap assembly 81 is utilized to couple the base member 50 to the tree 20. The first strap assembly 81 includes a first s-hook 580, a first strap portion 582, a gripping member 584, a second strap portion 586, and a second s-hook 588. The first strap portion 582 extends from the gripping member 584 and further extends through an eye portion of the first s-hook 580 and then returns to the gripping member 584. The second strap portion 586 extends from the gripping member 584 to an eye portion of the second s-hook 582 and is coupled to the second s-hook 582. During installation, the first s-hook 580 coupled to the first coupling tab 211 (shown in FIG. 3) of the base member 50, and the second as hook 588 is coupled to the second coupling tab 212 (shown in FIG. 20) to couple the first strap assembly 81 to the base member 50.

Figure 30:
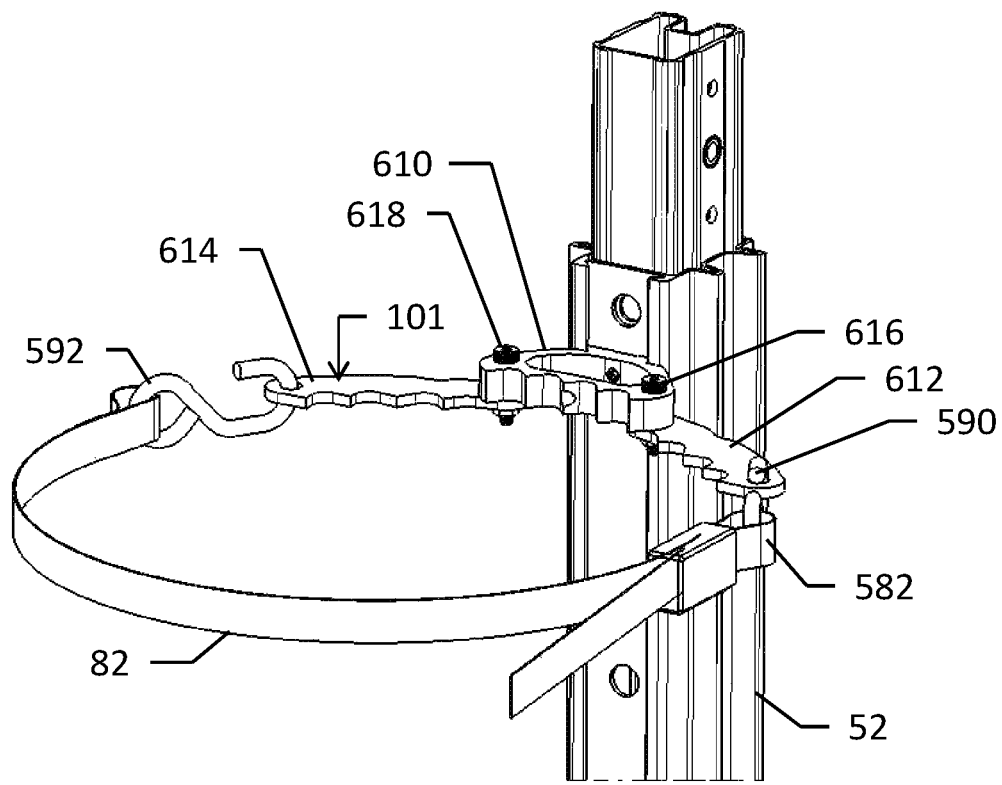
FIG. 30 is a schematic of the base pole assembly, a tree clamp, coupled to the base pole assembly, and a strap assembly coupled to the tree clamp.

Referring to FIGS. 1 and 30, the second strap assembly 82 is utilized to couple the first tree clamp 101 to the tree 20. The first tree clamp 101 is further coupled to the base pole assembly 52. The second strap assembly 82 has an identical structure as the first strap assembly 81. The second strap assembly 82 has first and second s-hooks 590, 592 that are coupled to first and second blade members 612, 614 of the first tree clamp 101.

Referring to FIGS. 1, 6, 30, and 31, the first tree clamp 101 is coupled to the base pole assembly 52 and the first tree clamp 101 is utilized to contact an exterior surface 44 of the tree 20. The second strap assembly 82 extends around the exterior surface 44 of the tree 20 and is coupled to the first tree clamp 101 to hold the base pole assembly 52 at a fixed position relative to the tree 20.

Figure 31:
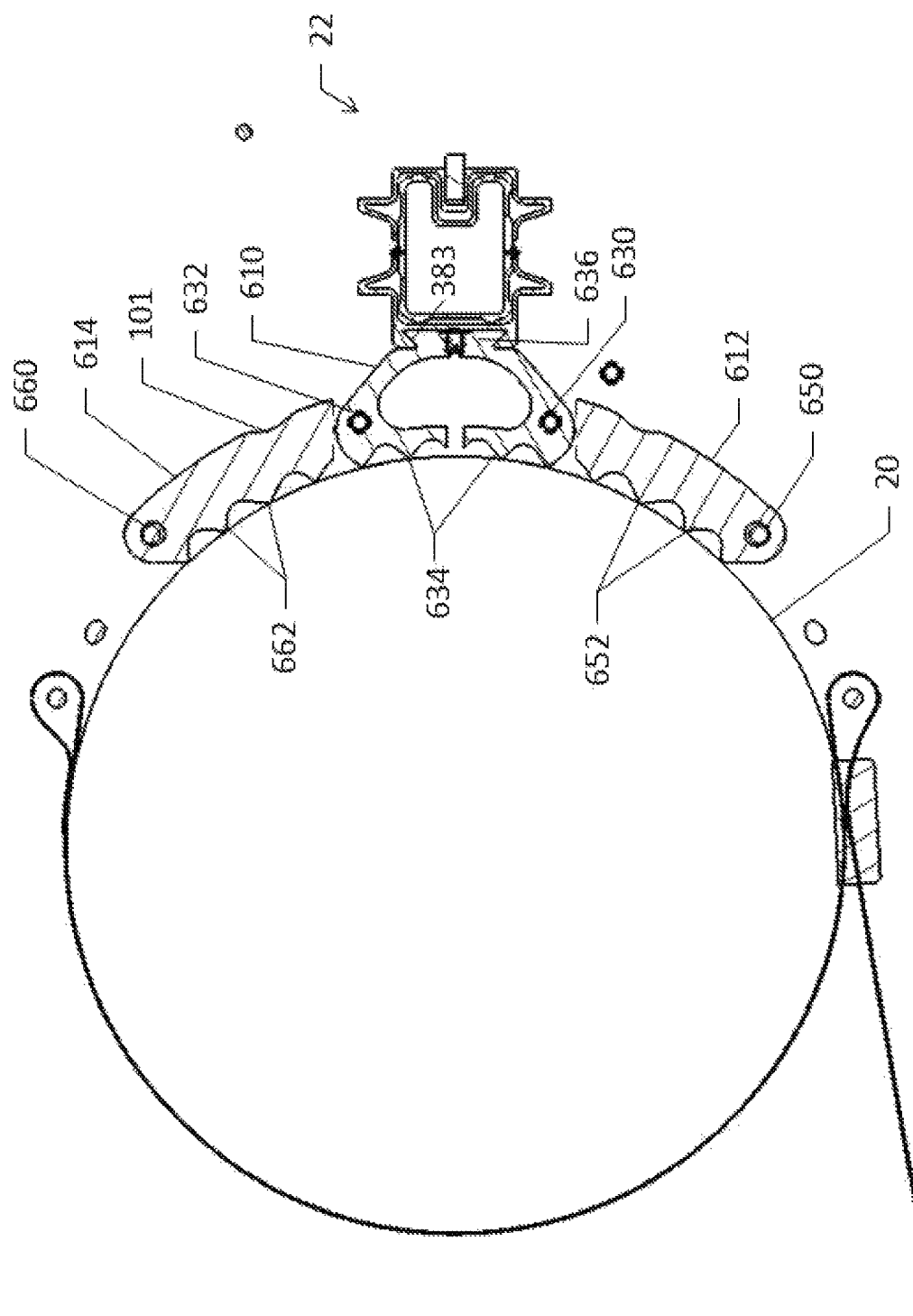
FIG. 31 is a cross-sectional schematic of the base pole assembly, the tree clamp, and the strap assembly of FIG. 31 when the tree clamp is disposed against a tree.

Referring to FIGS. 30 and 31, the first tree clamp 101 includes a hub member 610, first and second blade members 612, 614, and threaded bolts 616, 618. The first and second blade members, 612, 614 are rotatably coupled to first and second end portions 630, 632, respectively, of the hub member 610 utilizing the threaded bolts 616, 618. In an exemplary embodiment, the components of the first tree clamp 101 are constructed of a metal such as steel or aluminum for example.

The hub member 610 includes the first end portion 630, the second end portion 632, a plurality of hub teeth 634, and a dove-tail portion 636. The plurality of hub teeth 634 are provided to contact the exterior surface 44 of the tree 20. The dove-tail portion 636 is utilized to be received in a dove-tail slot 383 (shown in FIG. 24) of the base pole assembly 52.

The first blade member 612 has an aperture 650 extending therethrough and a plurality of blade teeth 652. The plurality of blade teeth 652 are provided to contact an exterior surface 44 of the tree 20. The aperture 650 receives a portion of the s-hook 590 (shown in FIG. 30) therein.

The second blade member 614 has an aperture 660 extending therethrough and a plurality of blade teeth 662. The plurality of blade teeth 662 are provided to contact the exterior surface 44 of the tree 20. The aperture 660 receives a portion of the second s-hook 592 therein.

Referring to FIG. 1, the third strap assembly 83 is utilized to couple the second tree clamp 102 to the tree 20. The second tree clamp 102 is further coupled to the first middle pole assembly 54, and has an identical structure as the first tree clamp 101. The third strap assembly 83 has an identical structure as the first strap assembly 81. The third strap assembly 83 has first and second s-hooks that are coupled to first and second blade members, respectively, of the second tree clamp 102.

The fourth strap assembly 84 is utilized to couple the third tree clamp 103 to the tree 20. The third tree clamp 103 is further coupled to the first middle pole assembly 54, and has an identical structure as the first tree clamp 101. The fourth strap assembly 84 has an identical structure as the first strap assembly 81. The fourth strap assembly 84 has first and second s-hooks that are coupled to first and second blade members, respectively, of the third tree clamp 103.

The fifth strap assembly 85 is utilized to couple the fourth tree clamp 104 to the tree 20. The fourth tree clamp 104 is further coupled to the second middle pole assembly 56, and has an identical structure as the first tree clamp 101. The fifth strap assembly 85 has an identical structure as the first strap assembly 81. The fifth strap assembly 85 has first and second s-hooks that are coupled to first and second blade members, respectively, of the fourth tree clamp 104.

The sixth strap assembly 86 is utilized to couple the fifth tree clamp 105 to the tree 20. The fifth tree clamp 105 is further coupled to the second middle pole assembly 56, and has an identical structure as the first tree clamp 101. The sixth strap assembly 86 has an identical structure as the first strap assembly 81. The sixth strap assembly 86 has first and second s-hooks that are coupled to first and second blade members, respectively, of the fifth tree clamp 105.

The seventh strap assembly 87 is utilized to couple the docking station clamp 108 to the tree 20. The docking station clamp 108 is further coupled to the top pole assembly 58. The seventh strap assembly 87 has an identical structure as the first strap assembly 81. The seventh strap assembly 87 has first and second s-hooks that are coupled to first and second blade members 712, 714, respectively, of the docking station clamp 108.

Figure 32:
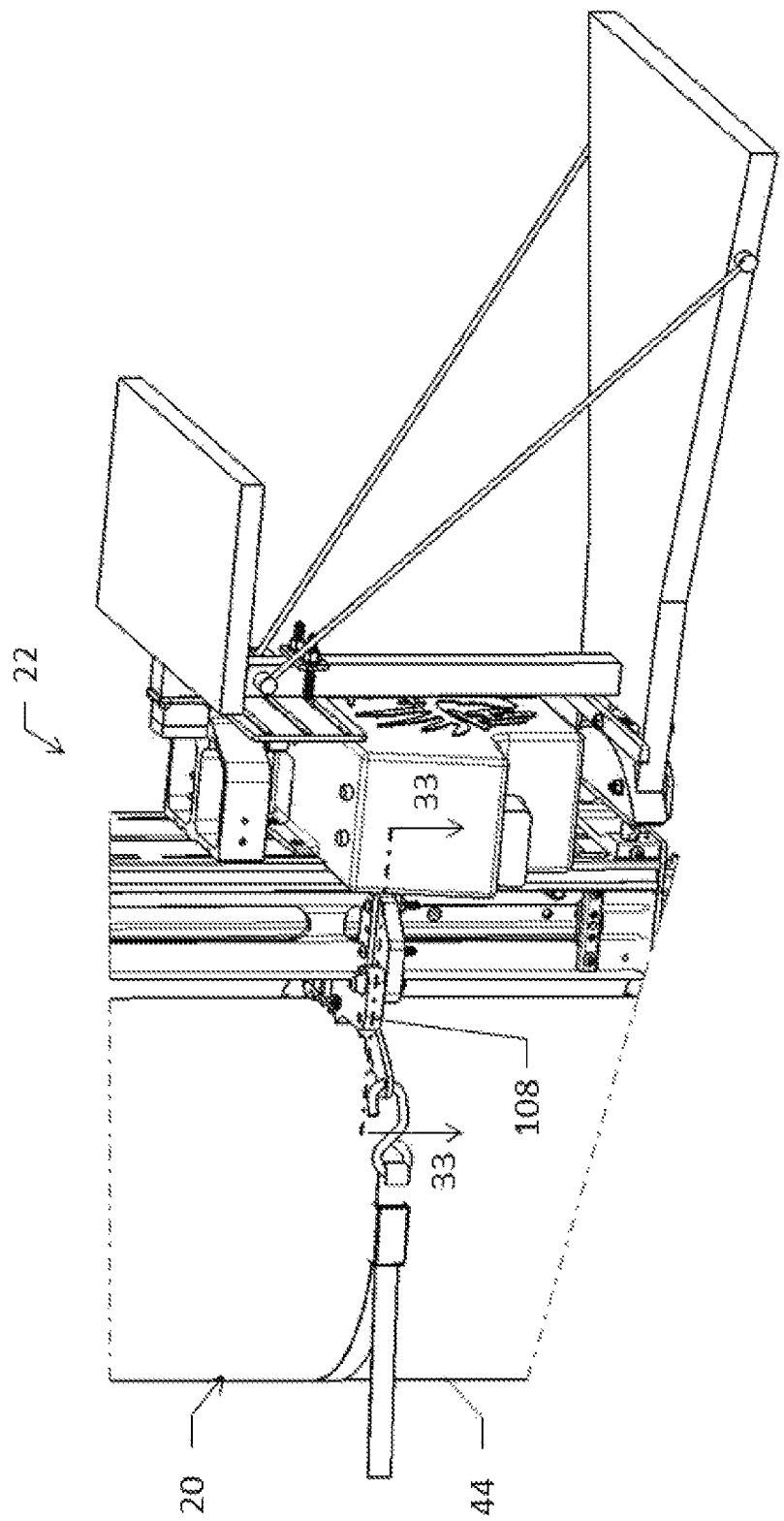
FIG. 32 is a schematic of the tree stand lifting system when first and second docking station plates contact a docking station clamp attached to a top pole assembly at a maximum desired height of the carriage assembly on the top pole assembly, and first and second docking station pins on the first and second docking station plates, respectively, engage first and second apertures in the docking station clamp.
Figure 33:
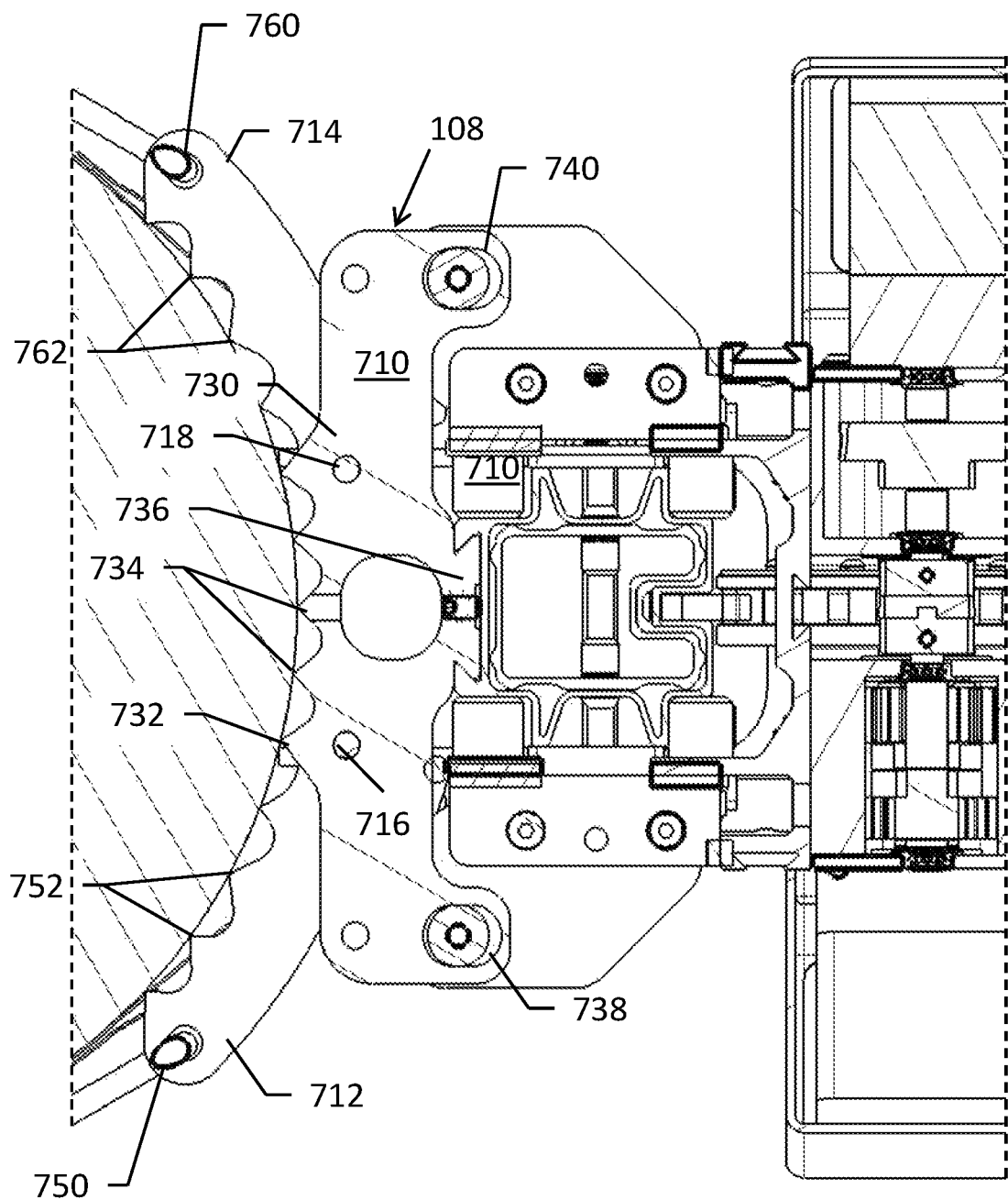
FIG. 33 is a cross-sectional schematic of the tree stand lifting system of FIG. 32 taken along lines 33-33 in FIG. 32.

Referring to FIGS. 1, 32, and 33, the docking station clamp 108 is coupled to the top pole assembly 58, and the docking station clamp 108 is utilized to contact an exterior surface 44 of the tree 20. The seventh strap assembly 87 extends around an exterior surface 44 of the tree 20 and is coupled to the docking station clamp 108 to hold the top pole assembly 58 at a fixed position relative to the tree 20.

The docking station clamp 108 includes a hub member 710, first and second blade members 712, 714, and threaded bolts 716, 718. The first and second blade members, 712, 714 are rotatably coupled to first and second end portions 730, 732, respectively, of the hub member 710 utilizing the threaded bolts 716, 718. In an exemplary embodiment, the components of the docking station clamp 108 are constructed of a metal such as steel or aluminum for example.

The hub member 710 includes the first end portion 730, the second end portion 672, a plurality of hub teeth 734, a dove-tail portion 736, and docking apertures 738, 740. The plurality of hub teeth 734 are provided to contact an exterior surface 44 of the tree 20. The dove-tail portion 736 is utilized to be received in a dove-tail slot of the top pole assembly 58. The docking aperture 738, 740 are configured to receive first and second docking station pins 952, 962 (shown in FIG. 35), respectively, on the carriage assembly 140.

The first blade member 712 has an aperture 750 extending therethrough and a plurality of blade teeth 752. The plurality of blade teeth 752 are provided to contact the exterior surface 44 of the tree 20. The aperture 750 receives a portion of the a first s-hook of the seventh strap assembly 87 therein.

The second blade member 714 has an aperture 760 extending therethrough and a plurality of blade teeth 762. The plurality of blade teeth 762 are provided to contact the exterior surface 44 of the tree 20. The aperture 760 receives a portion of the a second s-hook of the seventh strap assembly 87 therein.

The eighth strap assembly 88 is utilized to couple the sixth tree clamp 106 to the tree 20. The sixth tree clamp 106 is further coupled to the top pole assembly 58, and has an identical structure as the first tree clamp 101. The eighth strap assembly 88 has an identical structure as the first strap assembly 81. The eighth strap assembly 88 has first and second s-hooks that are coupled to first and second blade members, respectively, of the sixth tree clamp 106.

Referring to FIGS. 1, 28 and 29, the ninth strap assembly 89 is utilized to couple the top plate 522 of the top pole assembly 58 to the tree 20. The ninth strap assembly 89 has an identical structure as the first strap assembly 81. The ninth strap assembly 89 has first and second s-hooks that extend through first and second apertures 550, 552 (shown in FIG. 28) of the top plate 522 to couple the ninth strap assembly 89 to the top plate 522.

Referring to FIGS. 11 and 34-37, the carriage assembly 140 is configured to be removably coupled to the base pole assembly 52 and to slidably move upwardly and downwardly on the base pole assembly 52, the first middle pole assembly 54, the second middle pole assembly 56, and the top pole assembly 58. The carriage assembly 140 is further coupled to the electric drive unit 150, the upper stud bracket 160, and the lower stand bracket 170.

The carriage assembly 140 includes a front carriage wall 792, a first side carriage wall 794, a second side carriage wall 796, first and second accessory tab portions 798, 800, first and second docking brackets 802, 804, first and second upper guide members 820, 822, first and second upper roller members 824, 826, first and second bottom roller members 840, 842, first and second bottom guide members 844, 846, first and second accessory holder blocks 870, 872, an adjustable tensioner 890, a fixed tensioner plate 892, upper Teflon guide blocks 920, 922, lower Teflon guide blocks 924, 926, an adjustable tensioner 930, a fixed tensioner plate 932, a first docking station plate 950, a first docking station pin 952, a second docking station plate 960, and a second docking station pin 962.

Figure 36:
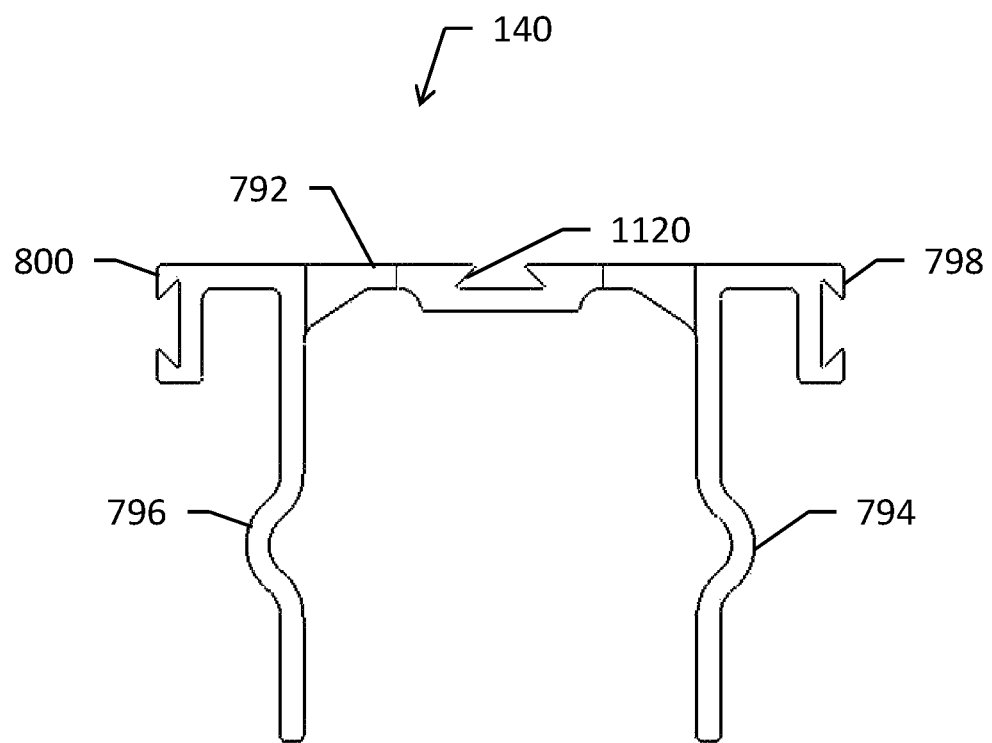
FIG. 36 is a cross-sectional view of the carriage assembly of FIG. 35 taken along lines 36-36 in FIG. 35.

Referring to FIG. 36, the first and second side carriage walls 794, 796 are coupled to the front carriage wall 792 and extend outwardly in a first direction from the front carriage wall 792.

Figure 37:
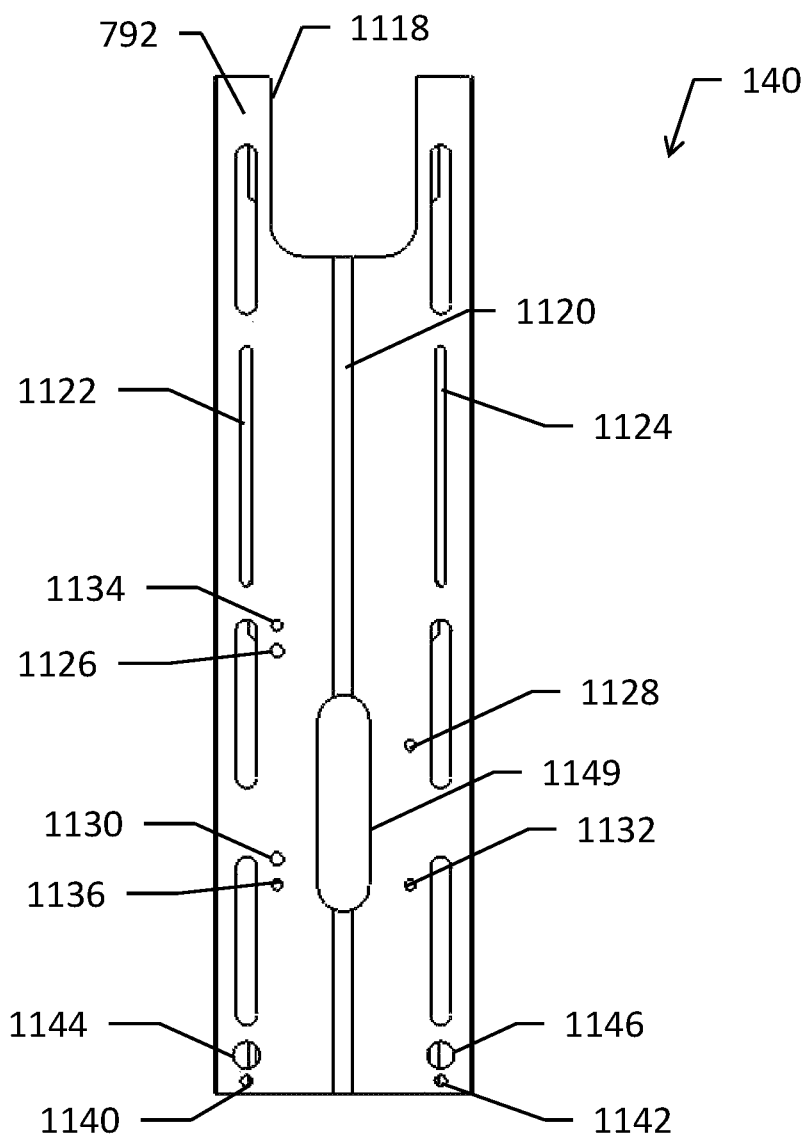
FIG. 37 is a schematic of a front carriage wall of the carriage assembly of FIG. 34.
Figure 43:
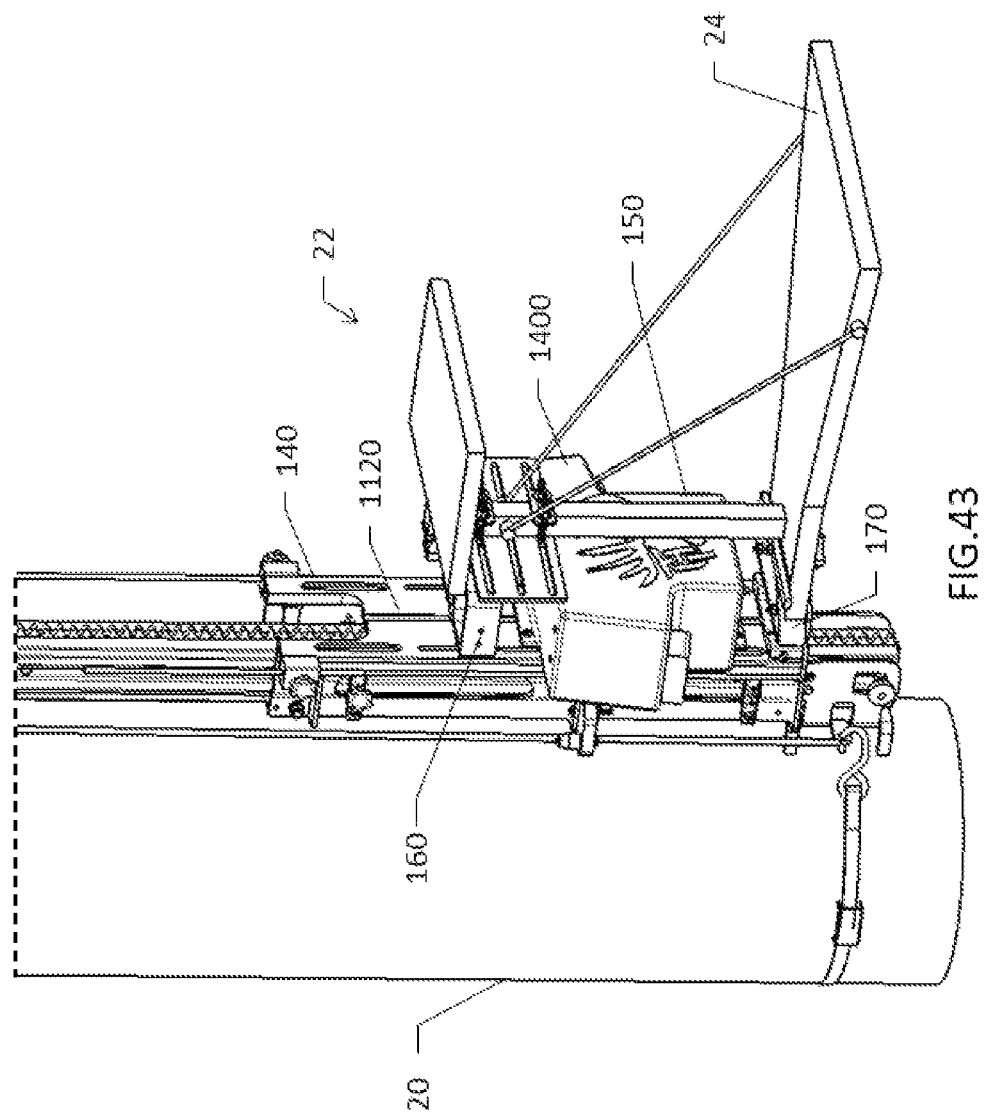
FIG. 43 is a schematic of the tree stand lifting system coupled to the base pole assembly which is further coupled to the tree.

Referring to FIGS. 36, 37, and 43, the front carriage wall 792 includes an upper slot 1118, a dove-tail slot 1120, first and second upper stand bracket slots 1122, 1124, first, second, third, fourth electric drive unit threaded apertures 1126, 1128, 1130, 1132, first and second electric drive unit locator apertures 1134, 1136, first and second lower stand bracket threaded apertures 1140, 1142, first and second lower stand bracket locator apertures 1144, 1146, and a main gear aperture 1149 extending therethrough.

Figure 51:
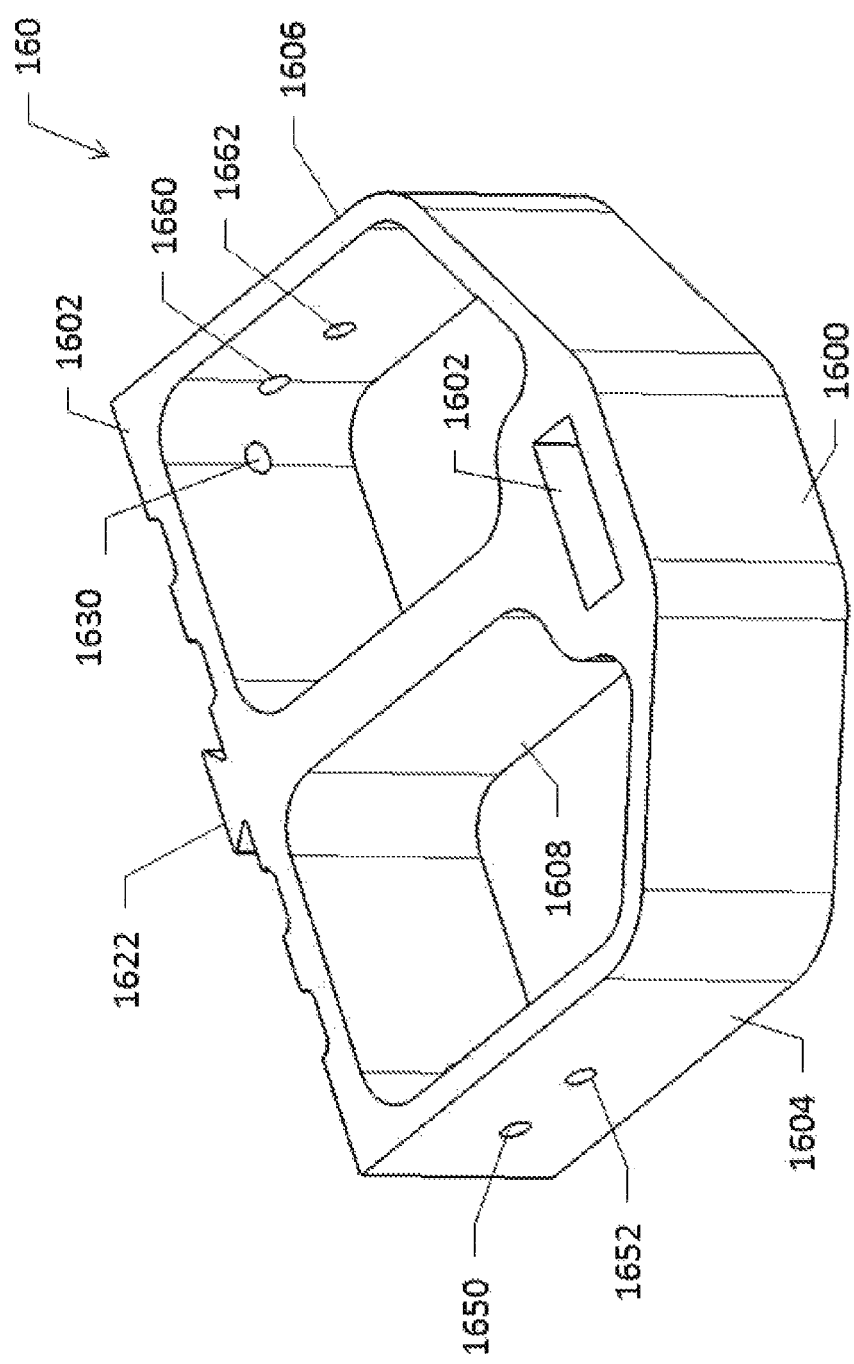
FIG. 51 is a schematic of an upper stand bracket utilized in the tree stand lifting system of FIG. 1.
Figure 52:
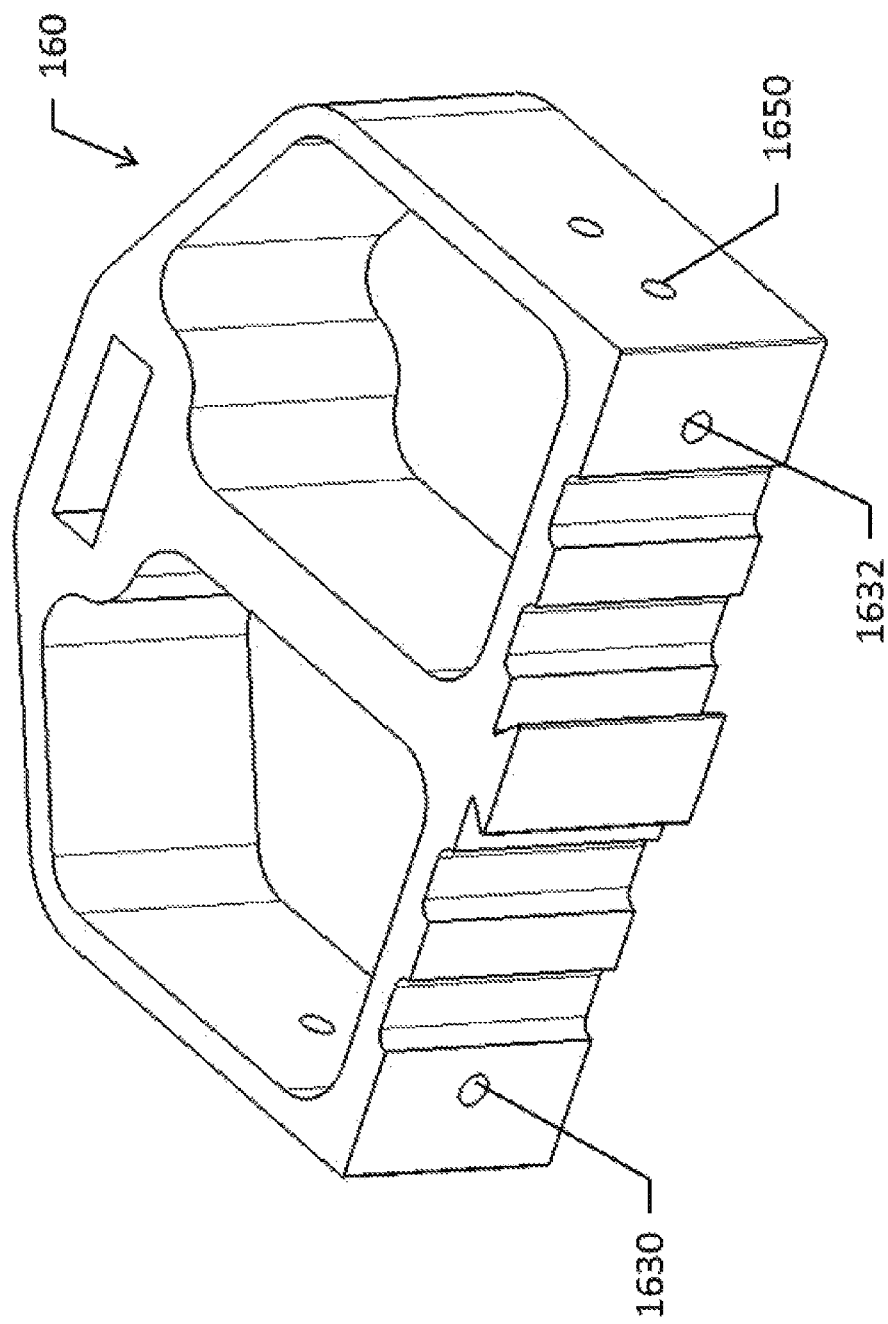
FIG. 52 is another schematic of the upper stand bracket of FIG. 51.
Figure 53:
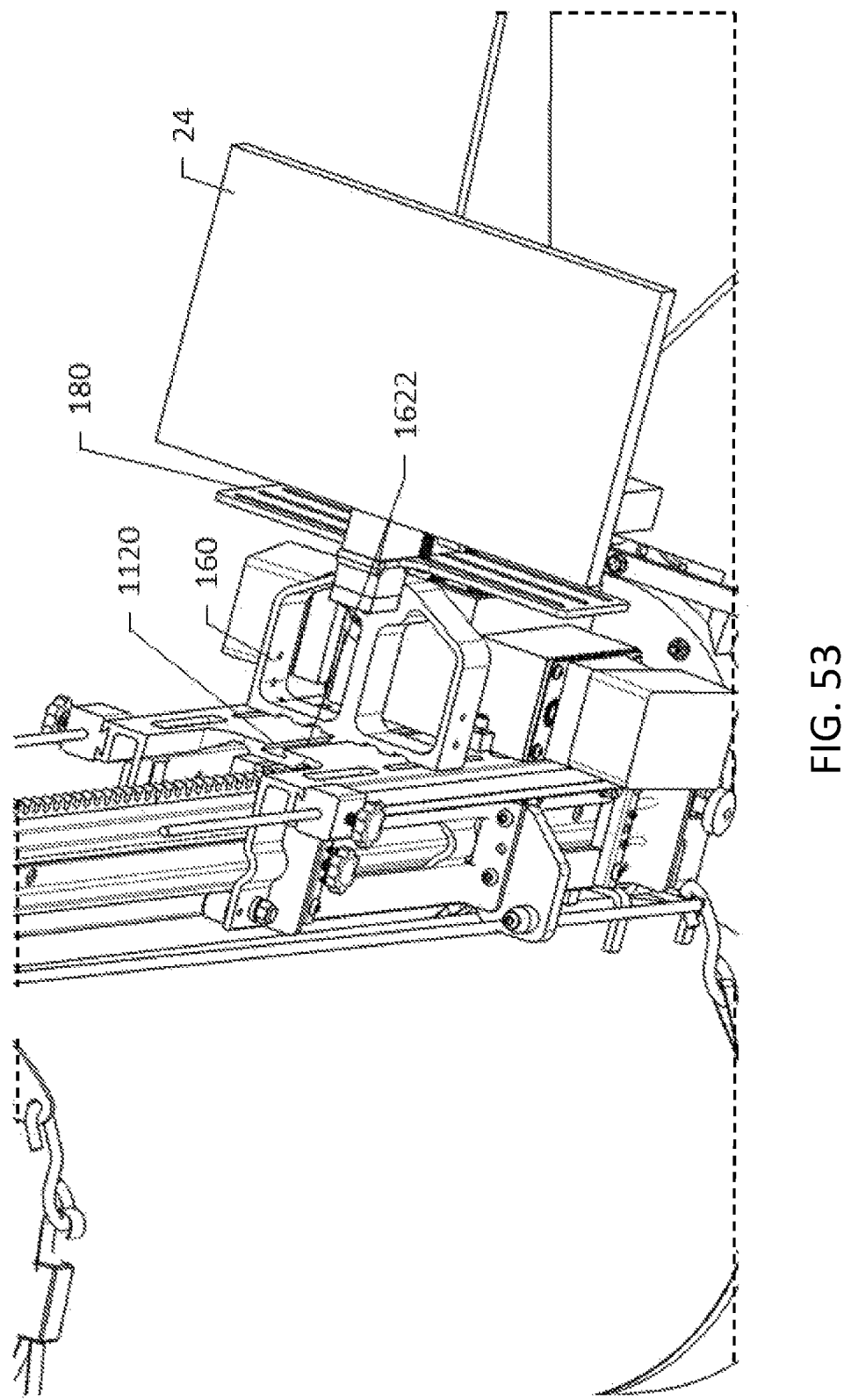
FIG. 53 is a schematic of the upper stand bracket being utilized to couple the portable tree stand to the carriage assembly.
Figure 55:
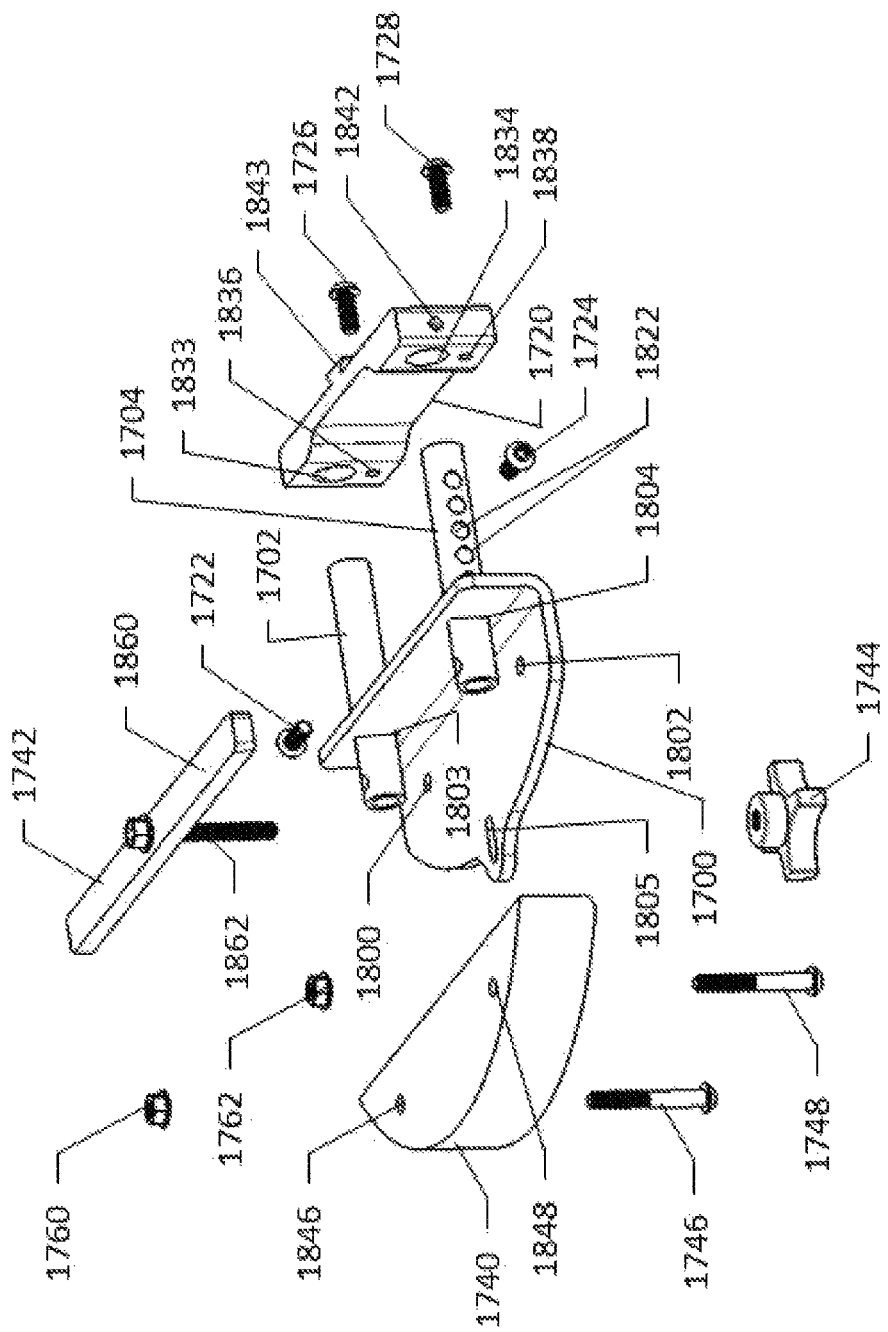
FIG. 55 is an exploded view of the lower stand bracket of FIG. 54.
Figure 56:
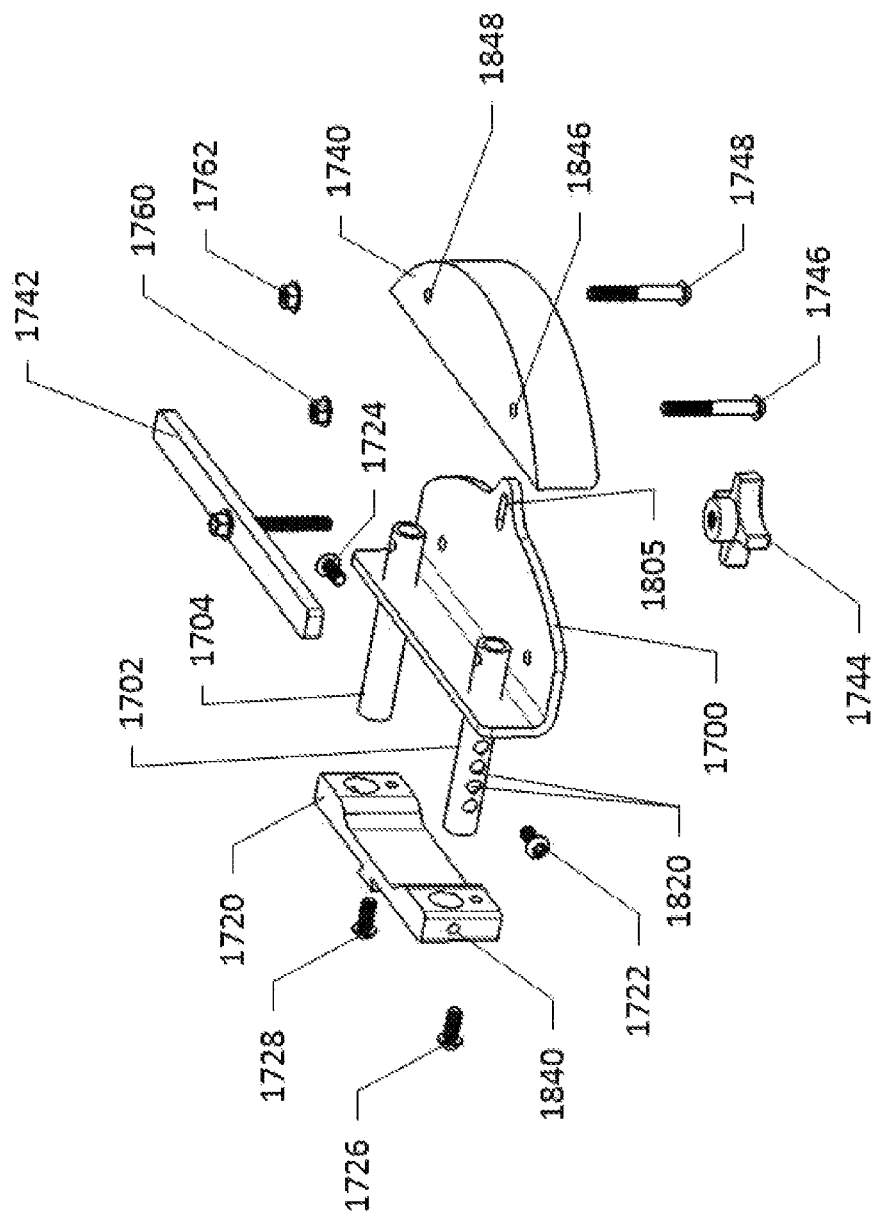
FIG. 56 is another exploded view of the lower stand bracket of FIG. 54.

The dove-tail slot 1120 extends longitudinally on the front carriage wall 792. The dove-tail slot 1120 is provided to allow the upper stand bracket 160 (shown in FIG. 43) and the lower stand bracket 170 to be slidably coupled to the front carriage wall 792. In particular, the dove-tail slot 1120 receives a dove-tail portion 1622 (shown in FIG. 51) of the upper stand bracket 160 therein which allows the upper stand bracket 160 to be disposed at a desired position on the front carriage wall 792. A position of the upper stand bracket 160 is fixed on the front carriage wall 792 using set screws which extend through the first and second upper stand bracket slots 1122, 1124 and into the apertures 1632, 1630 (shown in FIG. 52), respectively in the upper stand bracket 160. Further, the dove-tail slot 1120 receives a dove-tail portion 1843 (shown in FIG. 55) of the lower stand bracket 170 therein which allows the lower stand bracket 170 to be disposed at a desired position on the front carriage wall 792. A position of the lower stand bracket 170 is fixed on the front carriage wall 792 using bolts 1726, 1728 (shown in FIG. 55) which extend through the first and second lower stand bracket threaded apertures 1140, 1142 (shown in FIG. 37) and into the apertures 1836, 1838 (shown in FIG. 55) of the lower stand bracket 170. The adjustment tubes 1702, 1704 (shown in FIG. 55) of the lower stand bracket 170 extend through the first and second lower stand bracket locator apertures 1144, 1146, respectively.

The first, second, third, fourth electric drive unit threaded apertures 1126, 1128, 1130, 1132 receive bolts therein for coupling the gear box 1402 (shown in FIG. 43) to the front carriage wall 792.

The first and second electric drive unit locator apertures 1134, 1136 receive tabs on the electric drive unit 150 which allow the electric drive unit 150 to be disposed at a desired position on the front carriage wall 792.

Figure 44:
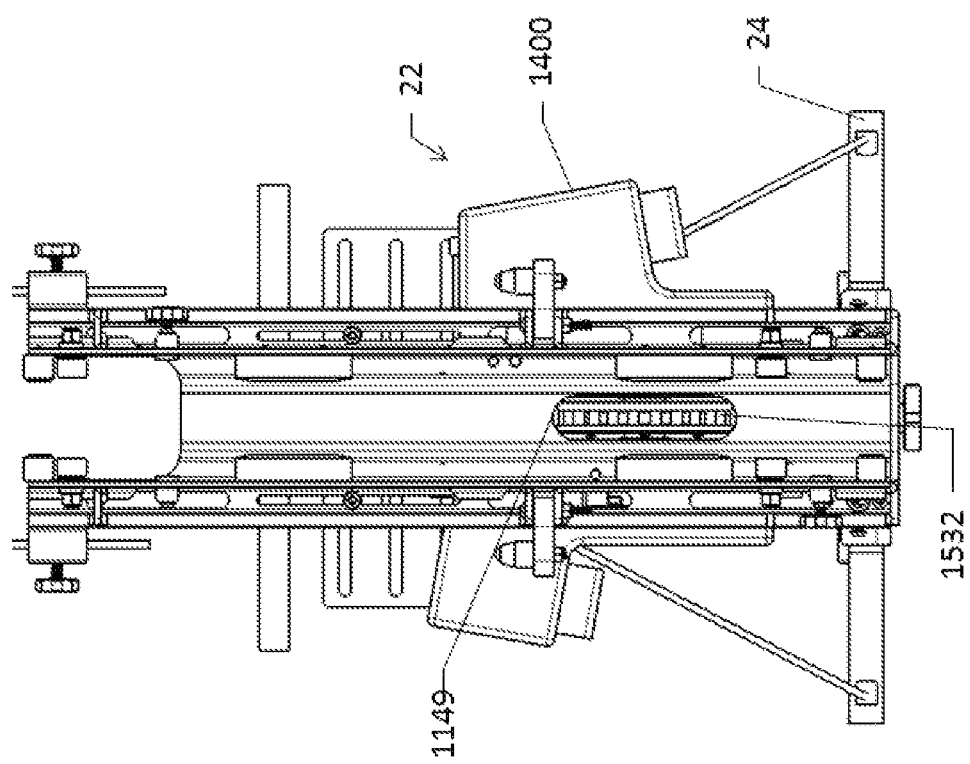
FIG. 44 is a rear view of the carriage assembly and an electric drive unit illustrating a main drive gear of the electric drive unit.
Figure 45:
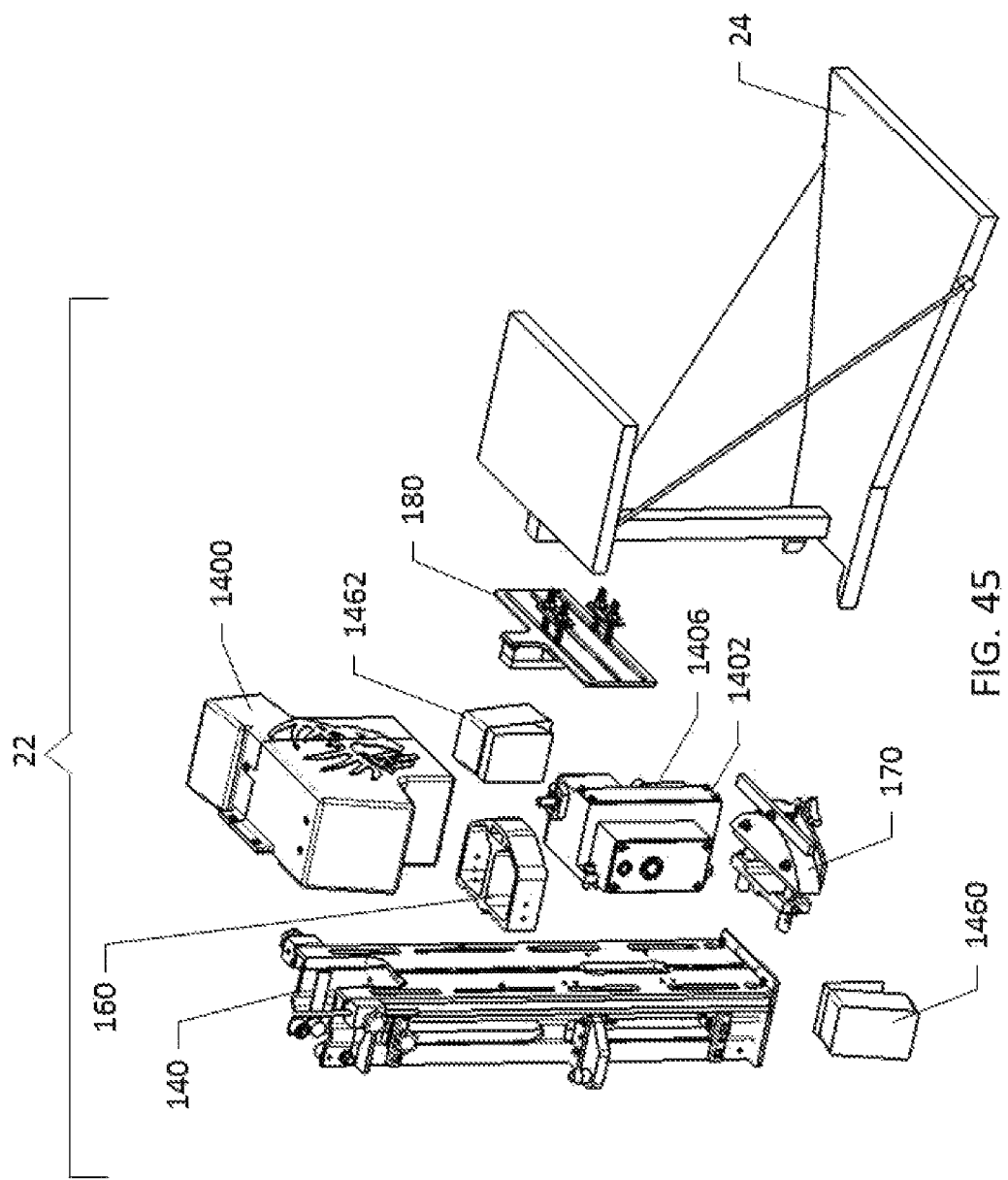
FIG. 45 is an exploded view of a portion of the tree stand lifting system and a tree stand wherein the tree stand lifting system includes a carriage assembly, first and second batteries, a housing of an electric drive unit, a gearbox of the electric drive unit, an electric motor coupled to the gear box, an upper stand bracket, a lower stand bracket, and a tree stand coupler assembly.
Figure 46:
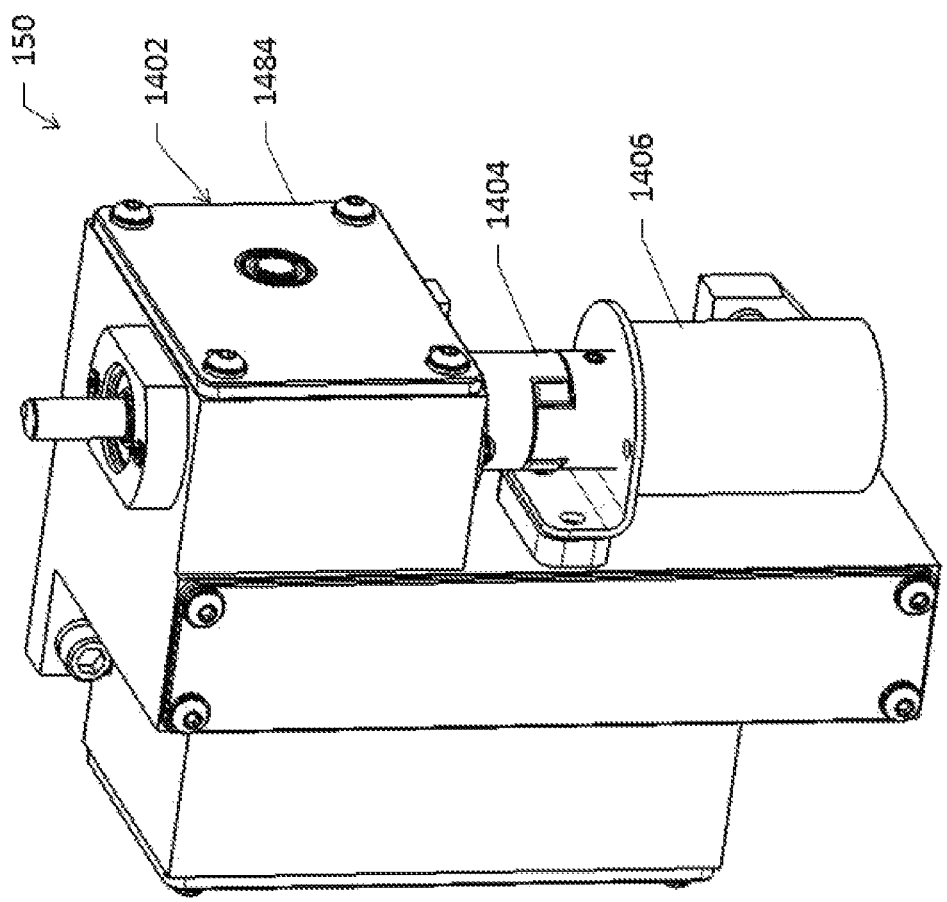
FIG. 46 is a schematic of the gearbox and the electric motor of FIG. 45.

Referring to FIGS. 37 and 44, the main drive gear aperture 1149 in the front carriage wall 794 is sized and shaped to receive a portion of the main drive gear 1149 therethrough.

Figure 34:
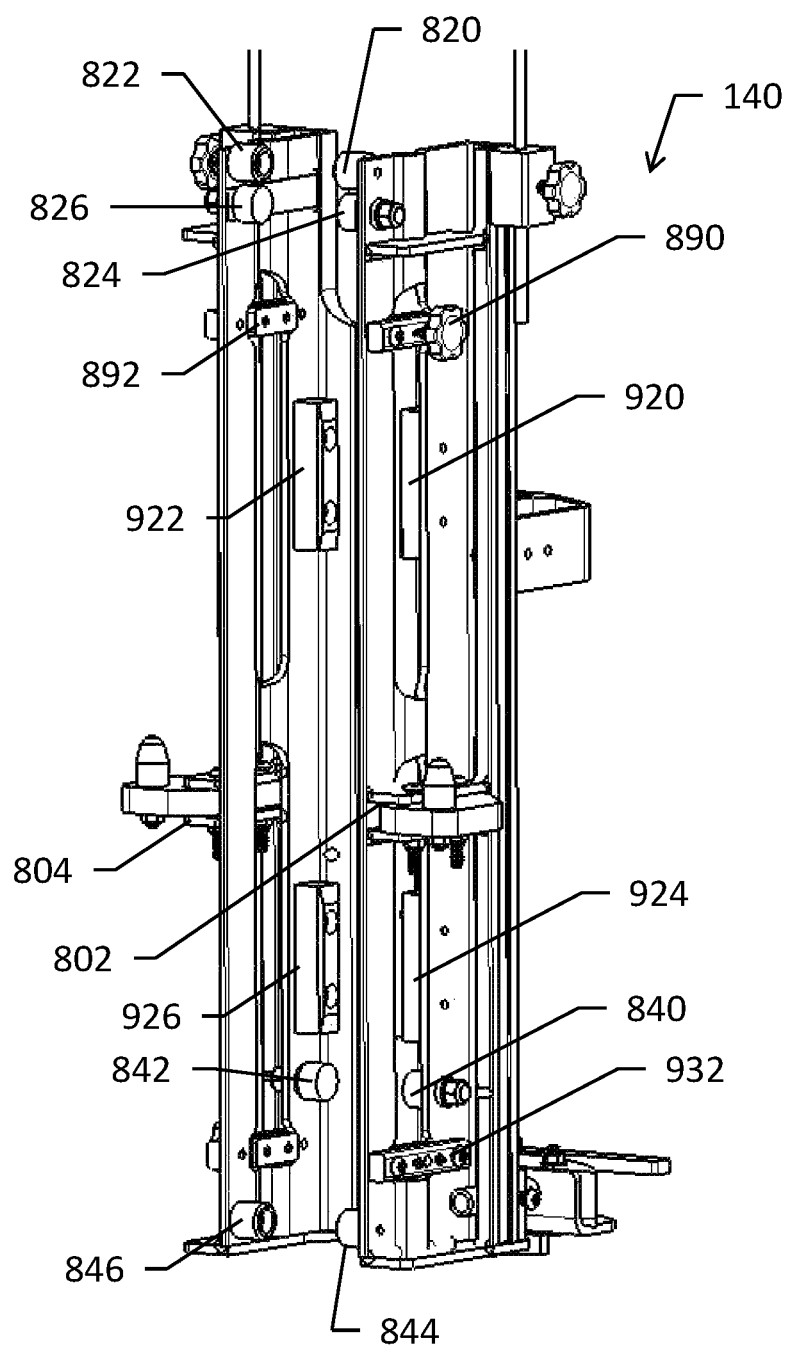
FIG. 34 is a schematic of a carriage assembly utilized in the tree stand lifting system of FIG. 1.
Figure 35:
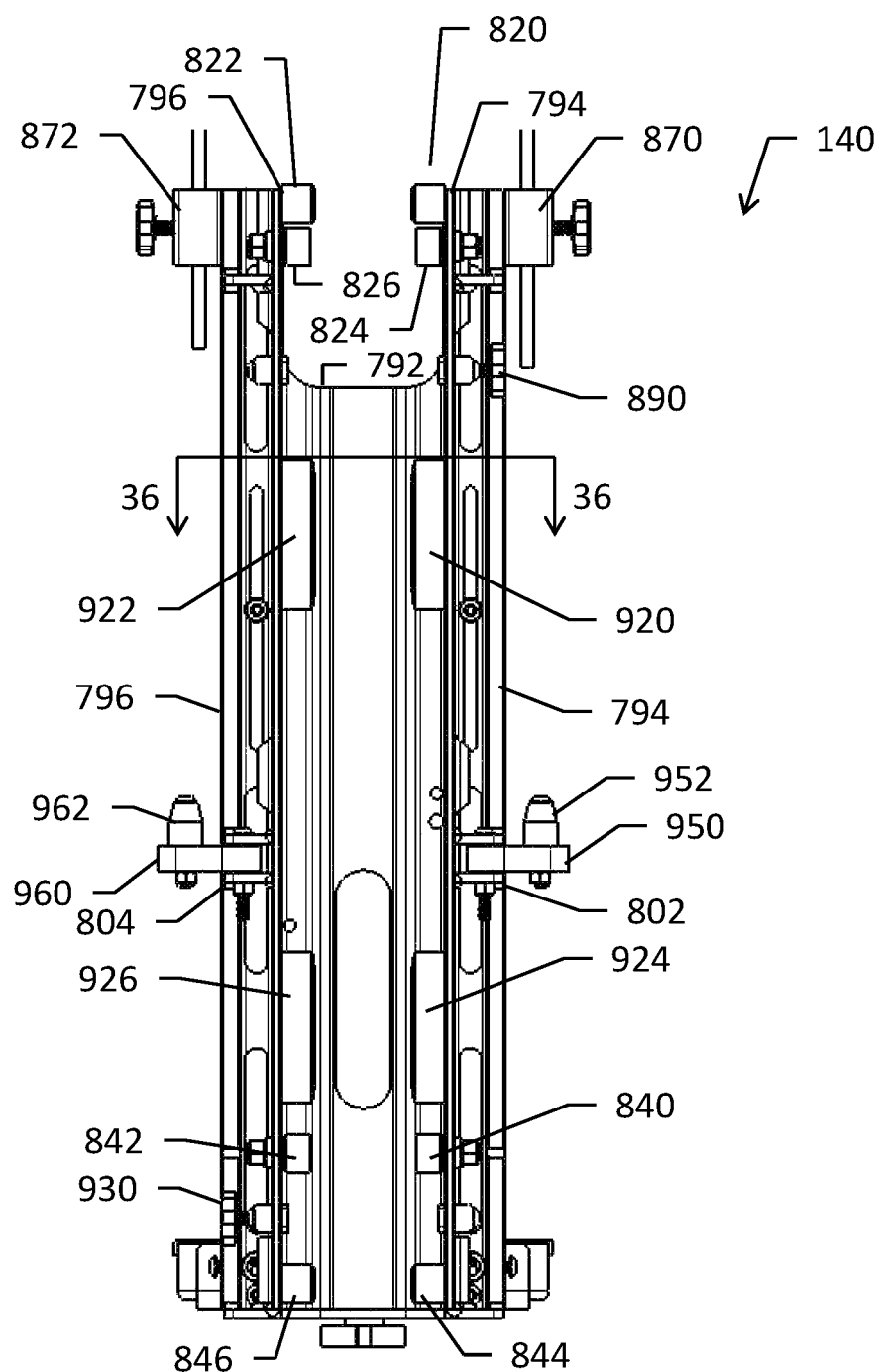
FIG. 35 is a rear view of the carriage assembly of FIG. 34.
Figure 38:
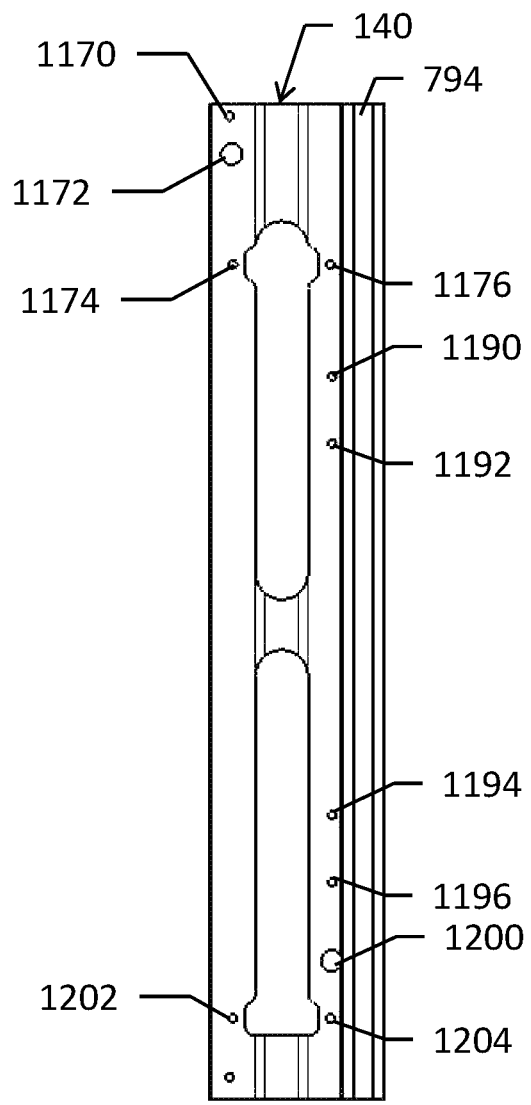
FIG. 38 is a schematic of a first side carriage wall of the carriage assembly of FIG. 34.

Referring to FIGS. 34, 35, and 38, the first side carriage wall 794 includes a first upper guide member aperture 1170, a first upper guide roller aperture 1172, first and second adjustable tensioner apertures 1174, 1176, first, second, third, fourth Teflon block apertures 1190, 1192, 1194, 1196, a first lower guide roller aperture 1200, a first fixed tensioner aperture 1202, and a second fixed tensioner aperture 1204 extending therethrough.

The first upper guide member aperture 1170 receives a threaded bolt therethrough that is further coupled to the first upper guide member 820 for coupling the first upper guide member 820 to the first side carriage wall 794. The first upper guide member 820 extends inwardly from the first side carriage wall 794 toward the second side carriage wall 796.

The first upper guide roller aperture 1172 receives a threaded bolt therethrough that is further coupled to the first upper roller member 824 for rotatably coupling the first upper roller member 824 to the first side carriage wall 794. The first upper roller member 824 extends inwardly from the first side carriage wall 794 toward the second side carriage wall 796.

Referring to FIGS. 34 and 38, the first and second adjustable tensioner apertures 1174, 1176 receive first and second threaded bolts therethrough that is further coupled to the adjustable tensioner 890. The adjustable tensioner 890 allows the user to adjust the tension of the carriage assembly 140 on the base pole assembly 52.

The first and second Teflon block apertures 1190, 1192 receive first and second threaded bolts therethrough that is further coupled to the upper Teflon guide block 920. The upper Teflon guide block 920 extends inwardly from the first side carriage wall 794 toward the second side carriage wall 796.

The third and fourth Teflon block apertures 1194, 1196 receive first and second threaded bolts therethrough that is further coupled to the lower Teflon guide block 924. The lower Teflon guide block 924 extends inwardly from the first side carriage wall 794 toward the second side carriage wall 796.

The first lower guide roller aperture 1200 receives a threaded bolt therethrough that is further coupled to the first bottom roller member 840 for rotatably coupling the first bottom roller member 840 to the first side carriage wall 794. The first bottom roller member 840 extends inwardly from the first side carriage wall 794 toward the second side carriage wall 796.

The first and second fixed tensioner apertures 1202, 1204 receive first and second threaded bolts therethrough that is further coupled to the fixed tensioner plate 932.

Figure 39:
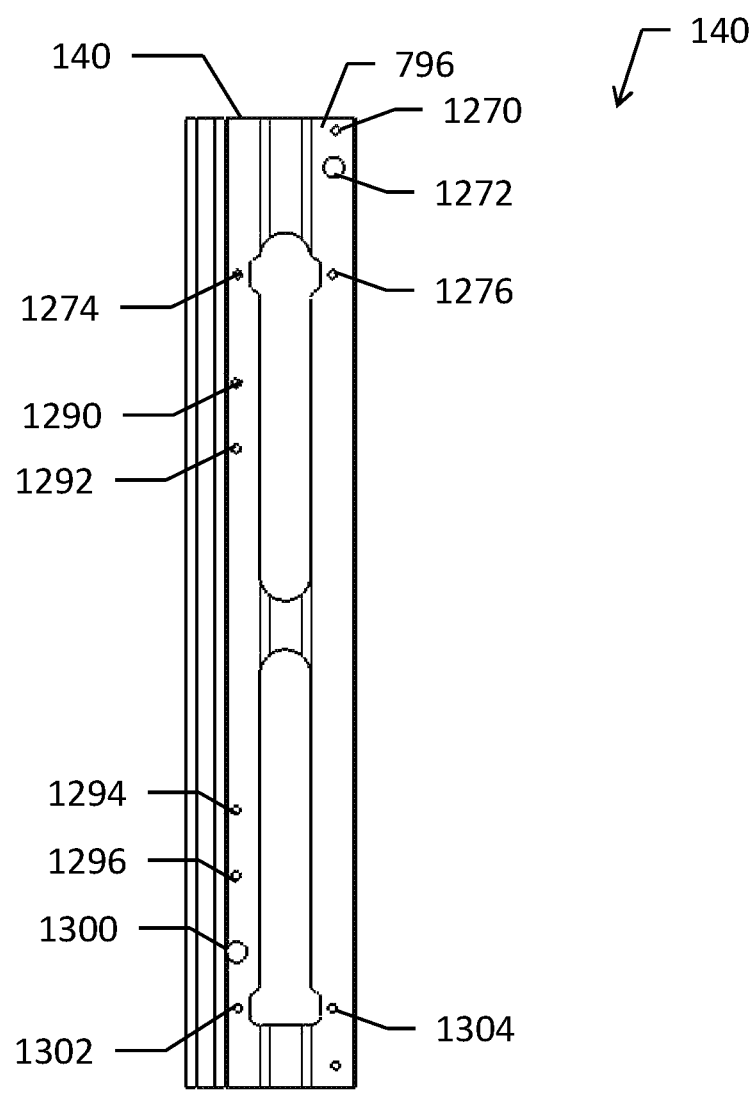
FIG. 39 is a schematic of a second side carriage wall of the carriage assembly of FIG. 34.
Figure 40:
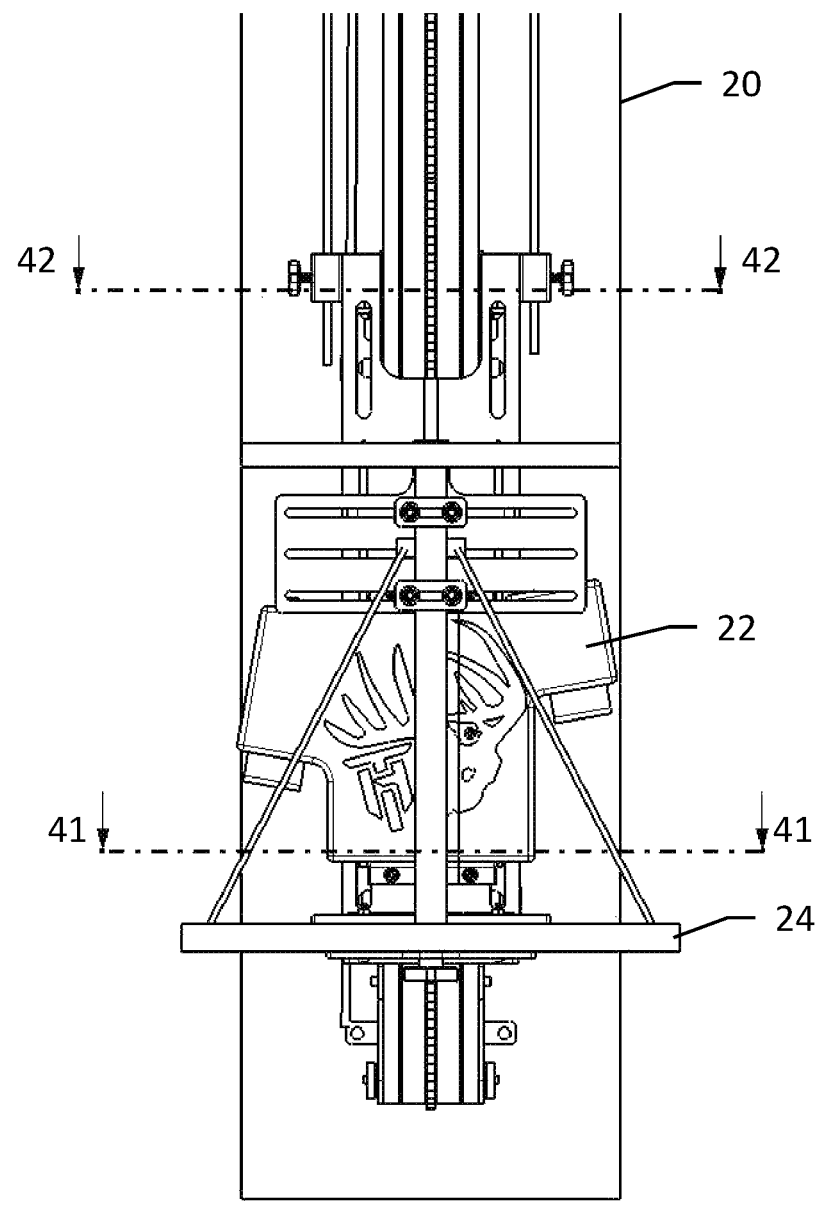
FIG. 40 is an enlarged front view of a portion of the tree stand lifting system and the tree of FIG. 1.
Figure 41:
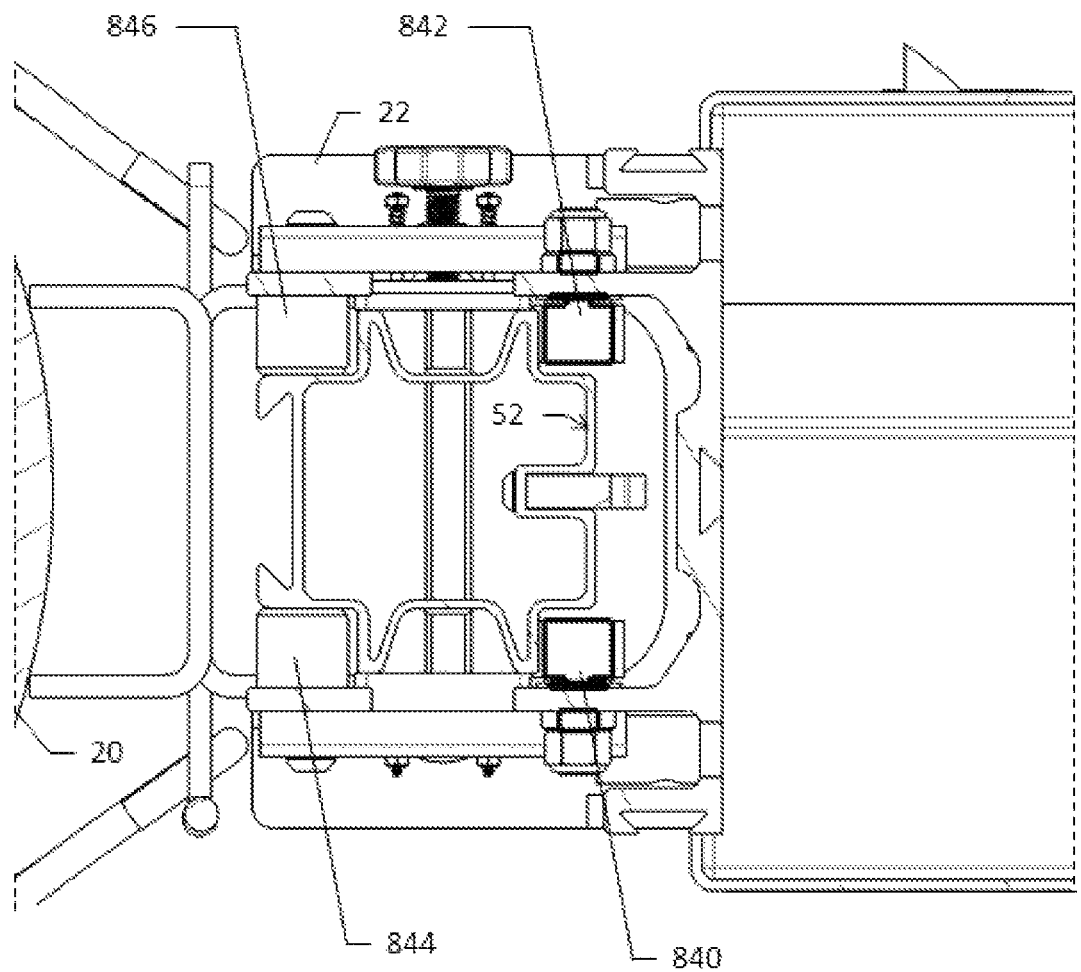
FIG. 41 is a cross-sectional view of a portion of the tree stand lifting system and the tree of FIG. 40 taken along lines 41-41 in FIG. 40.
Figure 42:
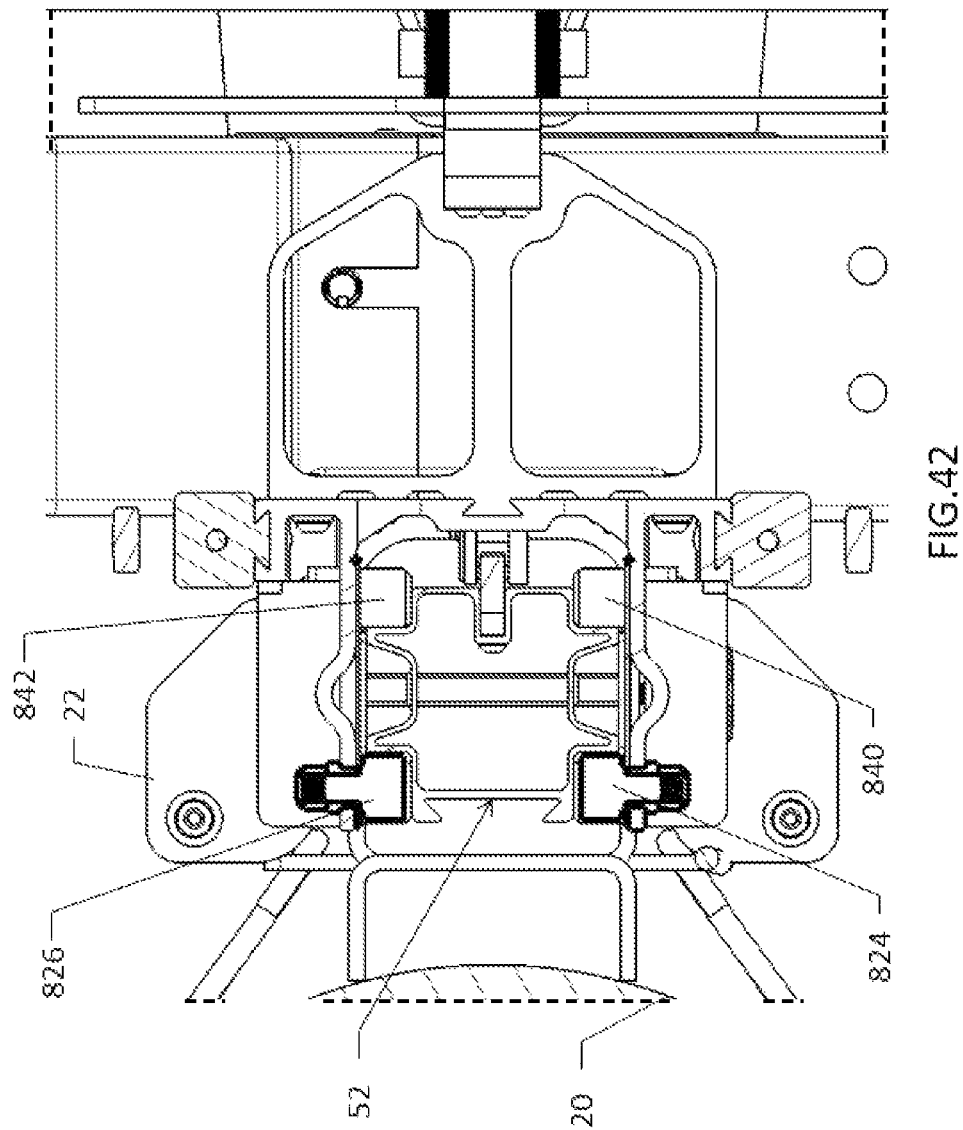
FIG. 42 is a cross-sectional view of a portion of the tree stand lifting system and the tree of FIG. 40 taken along lines 42-42 in FIG. 40.

Referring to FIGS. 34, 35, and 39, the second side carriage wall 796 includes a second upper guide member aperture 1270, a second upper guide roller aperture 1272, third and fourth fixed tensioner apertures 1274, 1276, fifth, sixth, seventh, eighth Teflon block apertures 1290, 1292, 1294, 1296, a second lower guide roller aperture 1300, a third adjustable tensioner aperture 1302, and a fourth adjustable tensioner aperture 1304 extending therethrough.

The second upper guide member aperture 1270 receives a threaded bolt therethrough that is further coupled to the second upper guide member 822 for coupling the second upper guide member 822 to the second side carriage wall 796. The second upper guide member 822 extends inwardly from the second side carriage wall 796 toward the first side carriage wall 794.

The second upper guide roller aperture 1272 receives a threaded bolt therethrough that is further coupled to the second upper roller member 826 for rotatably coupling the second upper roller member 826 to the second side carriage wall 796. The second upper roller member 826 extends inwardly from the second side carriage wall 796 toward the first side carriage wall 794.

The third and fourth fixed tensioner apertures 1274, 1276 receive first and second threaded bolts therethrough that is further coupled to the fixed tensioner plate 892.

The fifth and sixth Teflon block apertures 1290, 1292 receive first and second threaded bolts therethrough that is further coupled to the upper Teflon guide block 922. The upper Teflon guide block 922 extends inwardly from the second side carriage wall 796 toward the first side carriage wall 794.

The seventh, eighth Teflon block apertures 1294, 1296 receive first and second threaded bolts therethrough that is further coupled to the lower Teflon guide block 926. The lower Teflon guide block 926 extends inwardly from the second side carriage wall 796 toward the first side carriage wall 794.

The second lower guide roller aperture 1300 receives a threaded bolt therethrough that is further coupled to the second bottom roller member 842 for rotatably coupling the second bottom roller member 842 to the second side carriage wall 796. The second bottom roller member 842 extends inwardly from the second side carriage wall 796 toward the first side carriage wall 794.

The third and fourth adjustable tensioner apertures 1302, 1304 receive first and second threaded bolts therethrough that is further coupled to the adjustable tensioner 930.

Referring to FIGS. 35 and 36, the first accessory tab portion 798 is provided to allow a user to attach accessories to the carriage assembly 140. The first accessory tab portion 798 extends outwardly from the first side carriage wall 794 and includes a dove-tail slot for receiving accessories having a dove-tail portion therein. In an exemplary embodiment, the first accessory holder block 870 has a dove-tail portion that is attached to the first accessory tab portion 798.

The second accessory tab portion 800 is provided to allow user to attach accessories to the carriage assembly 140. The second accessory tab portion 800 extends outwardly from the second side carriage wall 796 and includes a dove-tail slot for receiving accessories has a dove-tail portion therein. In an exemplary embodiment, the second accessory holder block 872 has a dove-tail portion that is attached to the second accessory tab portion 800.

Referring to FIGS. 34 and 35, the first docking station bracket 802 is coupled to and extends outwardly from the first side carriage wall 794. The first docking station bracket 802 holds the first docking station plate 950 therein. The first docking station pin 952 is coupled to the first docking station plate 950 and extends upwardly from the plate 950.

The second docking station bracket 804 is coupled to and extends outwardly from the second side carriage wall 796. The second docking station bracket 804 holds the second docking station plate 960 therein. The second docking station pin 962 is coupled to the second docking station plate 960 and extends upwardly from the plate 960.

Referring to FIGS. 11-14, 24, 41 and 42, a brief description of the process for installing the carriage assembly 140 on the base pole assembly 52 will be provided. Initially, the base pole assembly 52 is moved such that the first upper guide member 820 (shown in FIG. 34) and the first upper roller member 824 (shown in FIG. 34) are disposed through the slot 360 (shown in FIG. 11), and the second upper guide member 822 and the second upper roller member 826 are disposed through the slot 362 (shown in FIG. 12).

Figure 12:
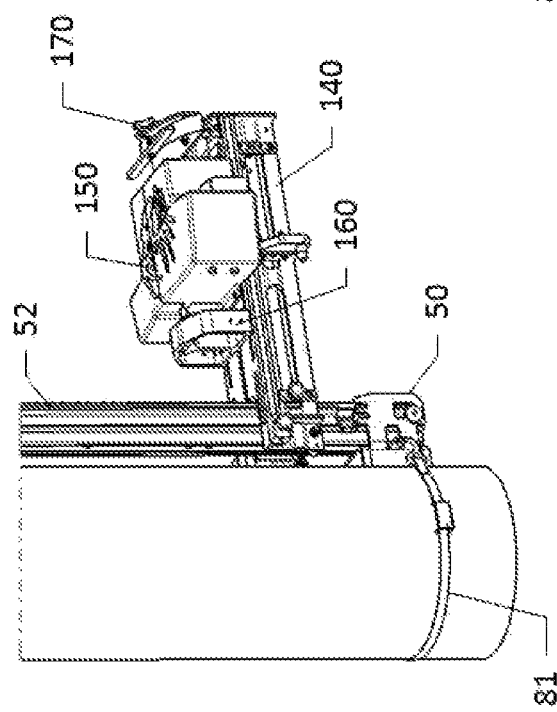
FIG. 12 is a schematic of the carrier assembly being moved upwardly during installation of the carriage assembly to the base pole assembly.

Referring to FIG. 12, thereafter, the carriage assembly 140 is moved upwardly on the base pole assembly 52 such that the first upper guide member 820 and the first upper roller member 824 (shown in FIG. 34) are disposed against the first rear surface 381 (shown in FIG. 24) of the carriage assembly 140, and the second upper guide member 822 and the second upper roller member 826 (shown in FIG. 34) are disposed against the second rear surface 382 (shown in FIG. 24).

Figure 13:
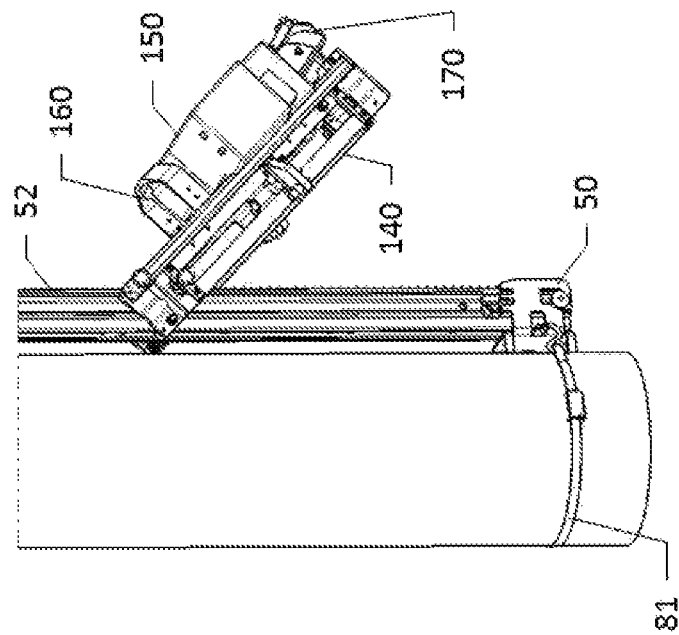
FIG. 13 is another schematic of the carrier assembly being moved upwardly and rotated during installation of the carriage assembly to the base pole assembly.

Referring to FIG. 13, thereafter, the carriage assembly 140 is rotated such that the first bottom guide member 844 (shown in FIG. 34) extends through the slot 360 (shown in FIG. 11) of the base pole assembly 52, and the second bottom guide member 846 (shown in FIG. 34) extends through the slot 362 (shown in FIG. 12).

Figure 14:
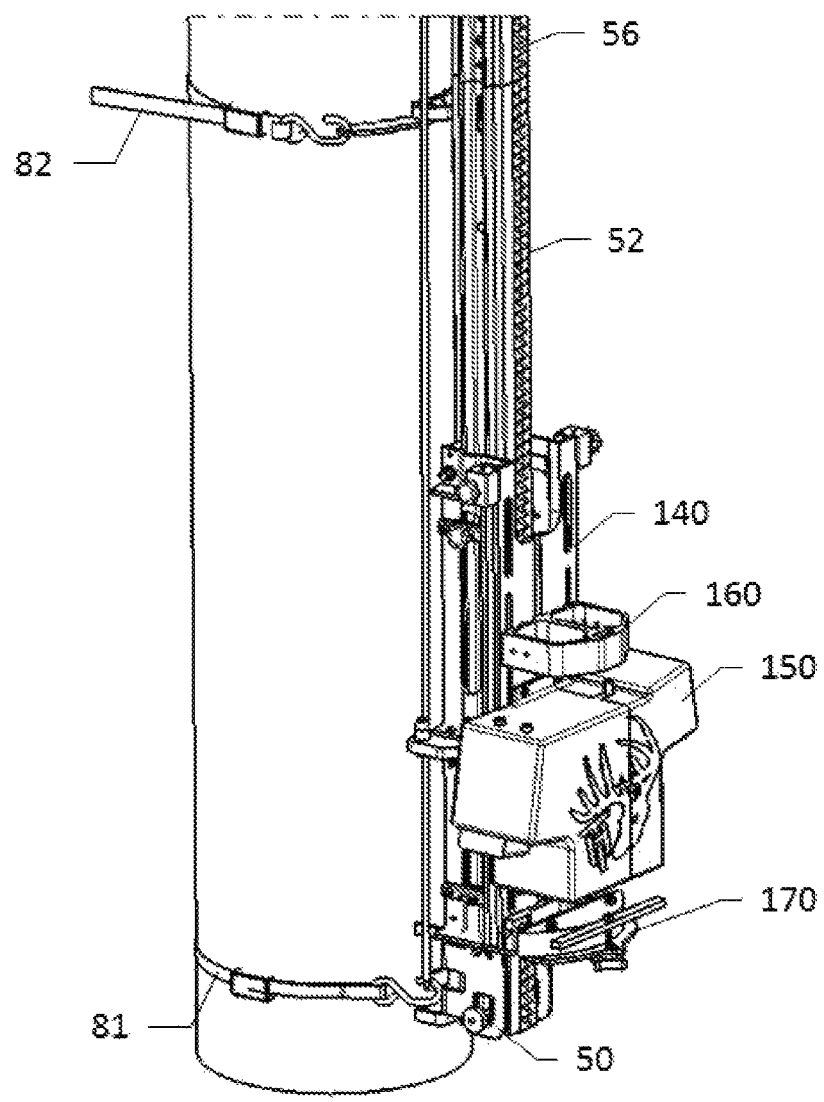
FIG. 14 is a schematic of the carrier assembly being completely installed on the base pole assembly.
Figure 15:
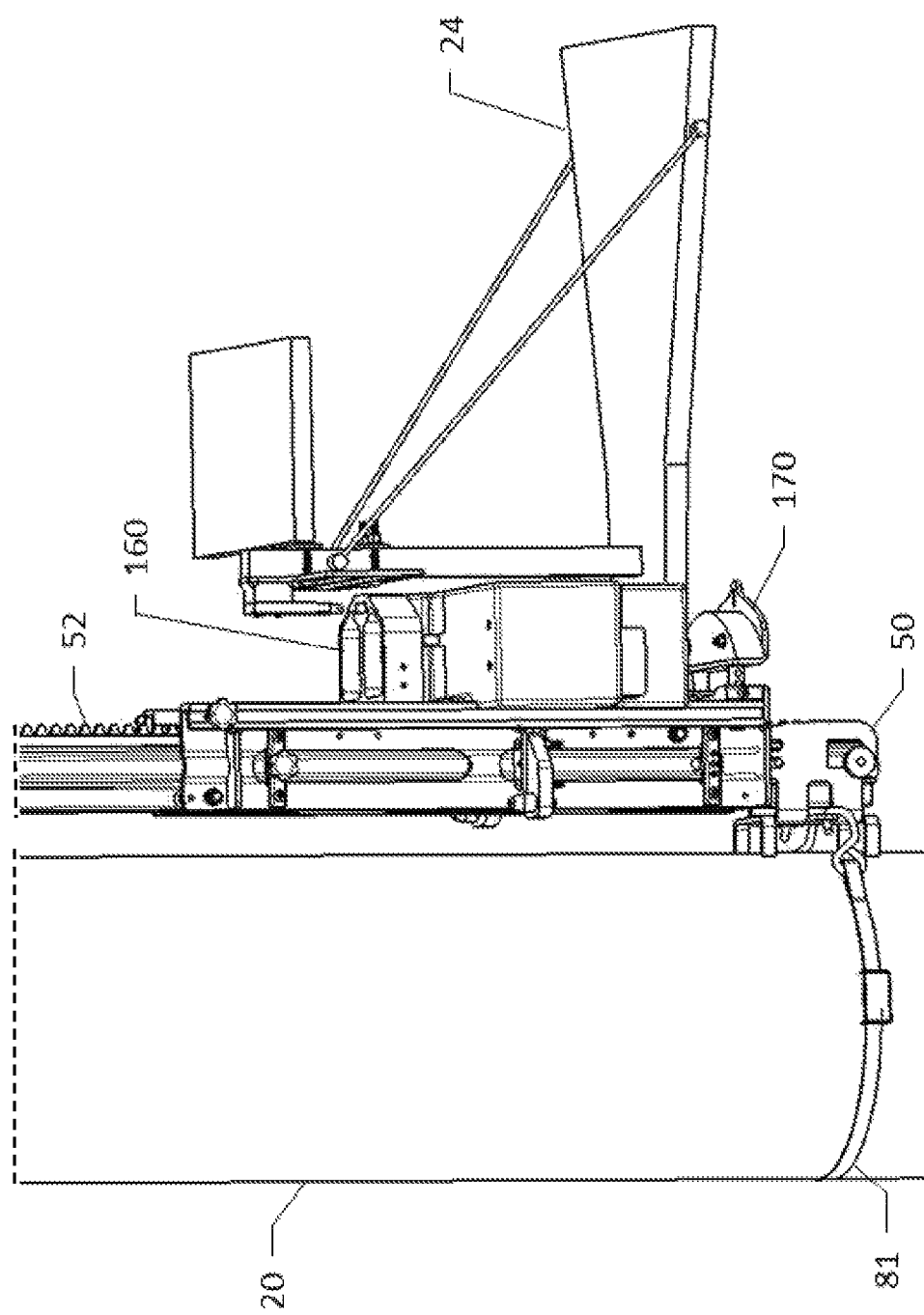
FIG. 15 is a schematic of the carrier assembly, the base pole assembly, and a portable tree stand being moved toward an upper stand bracket on the carrier assembly.
Figure 16:
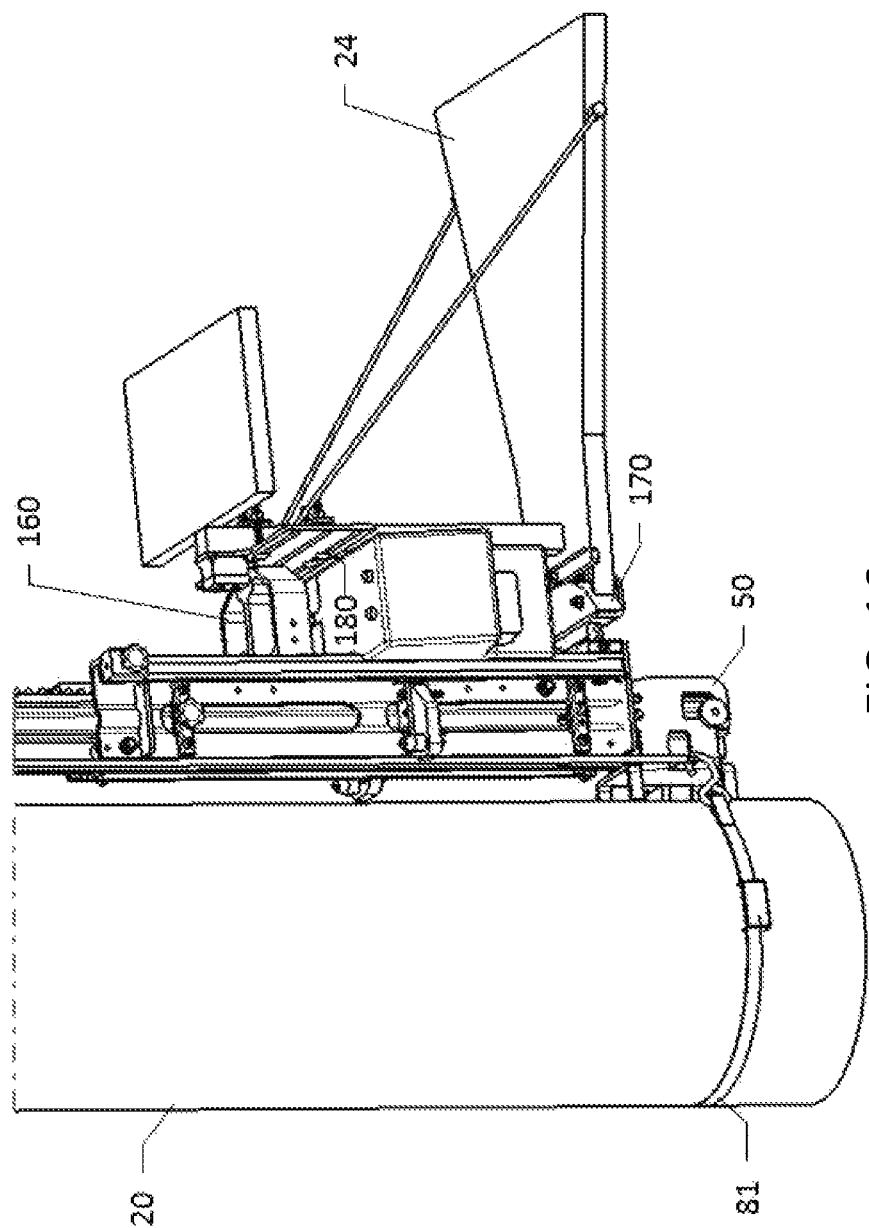
FIG. 16 is a schematic of the portable tree stand coupled to the upper stand bracket on the carriage assembly.
Figure 17:
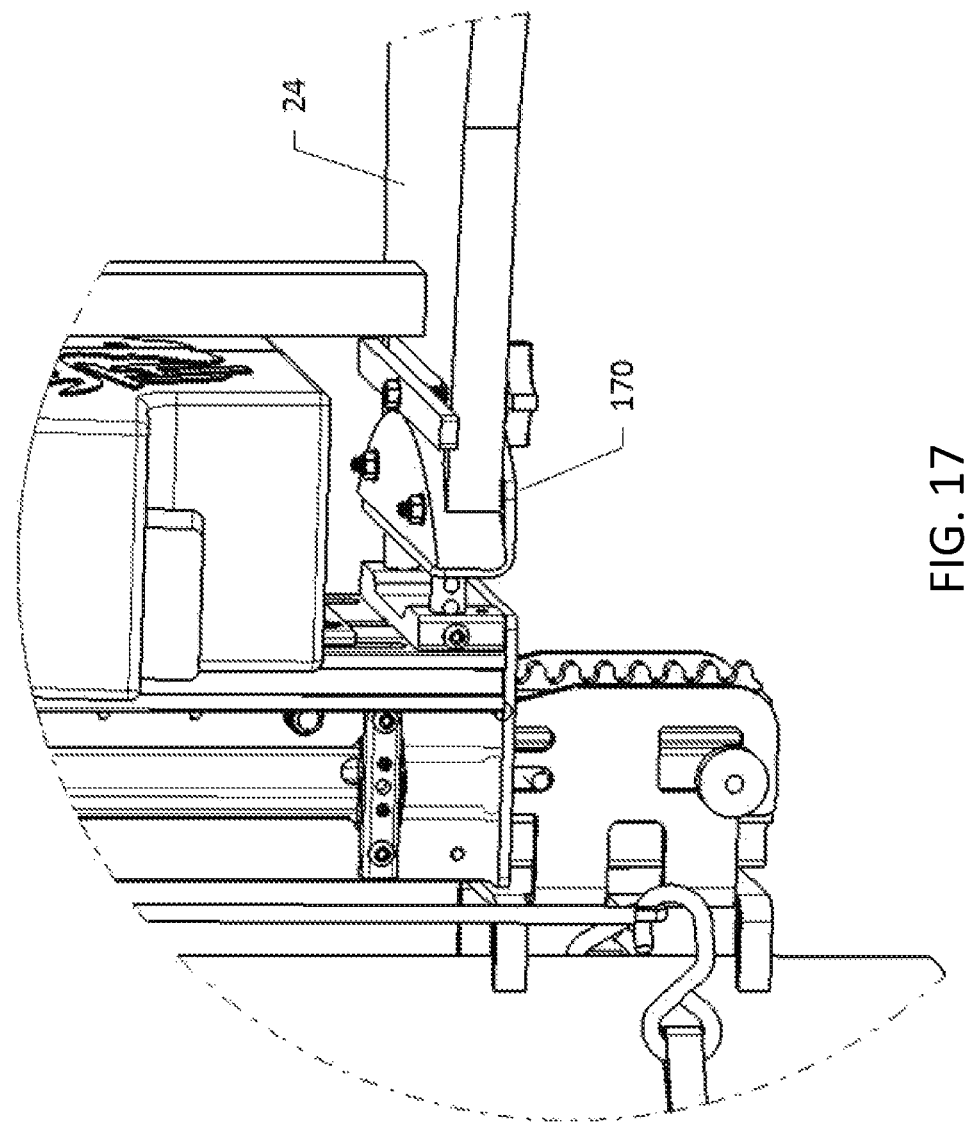
FIG. 17 is a schematic of the portable tree stand coupled to a lower stand bracket on the carriage assembly.
Figure 18:
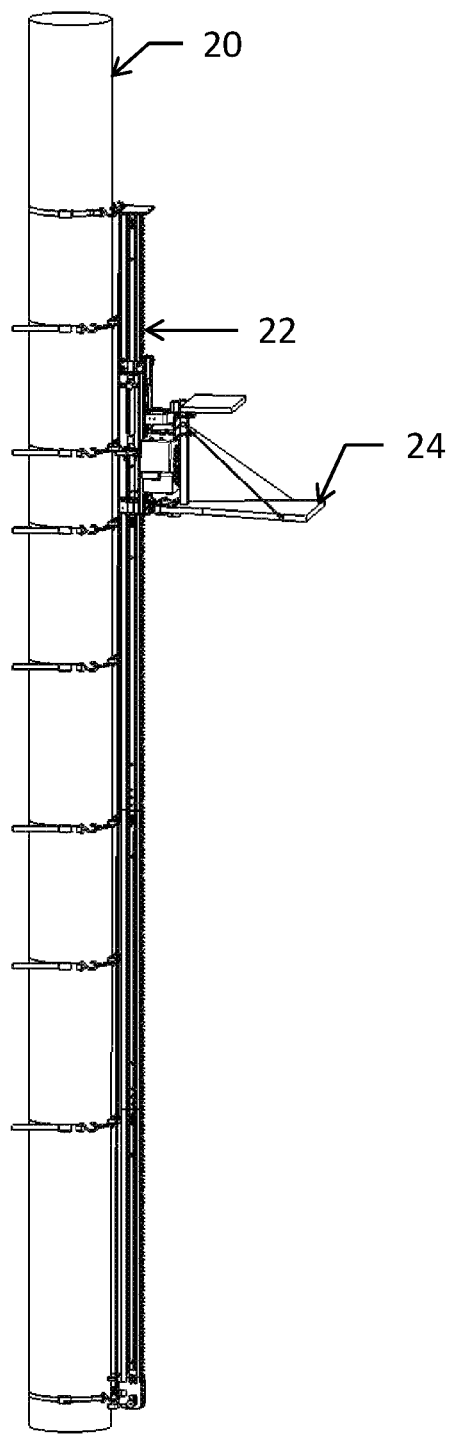
FIG. 18 is a schematic of the tree, the tree stand lifting system having the carriage assembly at an elevated operational position, and the portable tree stand.
Figure 19:
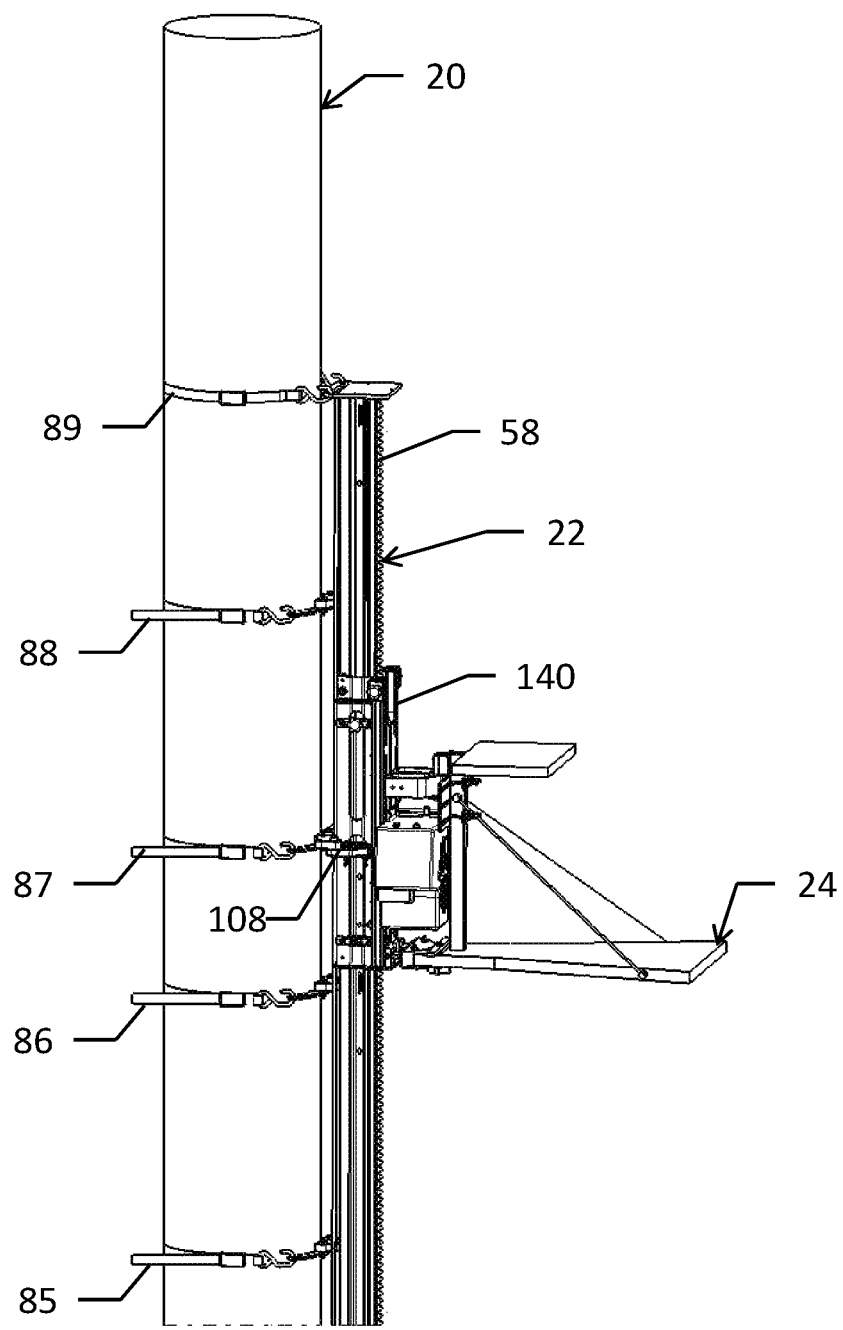
FIG. 19 is an enlarged schematic of the tree, the tree stand lifting system, and the portable tree stand of FIG. 18.

Referring to FIG. 14, thereafter, the carriage assembly 140 is moved upwardly on the base pole assembly 52 such that the first bottom guide member 844 (shown in FIG. 34) is disposed against the first rear surface 381 (shown in FIG. 24), and the first bottom roller member 840 (shown in FIG. 34) are disposed against the first front surface 371 (shown in FIG. 24) of the base pole assembly 52. Further, the second bottom guide member 846 (shown in FIG. 34) is disposed against the second rear surface 382 (shown in FIG. 24), and the second bottom roller member 842 (shown in FIG. 34) are disposed against the second front surface 372 (shown in FIG. 24) of the base pole assembly 52.

Referring to FIGS. 11 and 44-50, the electric drive unit 150 is coupled to the carriage assembly 140. Before providing a detailed description of the electric drive unit 150, a brief overview of the electric drive unit 150 will be provided. The electric drive unit 150 has a gearbox 1402 (shown in FIG. 47) with a gear assembly 1486. The electric drive unit 150 further includes an electric motor 1406 that drives the gear assembly 1486. The gear assembly 1486 has a main drive gear 1532 that rotates and operably engages at least a portion of the first plurality of teeth 292 (shown in FIG. 21) of the base pole assembly 52 to move the carriage assembly 140 on the base pole assembly 52, and operably engages at least a portion of the second plurality of teeth 432 (shown in FIG. 26) to move the carriage assembly 140 on the first middle pole assembly 54, and operably engages at least a portion of the third plurality of teeth 482 (shown in FIG. 27) to move the carriage assembly 140 on the second middle pole assembly 56, and operably engages at least a portion of the fourth plurality of teeth 532 (shown in FIG. 29) on the top pole assembly 58 to move the carriage assembly 140 on the top pole assembly 58.

During operation, the electric motor 1406 drives the gear assembly 1486 such that the main drive gear 1532 rotates in a first rotational direction and operably engages the first, second, third, fourth plurality of teeth 292, 432, 482, 532 to move the carriage assembly 140 upwardly on the base pole assembly 52, the first middle pole assembly 54, the second middle pole assembly 56, and the top pole assembly 58, respectively in response to a first control signal. Alternately, the electric motor 1406 drives the gear assembly 1486 such that the main drive gear 1532 rotates in a second rotational direction and operably engages the first, second, third, fourth plurality of teeth 292, 432, 482, 532 to move the carriage assembly downwardly on the base pole assembly 52, the first middle pole assembly 54, the second middle pole assembly 56, and the top pole assembly 58, respectively in response to a second control signal.

A more detailed explanation of the electric drive unit 150 will now be explained. The electric drive unit 150 includes a housing 1400, a gearbox 1402, a motor coupler 1404, the electric motor 1406, a control circuit 1407, and a hand-held RF transmitter 1409.

The housing 1400 is provided to enclose the remaining components of the electric drive unit 150 therein.

Figure 47:
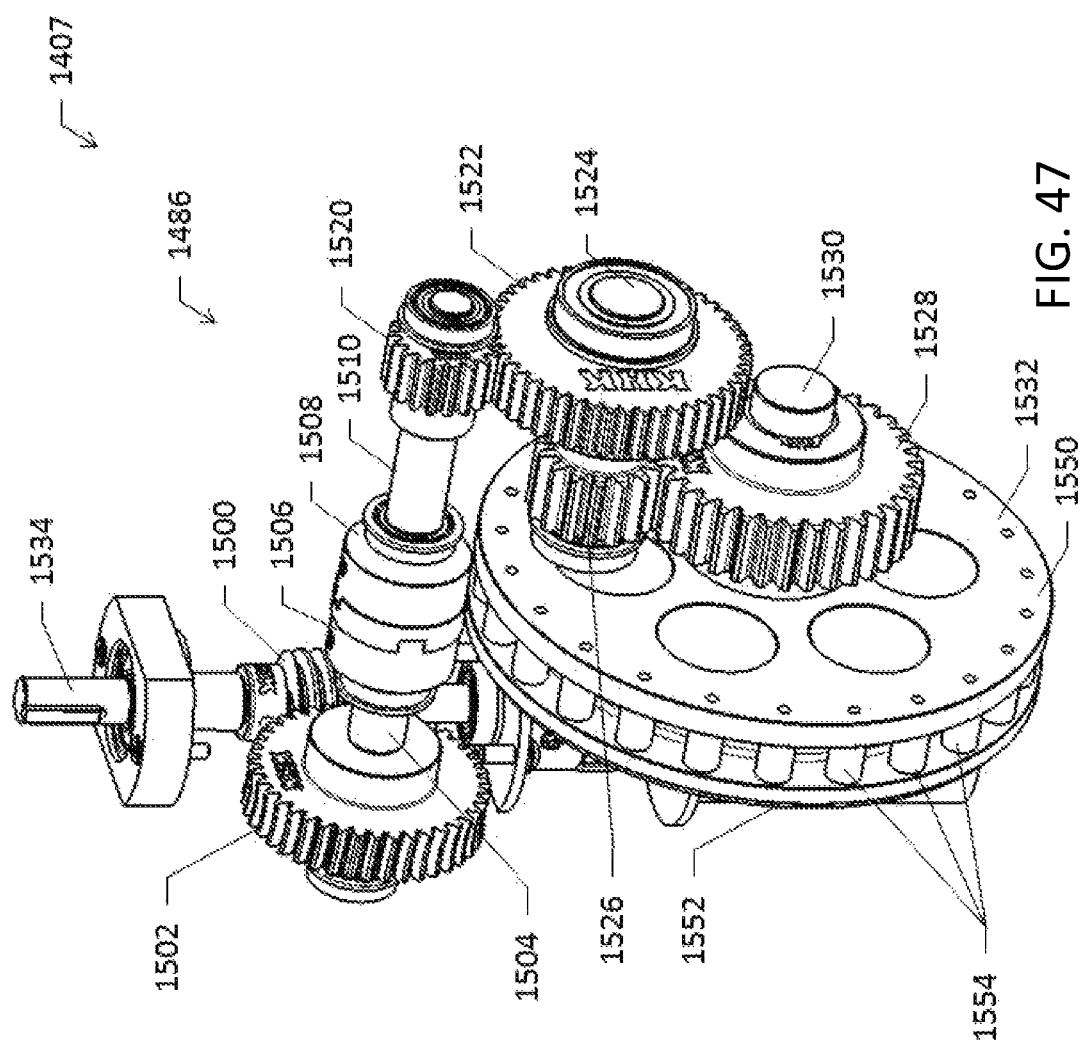
FIG. 47 is a schematic of a portion of the gearbox of FIG. 46.
Figure 48:
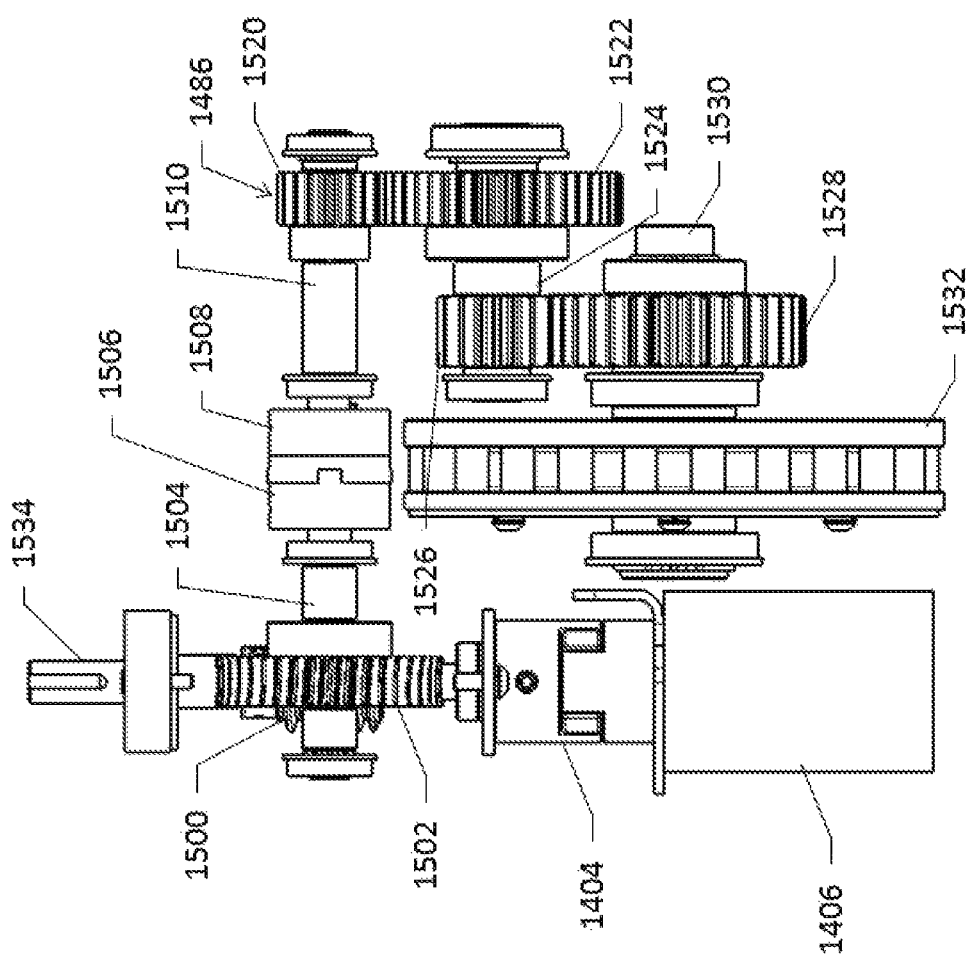
FIG. 48 is a front view of the portion of the gearbox of FIG. 47.
Figure 49:
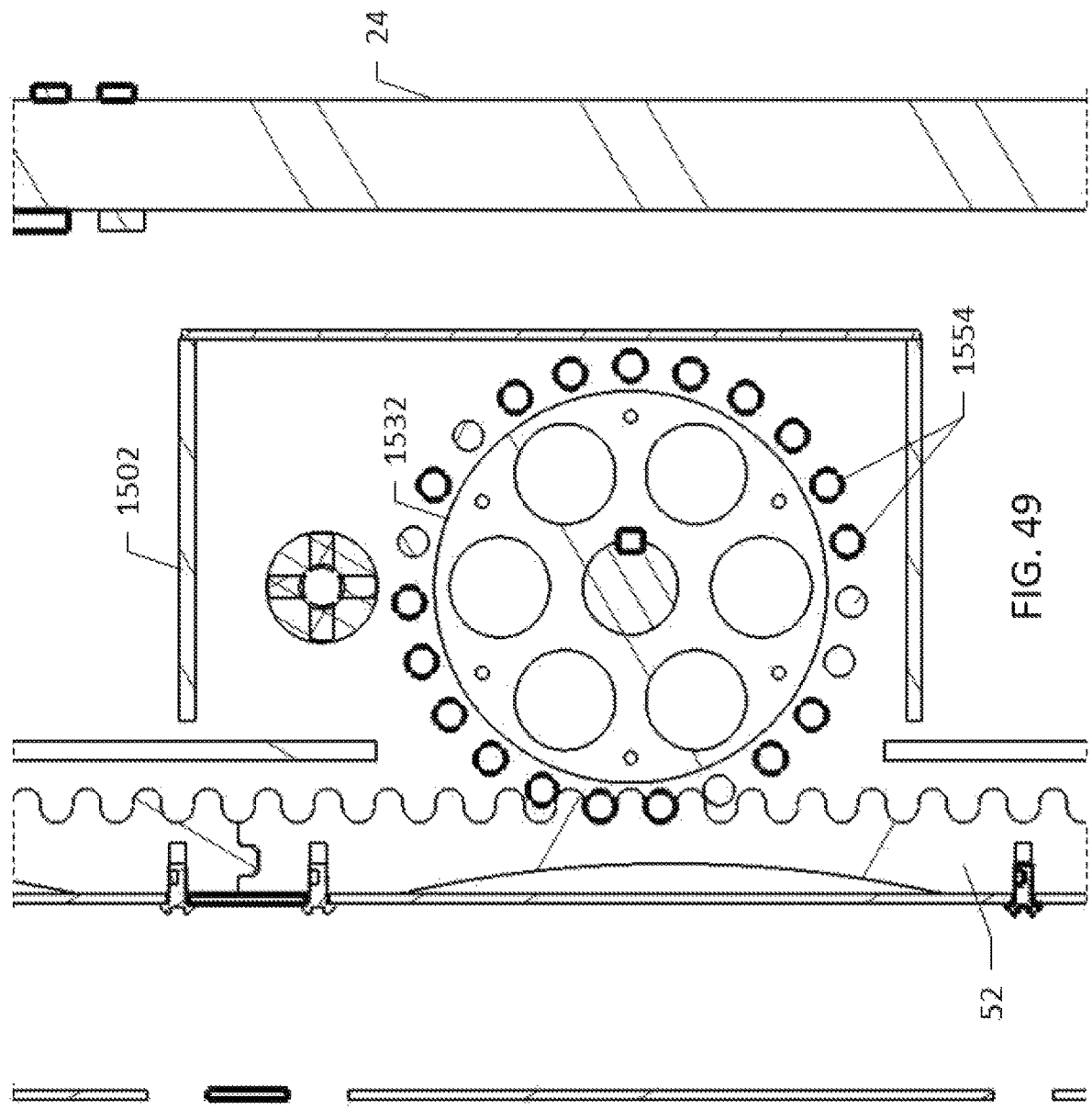
FIG. 49 is a cross-sectional schematic of a portion of the tree stand lifting system illustrating a main gear of the gearbox engaging at least one tooth of a plurality of teeth of the base pole assembly.

Referring to FIGS. 47 and 48, the gearbox 1402 is provided to physically move the carriage assembly 140 upwardly and downwardly on the base pole assembly 52, the first middle pole assembly 54, the second middle pole assembly 56, and the top pole assembly 58. The gearbox 1402 includes a housing 1484 and a gear assembly 1486. The housing 1484 encloses the gear assembly 1406.

The gear assembly 1486 includes a worm gear 1500, a gear 1502, a shaft 1504, coupler joints 1506, 1508, a shaft 1510, a gear 1520, a gear 1522, a shaft 1524, a gear 1526, a gear 1528, a shaft 1530, a main drive gear 1532, and a hand-crank adapter 1534.

The worm gear 1502 is operably coupled to the electric motor 1406 via the motor coupler 1404, and is rotated by the electric motor 1406. The worm gear 1500 is further coupled to the hand-crank adapter 1534 and can be manually rotated utilizing the hand-crank adapter 1434.

The gear 1502 operably engages the worm gear 1500 and is rotated by the worm gear 1502. The gear 1502 rotates about a shaft 1504 which extends generally perpendicular to a longitudinal axis of the worm gear 1502.

The coupler joint 1506 is coupled to an end of the shaft 1504 and is further coupled to the coupler joint 1508. The coupler joint 1508 is further coupled to the shaft 1510 which is coupled to the gear 1520. A rotation of the gear 1502 results in a rotation of the gear 1520.

The gear 1522 rotates about a shaft 1524 and operably engages the gear 1520. A rotation of the gear 1520 results in a rotation of the gear 1522.

The gear 1526 further rotates about the shaft 1524 and operably engages the gear 1528. A rotation of the gear 1522 results in a rotation of the gear 1528.

The gear 1528 rotates about the shaft 1530 and operably engages the gear 1526. A rotation of the gear 1528 results in a rotation of the shaft 1530.

Referring to FIG. 47, the main drive gear 1532 is coupled to the shaft 1530 and rotates in response to a rotation of the gear 1528 and the shaft 1530. The main drive gear 1532 includes side plates 1550, 1552 and a plurality of dowel pins 1554. Each of the side plates 1550, 1552 are circular plates. The plurality of dowel pins 1554 are coupled to and disposed between the side plates 1550, 1552 and are further disposed proximate to a peripheral edge of the side plates 1550, 1552. Each of the plurality of dowel pins 1554 are spaced apart from one another. Further, each of the dowel pins are sized and shaped to operably engage the teeth in the first, second, third, fourth plurality of teeth 292, 432, 482, 532 of the base pole assembly 52, the first and second middle pole assemblies 54, 56, and the top pole assembly 58.

Figure 50:
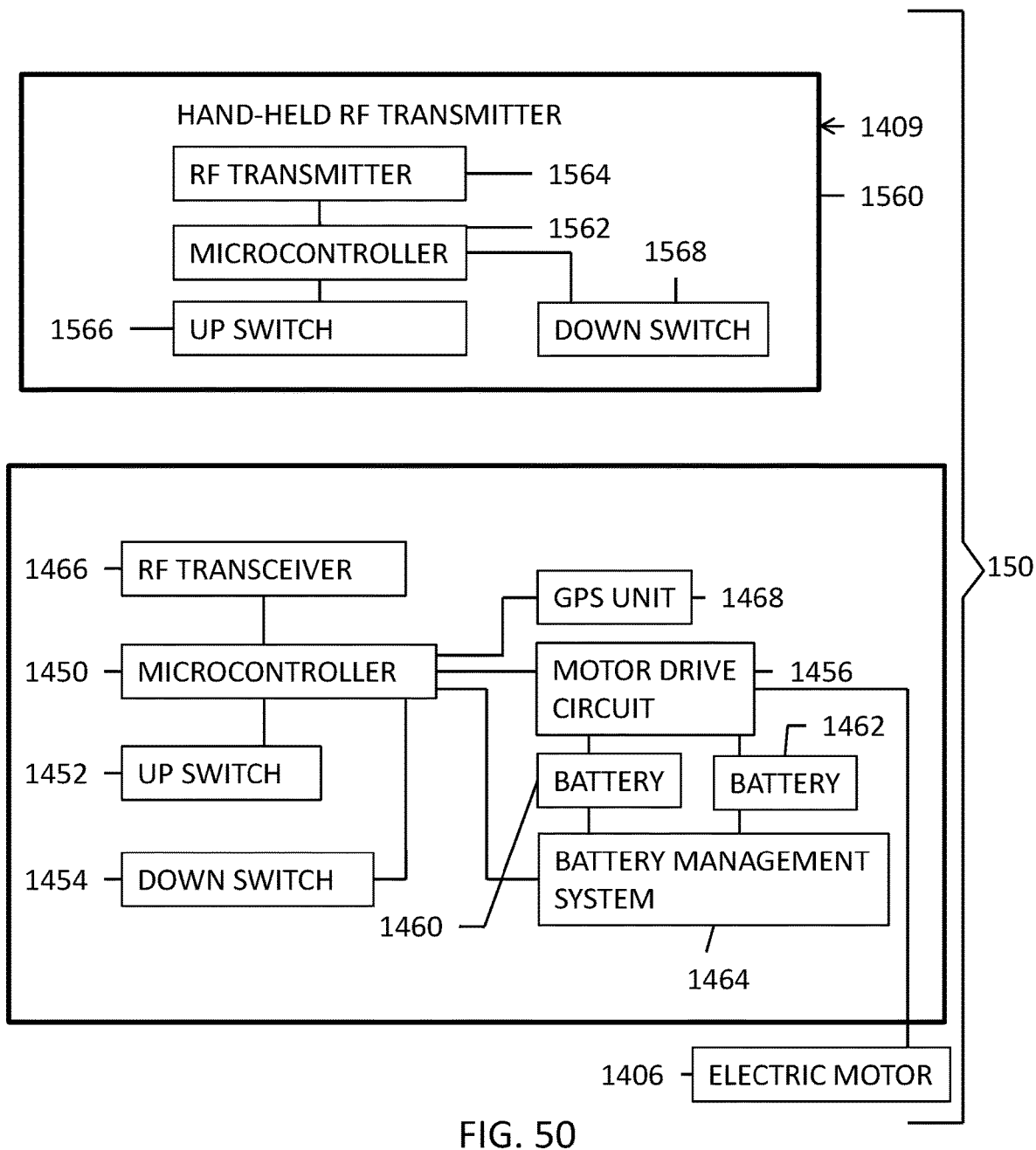
FIG. 50 is a block diagram of a portion of the electric drive unit utilized in the tree stand lifting system of FIG. 1.

Referring to FIG. 50, the control circuit 1407 is provided to control the operation of the electric drive unit 150. The control circuit 1407 includes a microcontroller 1450, an up switch 1452, a down switch 1454, a motor drive circuit 1456, batteries 1460, 1462, a battery management system 1464, an RF transceiver 1466, a GPS unit 1468, and a hand-held RF transmitter 1409.

The microcontroller 1450 is electrically coupled to the RF transceiver 1466, the GPS unit 1468, the motor drive circuit 1456, the battery management system 1464, the up switch 1452, and the down switch 1454.

The RF transceiver 1466 is provided to receive first and second RF signals from the hand-held RF transmitter 1409 indicating either closure of the up switch 1566 or closure of the down switch 1568, respectively, by a user. When the RF transceiver 1466, receives the first RF signal, the RF transceiver 1466 sends a first communication signal to the microcontroller 1450 indicating closure of the up switch 1566. Alternately, when the RF transceiver 1466, receives the second RF signal, the RF transceiver 1466 sends a second communication signal to the microcontroller 1450 indicating closure of the down switch 1568.

The GPS unit 1468 is provided to determine GPS coordinate of the electric drive unit 150. The GPS unit 1468 provides the GPS coordinates to the microcontroller 1450. In response, the microcontroller 1450 can induce the RF transceiver 1466 to transmit an RF signal indicating the GPS coordinates of the electric drive unit 150. A user can utilize another RF receiver device to receive the RF signal with the GPS coordinates and to determine and display the GPS coordinates of the electric drive unit 150 in the event that the electric drive unit 150 is lost or stolen.

The motor drive circuit 1456 is electrically coupled to the microcontroller 1450, the electric motor 1406, and the batteries 1460, 1462. The motor drive unit 1456 energizes the electric motor 1406 in response to control signals from the microcontroller 1450. The batteries 1460, 1460 provide electrical energy to the motor drive unit 1456.

The battery management system 1464 monitors the operational states of the batteries 1460, 1462 and communicates the operational states to the microcontroller 1450. The battery management system 1464 is electrically coupled to the microcontroller 1450, and the batteries 1460, 1462.

During operation, when a user closes the up switch 1452, the microcontroller 1450 generates a first control signal to induce the motor drive circuit 1456 to energize the electric motor 1406 to rotate in a first motor direction which induces the main drive gear 1532 to rotate in a first rotational direction. The rotation of the main drive gear 1532 in the first rotational direction moves the carriage assembly 140 upwardly on the pole assemblies 52, 54, 56, 58. Similarly, if the RF transceiver 1466 receives a first RF signal from the hand-held RF transmitter 1409 indicating closure of the up switch 1566 therein, the microcontroller 1450 generates the first control signal to induce the motor drive circuit 1556 to energize the electric motor 1406 to rotate in the first motor direction which induces the main drive gear 1532 to rotate in the first rotational direction.

Further, during operation, when a user closes the down switch 1454, the microcontroller 1450 generates a second control signal to induce the motor drive circuit 1556 to energize the electric motor 1406 to rotate in a second motor direction which induces the main drive gear 1532 to rotate in a second rotational direction. The rotation of the main drive gear 1532 in the second rotational direction moves the carriage assembly 140 downwardly on the pole assemblies 52, 54, 56, 58. Similarly, if the RF transceiver 1466 receives a second RF signal from the hand-held RF transmitter 1409 indicating closure of the down switch 1568 therein, the microcontroller 1450 generates the second control signal to induce the motor drive circuit 1556 to energize the electric motor 1406 to rotate in the second motor direction which induces the main drive gear 1532 to rotate in the second rotational direction.

The hand-held RF transmitter 1409 includes a housing 1560, a microcontroller 1562, an RF transmitter 1564, the up switch 1566, and the down switch 1568. The housing 1409 encloses the remaining components of the hand-held RF transmitter 1409 therein. The microcontroller 1562 is electrically coupled to the RF transmitter 1564, the up switch 1566, and the down switch 1568. During operation, when a user closes the up switch 1566, the microcontroller 1562 induces the RF transmitter 1564 to generate a first RF signal indicating closure of the up switch 1566. Alternately, when a user closes the down switch 1568, the microcontroller induces the RF transmitter 1564 to generate a second RF signal indicating closure of the down switch 1568.

Referring to FIGS. 15, 45, 51, 52 and 53, the upper stand bracket 160 is coupled to both the carriage assembly 140 and the tree stand coupler assembly 180. The upper stand bracket 160 includes a front wall 1600, a rear wall 1602, side walls 1604, 1606, and a central wall 1608. The side walls 1604, 1606 extend between the front wall 1600 and the rear wall 1602. The central wall 1608 extends between the front wall 1600 and the rear wall 1602 and is disposed between the side walls 1604, 1606. In an exemplary embodiment, the upper stand bracket 180 is constructed of a metal such as aluminum or steel for example.

The front wall 1600 includes an aperture 1602 (shown in FIG. 51) extending therethrough for receiving a locking pin 1974 (shown in FIG. 61) of the multi-bracket 1906 therein.

The rear wall 1602 includes a dove-tail portion 1622. The rear wall 1602 further includes apertures 6030, 1632 extending therethrough. The rear wall 1602 is coupled to the carriage assembly 140 by disposing the dove-tail portion 1622 within the slot 1120 (shown in FIGS. 37 and 53) of the carriage assembly 140.

The side wall 1604 includes apertures 1650, 1652 extending therethrough, and the side wall 1606 includes apertures 1660, 1662 extending therethrough.

Referring to FIGS. 58-61, the tree stand coupler assembly 180 is coupled to both the upper stand bracket 160 and the vertical member 2002 of the tree stand 24. The tree stand coupler assembly 180 includes a multi-bracket 1906, bolts 1920, 1922, 1924, 1926, washers 1930, 1932, 1934, 1936, nuts 1940, 1942, 1944, 1946, and attachment plates 1960, 1962.

The multi-bracket 1906 includes a front plate 1970, a spacer block 1972, a locking pin 1974, and bolts 1976, 1978, 1980 (shown in FIG. 61). The spacer block 1972 is disposed on a rear surface of the front plate 1970. The spacer block 1972 is further disposed between and coupled to the front plate 1970 and the locking pin 1974. The bolts 1976, 1978, 1980 extend through the locking pin 1974 and the spacer block 1972 and into the front plate 1972 to couple together the front plate 1970, the spacer block 1972, and the locking pin 1974. The locking pin 1974 (shown in FIG. 61) is inserted into the aperture 1602 (shown in FIG. 51) of the upper stand bracket 160 to couple the multi-bracket 1906 to the upper stand bracket 160.

Referring to FIGS. 58-61, during installation, the vertical member 2002 of the tree stand 24 is disposed against a front surface 1985 of the front plate 1970, and further between the bolts 1920, 1922 that extend through the slot 1982 of the front plate 1970. The bolt 1920 further extends through the attachment plate 1960 and has a washer 1930 and a nut 1940 disposed thereon. The bolt 1922 further extends through the attachment plate 1960 and has a washer 1932 and a nut 1942 disposed thereon. Further, during installation, the vertical member 2002 of the tree stand 24 is disposed between the bolts 1924, 1926 that extend through the slot 1984 of the front plate 1970. The bolt 1924 further extends through the attachment plate 1962 and has a washer 1934 and a nut 1944 disposed thereon. The bolt 1926 further extends through the attachment plate 1962 and has a washer 1936 and a nut 1946 disposed thereon.

Referring to FIGS. 54-57, the lower stand bracket 170 is coupled to the platform 2000 of the portable tree stand 24 and further to the carriage assembly 140. The lower stand bracket 170 includes a U-shaped mounting plate 1700, adjustment tubes 1702, 1704, a mounting bracket 1720, bolts 1722, 1724, 1726, 1728, a stand abutment member 1740, a stand bracket stabilizer 1742, a threaded handle 1744, bolts 1746, 1748, and nuts 1760, 1762.

The U-shaped mounting plate 1700 includes apertures 1800, 1802, 1803, 1804, 1805 extending therethrough. In an exemplary embodiment, the U-shaped mounting plate 1700 is constructed of a metal such as aluminum or steel for example.

The mounting bracket 1720 includes apertures 1833, 1834, 1836, 1838, 1840, 1842 and a dove-tail portion 1843. The dove-tail portion 1843 is disposed in the groove 1120 (shown in FIG. 37) of the carriage assembly 140 to couple the mounting bracket 1720 to the carriage assembly 140. In an exemplary embodiment, the mounting bracket 1720 is constructed of a metal such as aluminum or steel for example.

The adjustment tube 1702 is used to set a horizontal position of the stand abutment member 1740. The adjustment tube 1702 includes a plurality of apertures 1820 extending therethrough. The adjustment tube 1702 extends through the aperture 1803 of the U-shaped mounting plate 1700 and further through the aperture 1833 of the mounting bracket 1720. The bolt 1722 extends into the aperture 1840 of the mounting bracket 1720 and further into one of the apertures of the plurality of apertures 1820 to hold the adjustment tube 1702 at a desired position. The adjustment tube 1702 further extends into an aperture in the stand abutment member 1740.

The adjustment tube 1704 is used to set a horizontal position of the stand abutment member 1740. The adjustment tube 1704 includes a plurality of apertures 1822 extending therethrough. The adjustment tube 1704 extends through the aperture 1804 of the U-shaped mounting plate 1700 and further through the aperture 1834 of the mounting bracket 1720. The bolt 1724 extends into the aperture 1842 of the mounting bracket 1720 and further into one of the apertures of the plurality of apertures 1822 to hold the adjustment tube 1704 at a desired position. The adjustment tube 1704 further extends into an aperture in the stand abutment member 1740.

The stand abutment member 1740 is provided to abut against the first and second prongs of the platform 20. In an exemplary embodiment, the stand abutment member 1740 is constructed of wood. The stand abutment member 1740 includes apertures 1846, 1848 extending therethrough. The stand abutment member 1740 is coupled to the U-shaped mounting plate 1700 utilizing the bolts 1746, 1748. In particular, the bolt 1746 extends through the aperture 1800 of the U-shaped mounting plate 1700 and the aperture 1846 of the stand abutment member 1740 and is threadably coupled to the nut 1760. Further, the bolt 1748 extends through the aperture 1802 of the U-shaped mounting plate 1700 and the aperture 1848 of the stand abutment member 1740 and is threadably coupled to the nut 1762.

Figure 54:
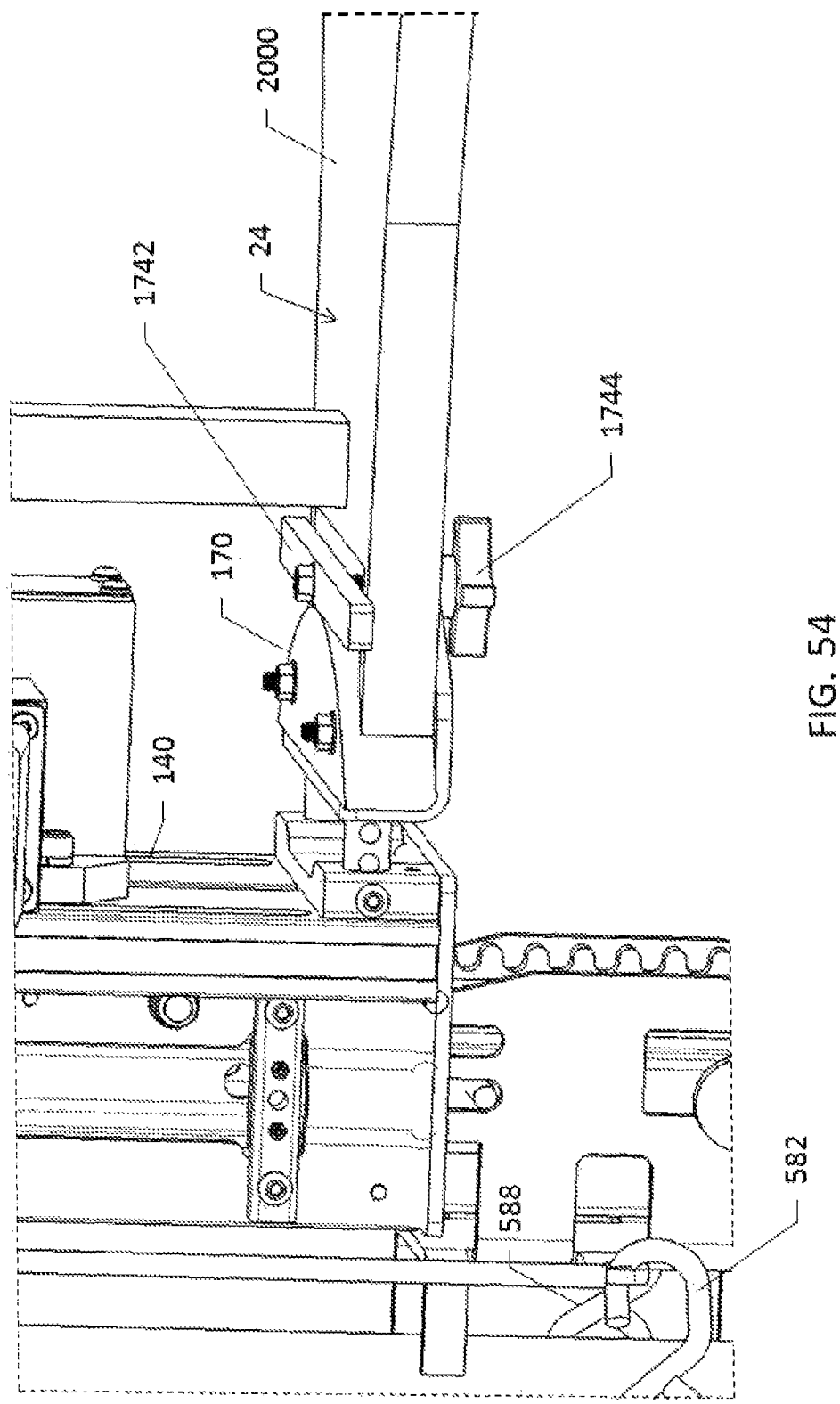
FIG. 54 is a schematic of a lower stand bracket being utilized to couple the portable tree stand to the carriage assembly.

Referring to FIG. 54, the stand bracket stabilizer 1742 is provided hold the platform 2000 against the U-shaped mounting plate 170 of the lower stand bracket 170. The stand bracket stabilizer 1742 includes a plate 1860 and a bolt 1862. The bolt 1862 extends through the plate 1860 and further through the aperture 1805 of the U-shaped mounting plate 170 and into the threaded handle 1744. The plate 1742 is disposed on a top surface of the platform 2000 and holds a portion of the platform 200 between the plate 1742 and the U-shaped mounting plate 1700.

Figure 57:
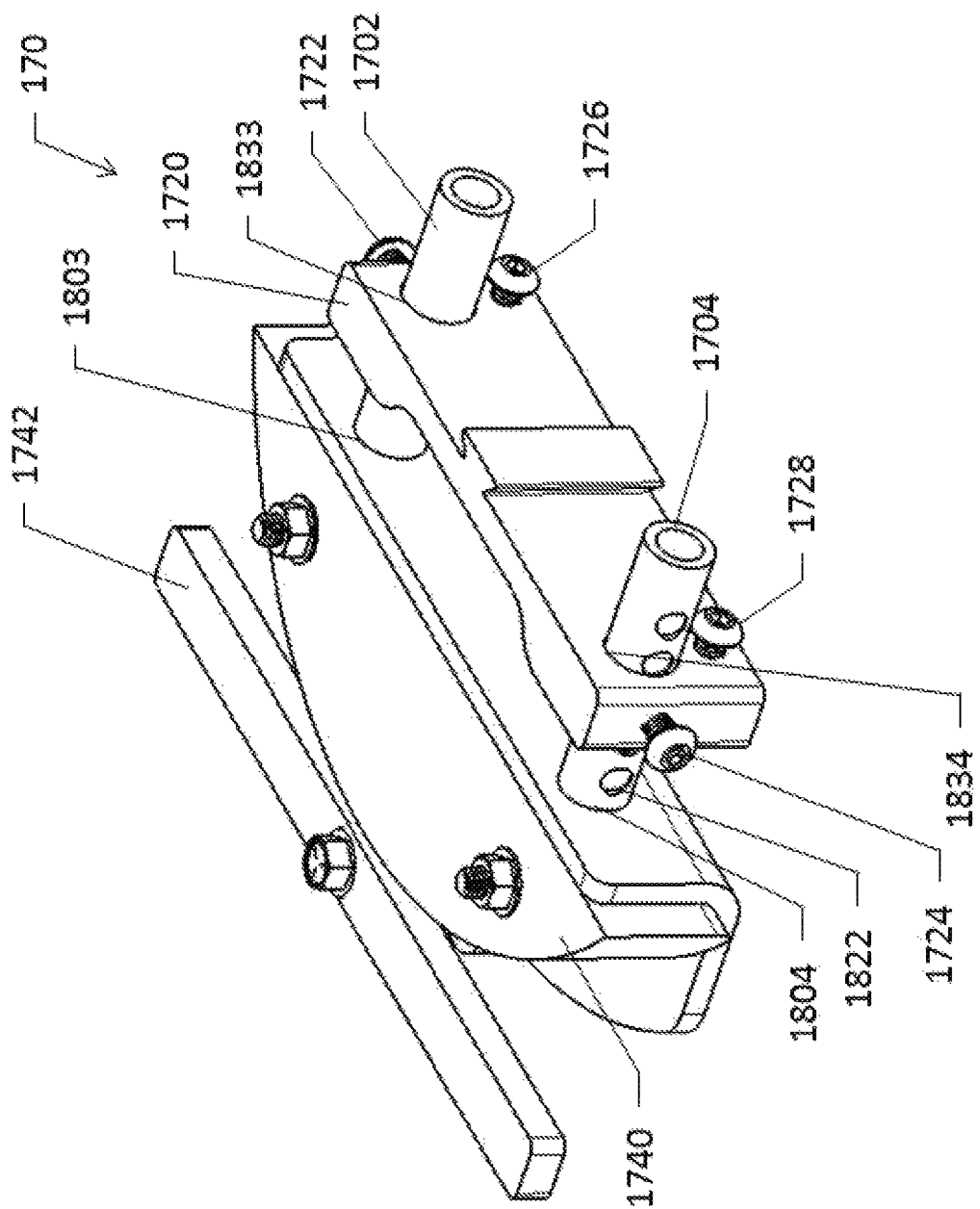
FIG. 57 is an assembled view of the lower stand bracket of FIG. 54.

Referring to FIGS. 37 and 57, the bolts 1726, 1728 extend through the first and second lower stand bracket threaded apertures 1140, 1142, respectively, in the front carriage wall 792 of the carriage assembly 140, and further into the apertures 1836, 1838, respectively in the mounting bracket 1720—to couple the lower stand bracket 170 to the carriage assembly 160.

Figure 58:
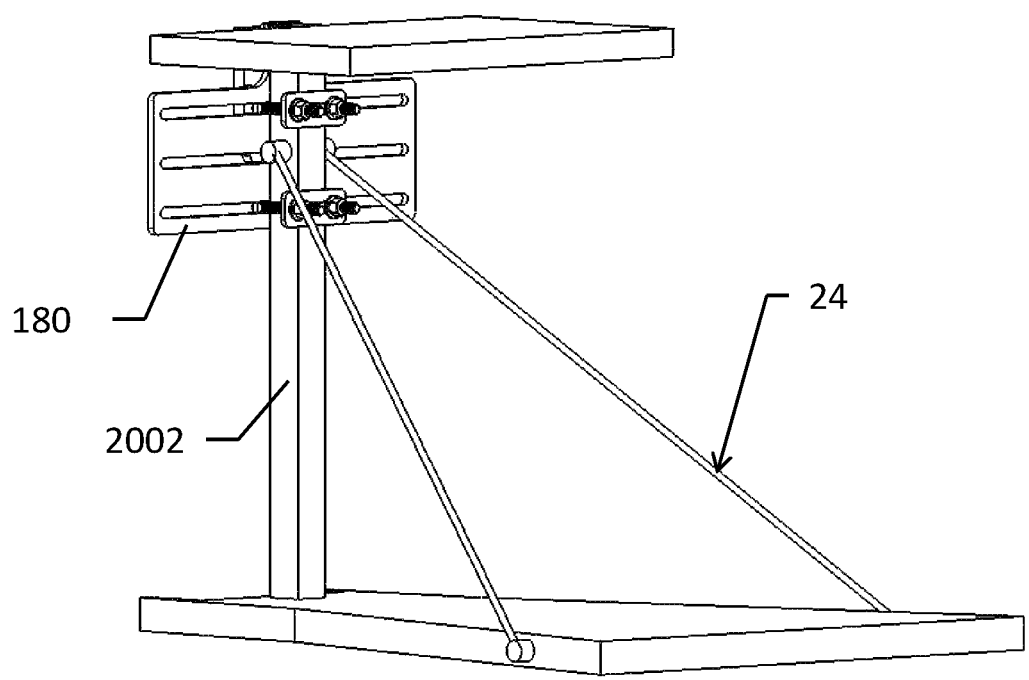
FIG. 58 is a schematic of a tree stand coupler assembly coupled to a portable tree stand.
Figure 59:
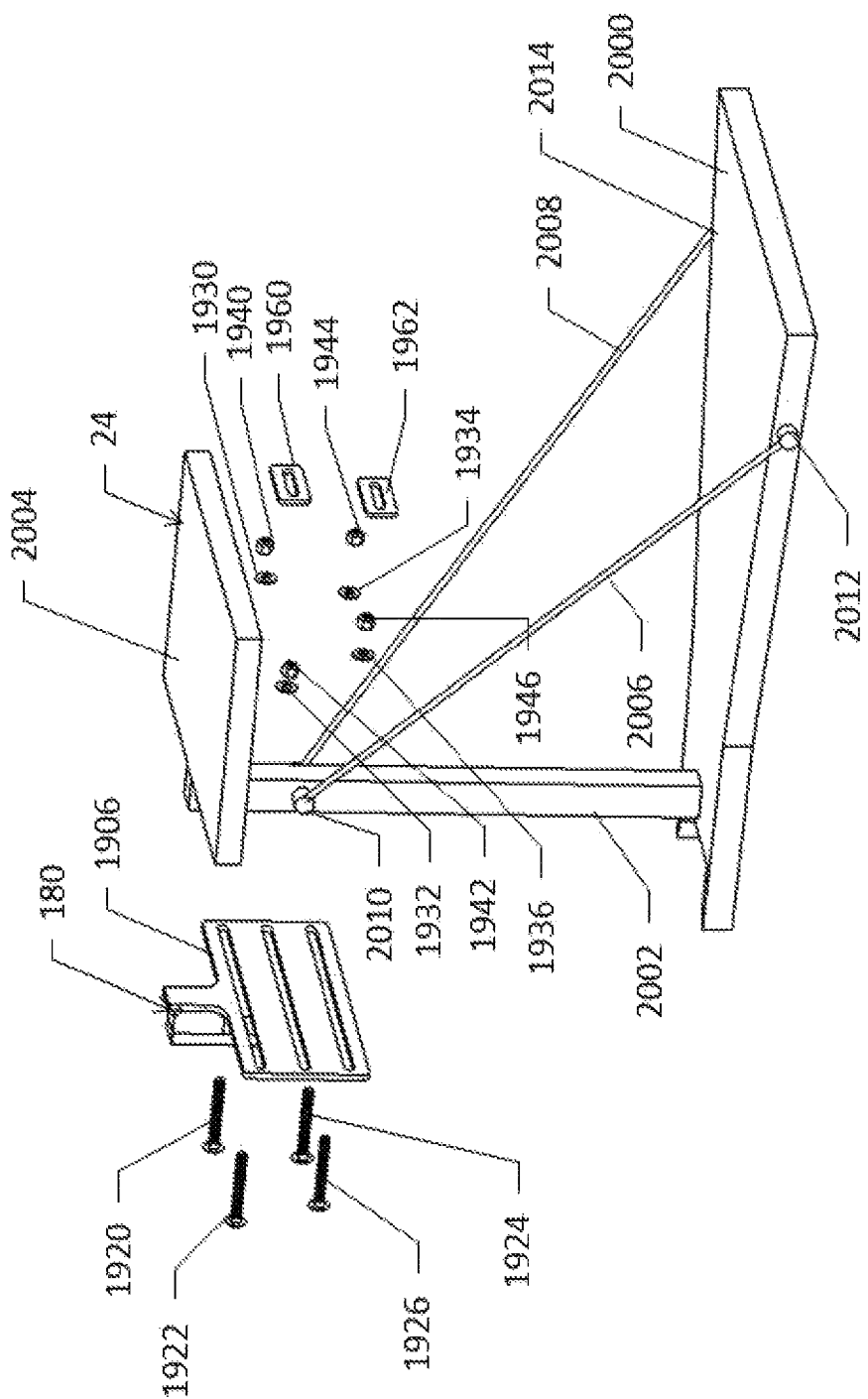
FIG. 59 is an exploded view of the tree stand coupler assembly of FIG. 58, and the portable tree stand of FIG. 58.
Figure 60:
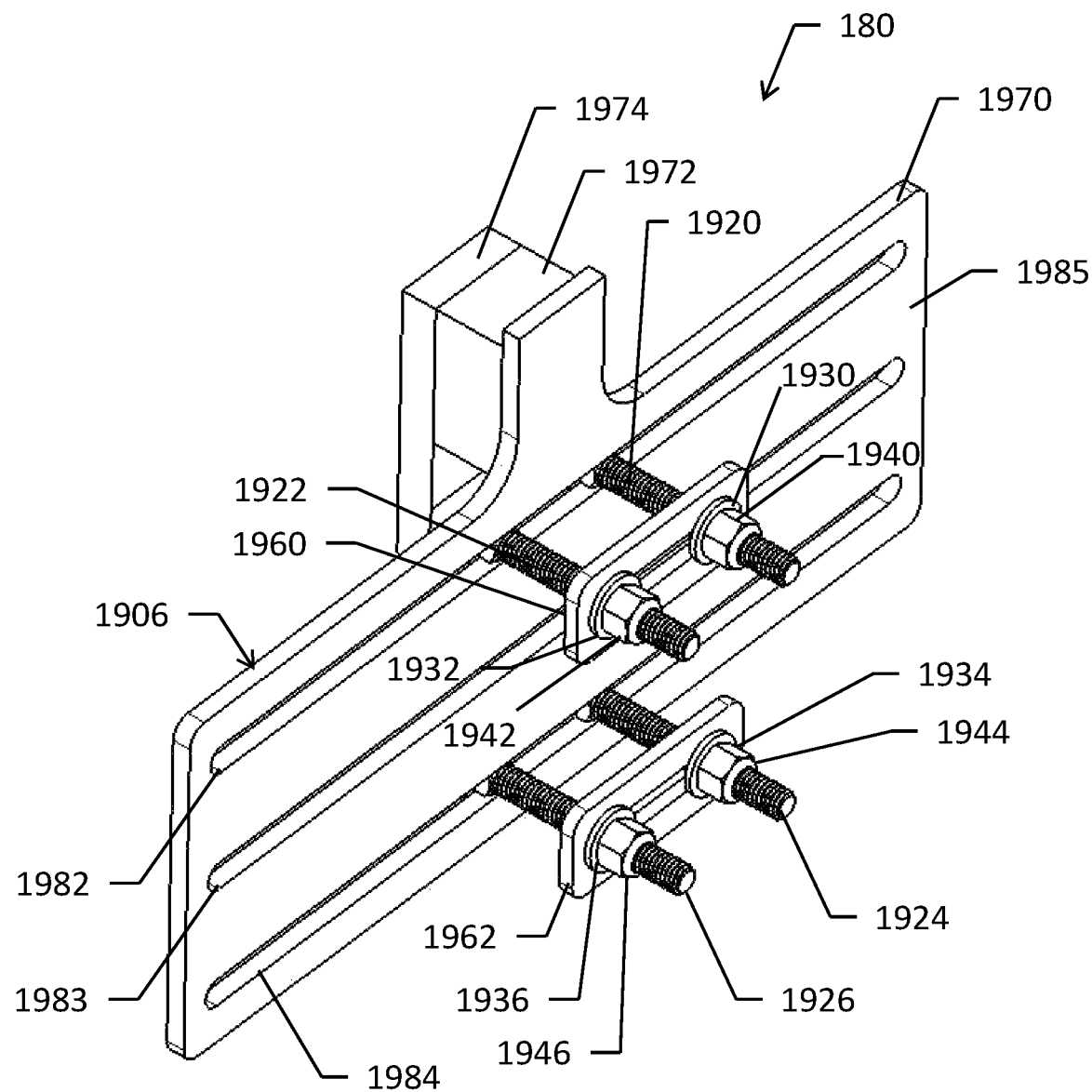
FIG. 60 is a schematic of the tree stand coupler assembly of FIG. 58.

Referring to FIGS. 1, 58 and 59, the portable tree stand 24 is provided to hold a user thereon. The portable tree stand 24 includes a platform 2000, a vertical member 2002, a seat 2004, support cables 2006, 2008, and attachment pins 2010, 2012, 2014. The vertical member 2002 is coupled to and extends between the platform 2000 and the seat 2004. The attachment pin 2010 is coupled to the vertical member 2002 and extends through the vertical member 2002. The attachment pin 2010 has first and second portions that extend outwardly from opposite sides of the vertical member 2002. Also, the attachment pins 2012, 2014 are coupled to and extend outwardly from opposite sides of the platform 2000. The support cable 2006 is coupled to both the attachment pin 2010 and the attachment pin 2012. The support cable 2008 is coupled to both the attachment pin 2010 and the attachment pin 2014.

Referring to FIGS. 1-20 and 62-65, a flowchart of a method for installing the tree stand lifting system 22 on the tree 20 in accordance with another exemplary embodiment will be explained.

At step 2200, a user disposes a base member 50 (shown in FIG. 3) on a lower portion of a tree 20 and couples a first strap assembly 81 to the base member 50 and against an exterior surface 44 of the tree 20 to secure the base member 50 to the tree 20. After step 2200, the method advances to step 2202.

At step 2202, the user rotatably couples a first end portion 320 of a base pole assembly 52 to the base member 50 utilizing a threaded attachment pin 120. The base pole assembly 52 has a first plurality of teeth 292 disposed longitudinally thereon. After step 2202, the method advances to step 2204.

At step 2204, the user couples a first middle pole assembly 54 to the base pole assembly 52. The first middle pole assembly 54 has a second plurality of teeth 432 disposed longitudinally thereon. After step 2204, the method advances to step 2206.

At step 2206, the user couples a second middle pole assembly 56 to the first middle pole assembly 54. The second middle pole assembly 56 has a third plurality of teeth 482 disposed longitudinally thereon. After step 2206, the method advances to step 2208.

At step 2208, the user couples a top pole assembly 58 to the second middle pole assembly 56. The top pole assembly 58 has a fourth plurality of teeth 532 disposed longitudinally thereon. After step 2208, the method advances to step 2210.

At step 2210, the user couples a safety life line 182 to a top plate 522 of the top pole assembly 58. After step 2210, the method advances to step 2212.

At step 2212, the user rotates the base pole assembly 52, the first and second middle pole assemblies 54, 56, and the top pole assembly 58 from a first position to a substantially vertical position relative to the base member 50, and locks a position of the base pole assembly 52, the first and second middle pole assemblies 54, 56, and the top pole assembly 58 in the substantially vertical position utilizing a safety pin 284 on the base pole assembly 52 that engages the base member 50. After step 2212, the method advances to step 2220.

At step 2220, the user couples a second strap assembly 82 to a first tree clamp 101 that is further coupled to the base pole assembly 52, and against an exterior surface 44 of the tree 20, to hold the base pole assembly 52 at a fixed position relative to the tree 20. After step 2220, the method advances to step 2222.

At step 2222, the user removably couples a carriage assembly 140 having an electric drive unit 150 disposed thereon to the base pole assembly 52 such that a main drive gear 1532 of the electric drive unit 150 operably engages at least the portion of the first plurality of teeth 292 of the base pole assembly 52. After step 2222, the method advances to step 2224.

At step 2224, the user couples a tree stand coupler assembly 180 to a portable tree stand 24. After step 2224, the method advances to step 2226.

At step 2226, the user couples the tree stand coupler assembly 180 to an upper stand bracket 160 that is coupled to the carriage assembly 140. After step 2226, the method advances to step 2228.

At step 2228, the user couples the portable tree stand 24 to a lower stand bracket 170 that is coupled to the carriage assembly 140. After step 2228, the method advances to step 2230.

At step 2230, the user closes an up switch 1452 on the electric drive unit 150 or closes an up switch 1566 on a hand-held RF transmitter 1409 to induce a microcontroller 1450 to generate a first control signal to induce the electric drive unit 150 to energize the electric motor 1406 to rotate the main drive gear 1532 in a first rotational direction and operably engages the first plurality of teeth 292 of the base pole assembly 52 such that the carriage assembly 140 and the portable tree stand 24 move upwardly on the base pole assembly 52. After step 2230, the method advances to step 2240.

At step 2240, the user couples a third strap assembly 83 to a second tree clamp 102 that is further coupled to the first middle pole assembly 54, and against an exterior surface 44 of the tree 20, to hold the first middle pole assembly 54 at a fixed position relative to the tree 20. After step 2240, the method advances to step 2242.

At step 2242, the user couples a fourth strap assembly 84 to a third tree clamp 103 that is further coupled to the first middle pole assembly 54, and against an exterior surface 44 of the tree 20, to hold the first middle pole assembly 54 at a fixed position relative to the tree 20. After step 2242, the method advances to step 2244.

At step 2244, the user closes an up switch 1452 on the electric drive unit 150 or closes an up switch 1566 on the hand-held RF transmitter 1409 to induce the microcontroller 1450 to generate a second control signal to induce the electric drive unit 150 to energize the electric motor 1406 to rotate the main drive gear 1532 in the first rotational direction and operably engage the second plurality of teeth 432 of the first middle pole assembly 54 such that the carriage assembly 140 and the portable tree stand 24 move upwardly on the first middle pole assembly 54. After step 2244, the method advances to step 2246.

At step 2246, the user couples a fifth strap assembly 85 to a fourth tree clamp 104 that is further coupled to a second middle pole assembly 56, and against an exterior surface 44 of the tree 20, to hold the second middle pole assembly 56 at a fixed position relative to the tree 20. After step 2246, the method advances to step 2248.

At step 2248, the user couples a sixth strap assembly 86 to a fifth tree clamp 105 that is further coupled to a second middle pole assembly 56, and against an exterior surface 44 of the tree 20, to hold the second middle pole assembly 56 at a fixed position relative to the tree 20. After step 2248, the method advances to step 2260.

At step 2260, the user closes the up switch 1452 on the electric drive unit 150 or closes the up switch 1566 on the hand-held RF transmitter 1409 to induce the microcontroller 1450 to generate a third control signal to induce the electric drive unit 150 to energize the electric motor 1406 to rotate the main drive gear 1532 in the first rotational direction and operably engage the third plurality of teeth 482 of the second middle pole assembly 56 such that the carriage assembly 140 and the portable tree stand 24 move upwardly on the second middle pole assembly 56, such that first and second docking station pins on the carriage assembly 140 engage first and second apertures, respectively, on a docking station clamp attached to the top pole assembly 58. After step 2260, the method advances to step 2262.

At step 2262, the user couples a seventh strap assembly 87 to the docking station clamp 108 that is further coupled to the top pole assembly 58, and against an exterior surface 44 of the tree 20, to hold the top pole assembly 58 at a fixed position relative to the tree 20. After step 2262, the method advances to step 2264.

At step 2264, the user couples an eighth strap assembly 88 to a sixth tree clamp 106 that is further coupled to a top pole assembly 58, and against an exterior surface 44 of the tree 20, to hold the top pole assembly 58 at a fixed position relative to the tree 20. After step 2264, the method advances to step 2266.

At step 2266, the user further couples a ninth strap assembly 89 to a top plate 522 of the top pole assembly 58 and against an exterior surface 44 of the tree 20 to hold the top pole assembly 58 at a fixed position relative to the tree 20. After step 2266, the method advances to step 2268.

At step 2268, the user closes the down switch 1454 on the electric drive unit 150 or closes the down switch 1568 on the hand-held RF transmitter 1409 to induce the microcontroller 1450 to generate a fourth control signal to induce the electric drive unit 150 to energize the electric motor 1406 to rotate the main drive gear 1532 in a second rotational direction and operably engage the third plurality of teeth 482 of the second middle pole assembly 56, then operably engage the second plurality of teeth 432 of the first middle pole assembly 54, then operably engage the first plurality of teeth 292 of the base pole assembly 52 to move the carriage assembly 140 and the portable tree stand 24 downwardly. The second rotational direction is opposite to the first rotational direction.

The tree stand lifting system 22 and method provide a substantial advantage over other assemblies and methods. In particular, the system 22 utilizes a base pole assembly 52 that is rotatably coupled to a base member 50 that is coupled to the tree 20. As a result, the base pole assembly 52 can be rotated to a substantially vertical position while a user is on the ground. Thus, the user does not have to climb a ladder to couple a pole assembly or a tree stand to a tree 20. A further advantage of the system 22 is that a carriage assembly 140 having an attached electric drive unit 150 is removably coupled to the base pole assembly 52. Thus, when an operator is no longer using the carriage assembly at the end of a hunting weekend, the base pole assembly 52 can be left coupled to the tree 20 and the operator can remove the carriage assembly 140 and the electric drive unit 150 so that these devices can be safely stored in a secure location. Still another advantage of the system 22 is that the electric drive unit 22 moves a portable tree stand either upwardly or downwardly on the base pole assembly 52 so that a user does not have to climb a ladder to install a portable tree stand at an elevated position on a tree.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A tree stand lifting system, comprising:
   a base member;
   a first strap assembly coupled to and contacting the base member;

a base pole assembly having first and second end portions, the first end portion being rotatably coupled to the base member such that the base pole assembly is rotatable from a first position to a substantially vertical position relative to the base member, the base pole assembly having a first plurality of teeth disposed longitudinally thereon;

a carriage assembly being removably coupled to the base pole assembly;

an electric drive unit being coupled to the carriage assembly, the electric drive unit having a gear assembly and an electric motor that that is configured to drive the gear assembly, the gear assembly having a main drive gear that rotates and operably engages at least a portion of the first plurality of teeth of the base pole assembly to move the carriage assembly on the base pole assembly;

a top pole assembly being aligned with the base pole assembly, the top pole assembly having a docking station clamp attached thereto with first and second apertures extending therethrough;

the carriage assembly further includes first and second docking plates with first and second docking station pins, respectively; the first and second docking plates being coupled to the first and second side carriage walls, respectively; and when the carriage assembly is disposed at a maximum desired elevation with respect to the base member, the first and second docking plates contact the docking station clamp on the top pole assembly and the first and second docking station pins are disposed in the first and second apertures, respectively.

2. The tree stand lifting system of claim 1, wherein:

the electric motor drives the gear assembly such that the main drive gear rotates in a first rotational direction and operably engages the first plurality of teeth to move the carriage assembly upwardly on the base pole assembly in response to a first control signal; and the electric motor drives the gear assembly such that the main drive gear rotates in a second rotational direction and operably engages the first plurality of teeth to move the carriage assembly downwardly on the base pole assembly in response to a second control signal.

3. The tree stand lifting system of claim 1, further comprising:

a first tree clamp being coupled to the base pole assembly; and a second strap assembly being coupled to the first tree clamp.

4. The tree stand lifting system of claim 3, wherein:

the first tree clamp includes a hub member and first and second blade members rotatably coupled to first and second end portions, respectively, of the hub member, the hub member having a plurality of hub teeth, the first blade member having a first plurality of blade teeth, the second blade member having a second plurality of blade teeth; the second strap assembly being coupled to the first and second blade members.

5. The tree stand lifting system of claim 1, further comprising:

a lower stand bracket being coupled to the carriage assembly, the lower stand bracket being slidably coupled to the base pole assembly, the lower stand bracket being further coupled to a portable tree stand; and an upper stand bracket being coupled to the carriage assembly, the upper stand bracket being further coupled to a tree stand coupler assembly which is coupled to the portable tree stand.

6. The tree stand lifting system of claim 1, further comprising:

a first middle pole assembly having first and second end portions, the first end portion of the first middle pole assembly being coupled to the second end portion of the base pole assembly, the first middle pole assembly having a second plurality of teeth disposed longitudinally thereon that are aligned with the first plurality of teeth of the base pole assembly;

a first tree clamp being coupled to the base pole assembly; and a second strap assembly being coupled to the first tree clamp.

7. The tree stand lifting system of claim 6, further comprising:

a second middle pole assembly having first and second end portions, the first end portion of the second middle pole assembly being coupled to the second end portion of the first middle pole assembly, the second middle pole assembly having a third plurality of teeth disposed longitudinally thereon that are aligned with the second plurality of teeth of the first middle pole assembly;

a second tree clamp being coupled to the first middle pole assembly; and a third strap assembly being coupled to the second tree clamp.

8. The tree stand lifting system of claim 7, further comprising:

the top pole assembly having first and second end portions, the first end portion of the top pole assembly being coupled to the second end portion of the second middle pole assembly, the top pole assembly having a fourth plurality of teeth disposed longitudinally thereon that are aligned with the third plurality of teeth of the second middle pole assembly;

a third tree clamp being coupled to the first middle pole assembly; and a fourth strap assembly being coupled to the third tree clamp.

9. The tree stand lifting system of claim 1, wherein:

the base member includes a base plate, first, second, third, and fourth gripping fingers, first and second coupling tabs, and first and second receiving plates;

the first, second, third, and fourth gripping fingers are coupled to and extend outwardly in a first direction from the base plate and are shaped to engage an exterior surface of a tree;

the first and second coupling tabs are coupled to and extend outwardly from first and second side portions, respectively, of the base plate in second and third directions, respectively, that are opposite to one another; the first strap assembly being coupled to the first and second coupling tabs; and the first and second receiving plates are coupled to and extend outwardly from the base plate in a fourth direction that is opposite to the first direction, the first and second receiving plates are spaced apart from one another to receive the first end portion of the base pole assembly therebetween.

10. The tree stand lifting system of claim 9, further comprising:

a threaded attachment pin;

the base pole assembly further includes a tubular base pole and a safety pin, the safety pin having first and second pin portions extending outwardly from first and second walls, respectively, of the tubular base pole;

the threaded attachment pin extending through the first receiving plate, the tubular base pole, and the second receiving plate to rotatably couple the tubular base pole to the base member; and the first and second receiving plates having first and second grooves, respectively, to receive the first and second pin portions, respectively, of the safety pin to hold the tubular base pole in the substantially vertical position.

11. The tree stand lifting system of claim 1, wherein:

the base pole assembly further includes a tubular base pole, an insert member, and a safety pin;

the insert member having a portion thereof that is disposed within and coupled to an end portion of the tubular base pole; the insert member defining the second end portion of the base pole assembly; and the safety pin having first and second pin portions extending outwardly from first and second side pole walls, respectively, of the tubular base pole.

12. The tree stand lifting system of claim 11, wherein:

the tubular base pole further includes a front pole wall and a rear pole wall, the front pole wall defining first and second front surfaces, the rear pole wall defining first and second rear surfaces.

13. The tree stand lifting system of claim 12, wherein:

the carriage assembly having a front carriage wall and first and second side carriage walls extending outwardly in a first direction from the front carriage wall;

the carriage assembly further having first and second lower roller members and first and second upper roller members;

the first and second lower roller members rotatably contacting the first and second front surfaces of the front pole wall; and the first and second upper roller members rotatably contacting the first and second rear surfaces of the rear pole wall.

14. The tree stand lifting system of claim 13, wherein:

the carriage assembly further having first and second lower guide members and first and second upper guide members;

the first and second lower guide members contacting the first and second rear surfaces of the rear pole wall; and the first and second upper guide members contacting the first and second rear surfaces of the rear pole wall.

15. The tree stand lifting system of claim 1, further comprising:

a hand-held RF remote transmitter; and the electric drive unit having an RF transceiver, the electric drive unit rotating the main drive gear in a first rotational direction to move the carriage assembly upwardly on the base pole assembly in response to the RF transceiver receiving a first RF signal from the hand-held RF remote transmitter, the electric drive unit rotating the main drive gear in a second rotational direction to move the carriage assembly downwardly on the base pole assembly in response to the RF transceiver receiving a second RF signal from the hand-held RF remote transmitter.

16. The tree stand lifting system of claim 1, further comprising:

a first middle pole assembly being coupled to the base pole assembly;

a second middle pole assembly being coupled to the first middle pole assembly; and the top pole assembly being coupled to the second middle pole assembly.

17. A tree stand lifting system, comprising:

a base member;

a first strap assembly being coupled to and contacting the base member;

a base pole assembly having first and second end portions and a dove-tail slot, the first end portion being rotatably coupled to the base member such that the base pole assembly is rotatable from a first position to a substantially vertical position relative to the base member, the base pole assembly having a first plurality of teeth disposed longitudinally thereon;

a carriage assembly being removably coupled to the base pole assembly;

an electric drive unit being coupled to the carriage assembly, the electric drive unit having a gear assembly and an electric motor that that is configured to drive the gear assembly, the gear assembly having a main drive gear that rotates and operably engages at least a portion of the first plurality of teeth of the base pole assembly to move the carriage assembly on the base pole assembly;

a first tree clamp having a hub member and first and second blade members rotatably coupled to first and second end portions, respectively, of the hub member, the hub member having a plurality of hub teeth and a dove-tail portion, the dove-tail portion being disposed in the dove-tail slot of the base pole assembly to couple the first tree clamp to the base pole assembly, the first blade member having a first plurality of blade teeth, the second blade member having a second plurality of blade teeth; a second strap assembly being coupled to the first and second blade members; a top pole assembly being aligned with the base pole assembly, the top pole assembly having a docking station clamp attached thereto with first and second apertures extending therethrough; the carriage assembly further includes first and second docking plates with first and second docking station pins, respectively; the first and second docking plates being coupled to the first and second side carriage walls, respectively; and when the carriage assembly is disposed at a maximum desired elevation with respect to the base member, the first and second docking plates contact the docking station clamp on the top pole assembly and the first and second docking station pins are disposed in the first and second apertures, respectively.

18. The tree stand lifting system of claim 17, further comprising:

a first middle pole assembly being coupled to the base pole assembly;

a second middle pole assembly being coupled to the first middle pole assembly; and the top pole assembly being coupled to the second middle pole assembly.

19. A tree stand lifting system, comprising:

a base member;

a first strap assembly coupled to the base member;

a base pole assembly having first and second end portions, the first end portion being rotatably coupled to the base member such that the base pole assembly is rotatable from a first position to a substantially vertical position relative to the base member, the base pole assembly having a first plurality of teeth disposed longitudinally thereon;

a carriage assembly being removably coupled to the base pole assembly; and an electric drive unit being coupled to the carriage assembly, the electric drive unit having a gear assembly and an electric motor that that is configured to drive the gear assembly, the gear assembly having a main drive gear that rotates and operably engages at least a portion of the first plurality of teeth of the base pole assembly to move the carriage assembly on the base pole assembly;

the base pole assembly further includes a tubular base pole, an insert member, and a safety pin;

the insert member having a portion thereof that is disposed within and coupled to an end portion of the tubular base pole; the insert member defining the second end portion of the base pole assembly;

the safety pin having first and second pin portions extending outwardly from first and second side pole walls, respectively, of the tubular base pole;

the tubular base pole further includes a front pole wall and a rear pole wall, the front pole wall defining first and second front surfaces, the rear pole wall defining first and second rear surfaces;

the carriage assembly having a front carriage wall and first and second side carriage walls extending outwardly in a first direction from the front carriage wall;

the carriage assembly further having first and second lower roller members and first and second upper roller members;

the first and second lower roller members rotatably contacting the first and second front surfaces of the front pole wall;

the first and second upper roller members rotatably contacting the first and second rear surfaces of the rear pole wall;

the carriage assembly further having first and second lower guide members and first and second upper guide members;

the first and second lower guide members contacting the first and second rear surfaces of the rear pole wall;

the first and second upper guide members contacting the first and second rear surfaces of the rear pole wall;

a top pole assembly aligned with the base pole assembly, the top pole assembly having a docking station clamp attached thereto with first and second apertures extending therethrough;

the carriage assembly further includes first and second docking plates with first and second docking station pins, respectively; the first and second docking plates being coupled to the first and second side carriage walls, respectively; and when the carriage assembly is disposed at a maximum desired elevation with respect to the base member, the first and second docking plates contact the docking station clamp on the top pole assembly and the first and second docking station pins are disposed in the first and second apertures, respectively.

* * * * *